(12) United States Patent
Volin

(10) Patent No.: US 10,757,911 B2
(45) Date of Patent: Sep. 1, 2020

(54) MULTIPLE-CONFIGURATION PET KENNEL

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 466 days.

(21) Appl. No.: 15/812,542

(22) Filed: Nov. 14, 2017

(65) Prior Publication Data

US 2018/0139925 A1    May 24, 2018

Related U.S. Application Data

(60) Provisional application No. 62/424,500, filed on Nov. 20, 2016.

(51) Int. Cl.
*A01K 1/02* (2006.01)
*A01K 1/03* (2006.01)

(52) U.S. Cl.
CPC .................... *A01K 1/034* (2013.01)

(58) Field of Classification Search
CPC . A01K 1/02; A01K 1/03; A01K 1/033; A01K 1/034; A01K 1/035; A01K 31/08; A01K 5/0142; A01K 39/0113
See application file for complete search history.

(56) References Cited

U.S. PATENT DOCUMENTS

| 4,224,899 A | 9/1980 | Cruchelow | |
| 4,629,086 A * | 12/1986 | Trubiano | B65D 19/12 220/489 |
| 4,696,259 A | 9/1987 | Fewox | |
| 4,762,085 A | 8/1988 | Ondrasik | |
| 4,819,582 A * | 4/1989 | Lichvar | A01K 1/03 119/474 |
| 5,233,939 A | 8/1993 | Randolph | |
| 5,335,617 A | 8/1994 | Hoffman | |
| 5,482,005 A | 1/1996 | Thom | |
| 5,701,843 A | 12/1997 | Lazides | |
| 5,727,502 A * | 3/1998 | Askins | A01K 1/033 119/499 |
| 6,318,294 B1 | 11/2001 | Richmond | |
| 6,318,295 B1 | 11/2001 | Wade | |

(Continued)

*Primary Examiner* — Thanh Pham

(57) ABSTRACT

A twenty-four-different-configuration pet kennel comprises seven first six-function panels, four second six-function panels, a door panel, a door, J-shaped clamps and W-shaped clamps (for angledly and parallelly clamping seven first six-function panels and four second six-function panels together), panel-tube legs (for plugging the bottom ends of seven first six-function panels and four second six-function panels to absorb shocks and vibrations), tick-blocking teeth (molded inside the panel-tube legs to prevent ticks from entering and hiding inside seven first six-function panels and four second six-function panels), and first and second wind-circulating sails (attached to seven first six-function panels and four second six-function panels to redirect and circulate wind and rain water in multiple different directions and multiple opposite directions into and out of the twenty-four-different-configuration pet kennel, to block the sun, and also to function as a rain water gutter and gutter spout). Seven first six-function panels and four second six-function panels can function as 1) stilts, 2) floors, 3) windows, 4) roofs, 5) walls, and 6) patios (to assemble at least twenty four different configurations of the twenty-four-different-configuration pet kennel).

20 Claims, 44 Drawing Sheets

(56) References Cited

U.S. PATENT DOCUMENTS

| | | | |
|---|---|---|---|
| 6,553,940 B1 | 4/2003 | Powell | |
| 6,581,545 B1 | 6/2003 | Foster | |
| 6,688,256 B1 | 2/2004 | King | |
| 7,111,584 B2 * | 9/2006 | Wang | A01K 1/034 119/452 |
| 7,201,116 B2 | 4/2007 | Axelrod | |
| 7,228,820 B1 | 6/2007 | Kellogg | |
| 7,481,182 B2 * | 1/2009 | Simpson | A01K 1/0125 119/168 |
| 7,500,655 B1 * | 3/2009 | Smith | E06B 11/02 256/27 |
| 7,584,720 B1 | 9/2009 | Jackson | |
| D614,815 S | 4/2010 | Co | |
| 7,721,678 B2 | 5/2010 | Jakubowski | |
| D662,264 S | 6/2012 | Chau | |
| 8,438,995 B1 | 5/2013 | Donahue | |
| 8,544,417 B2 | 10/2013 | Sangl | |
| 8,757,095 B2 | 6/2014 | Farmer | |
| 8,910,593 B2 * | 12/2014 | Kell | A01K 1/0236 119/400 |
| 8,915,216 B2 | 12/2014 | Hoegh | |
| 9,107,385 B2 | 8/2015 | Lever | |
| 9,226,473 B2 | 1/2016 | Hoffman | |
| 9,297,190 B2 * | 3/2016 | Lee | E05D 3/122 |
| 9,339,006 B1 | 5/2016 | Eby | |
| 9,357,748 B2 * | 6/2016 | Cantwell | A01K 1/0017 |
| 9,380,759 B2 | 7/2016 | Veness | |
| 9,635,833 B2 * | 5/2017 | Oeltjen | A01K 1/034 |
| 9,695,636 B2 * | 7/2017 | Cantwell | A01K 1/034 |
| 2003/0145799 A1 * | 8/2003 | Hays | A01K 1/034 119/502 |
| 2005/0034679 A1 * | 2/2005 | Link | A01K 1/0245 119/474 |
| 2006/0060151 A1 | 3/2006 | Sullivan | |
| 2008/0006808 A1 * | 1/2008 | Thompson | E04H 17/003 256/45 |
| 2010/0170447 A1 * | 7/2010 | Pridgen, Jr. | A01K 5/0128 119/61.53 |
| 2011/0259278 A1 * | 10/2011 | Collingham | A01K 1/034 119/496 |
| 2012/0037083 A1 | 2/2012 | Greene | |
| 2012/0152965 A1 * | 6/2012 | Bellehumeur | A01K 5/0142 220/636 |
| 2012/0227675 A1 * | 9/2012 | Link | A01K 1/0017 119/474 |
| 2014/0190419 A1 * | 7/2014 | Harding | A01K 39/04 119/51.5 |
| 2016/0192616 A1 | 7/2016 | Kitchen | |

\* cited by examiner

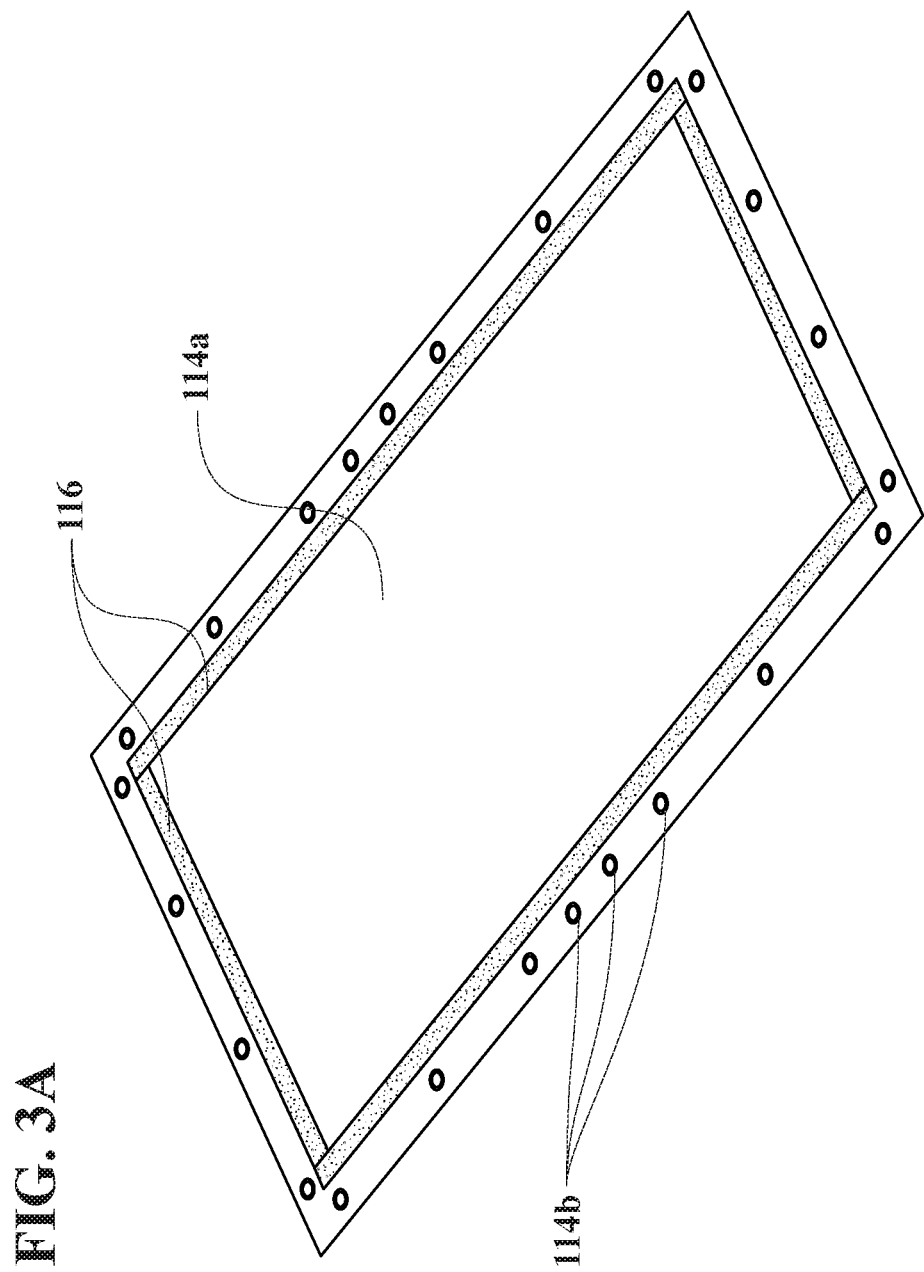

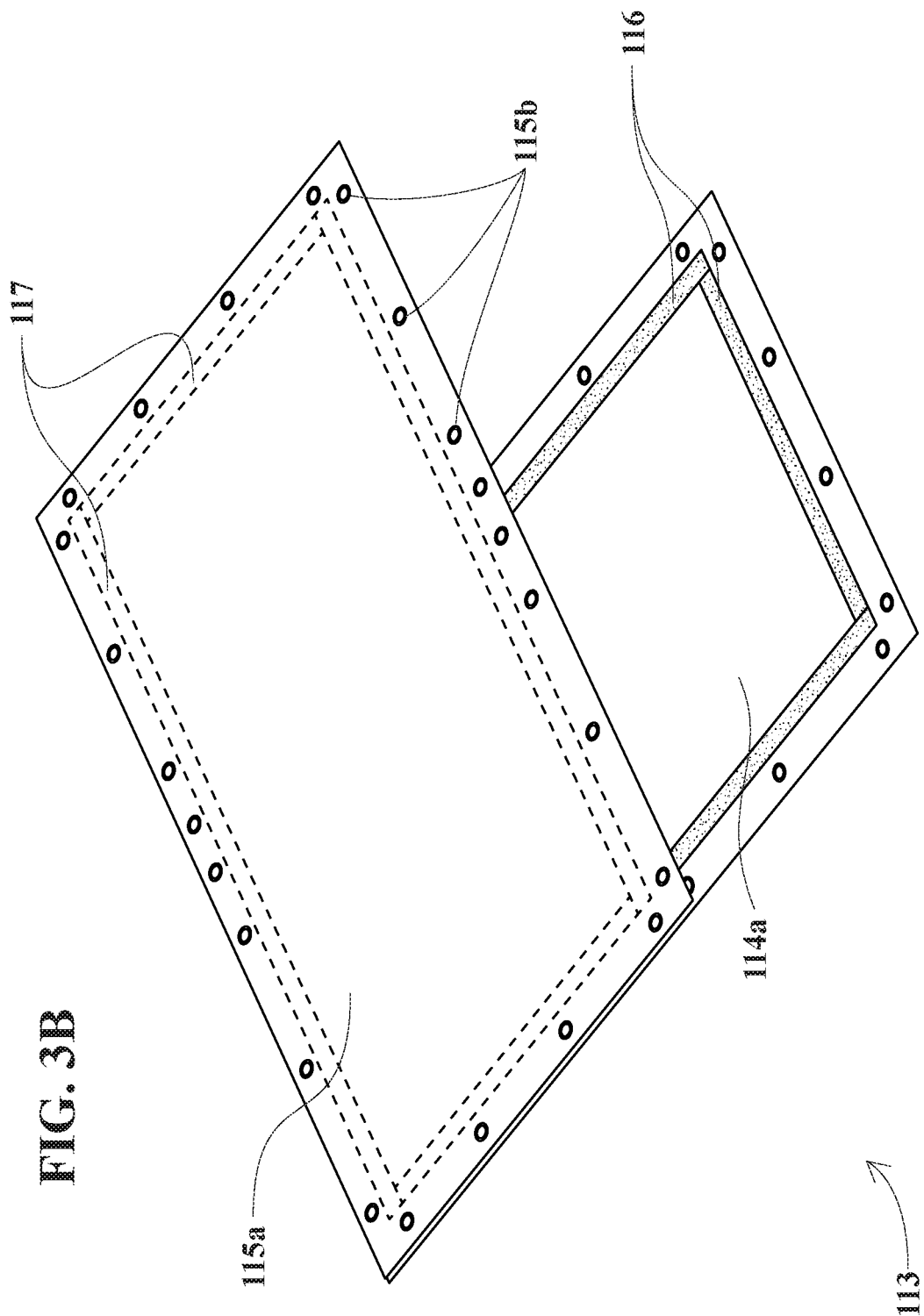

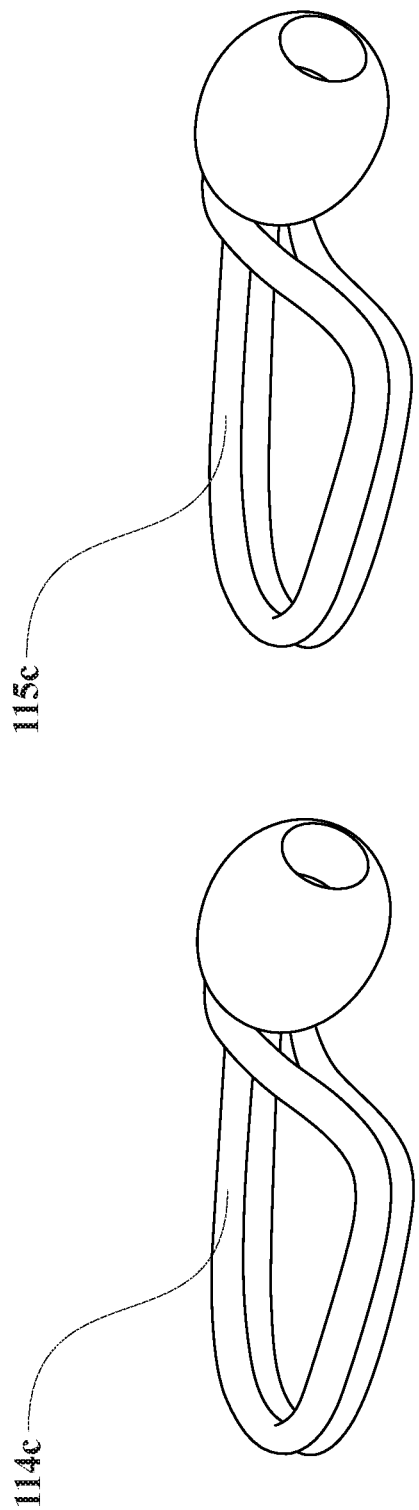

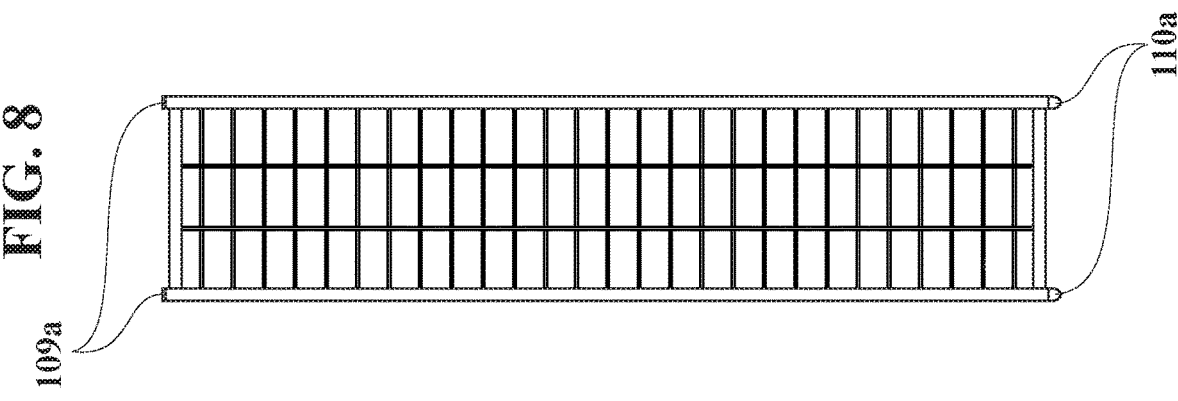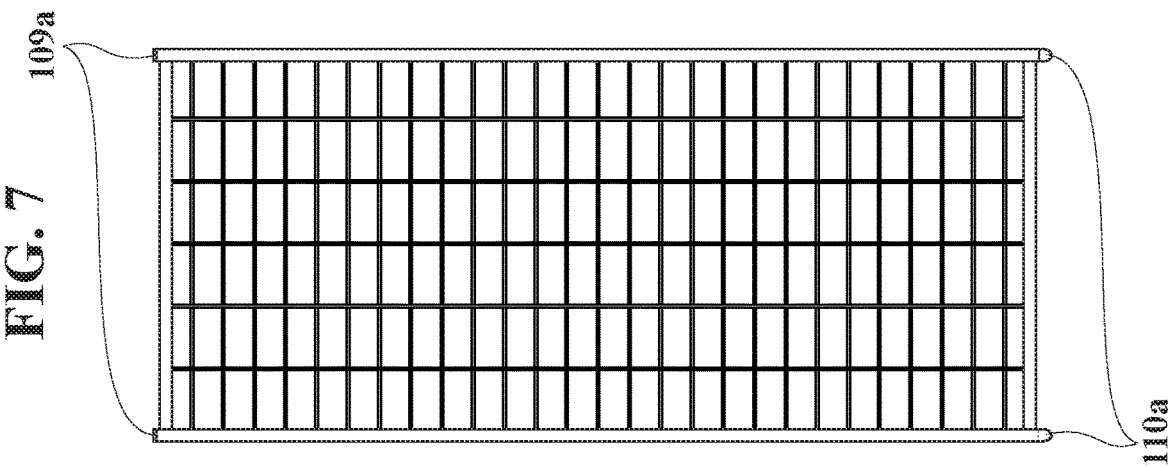

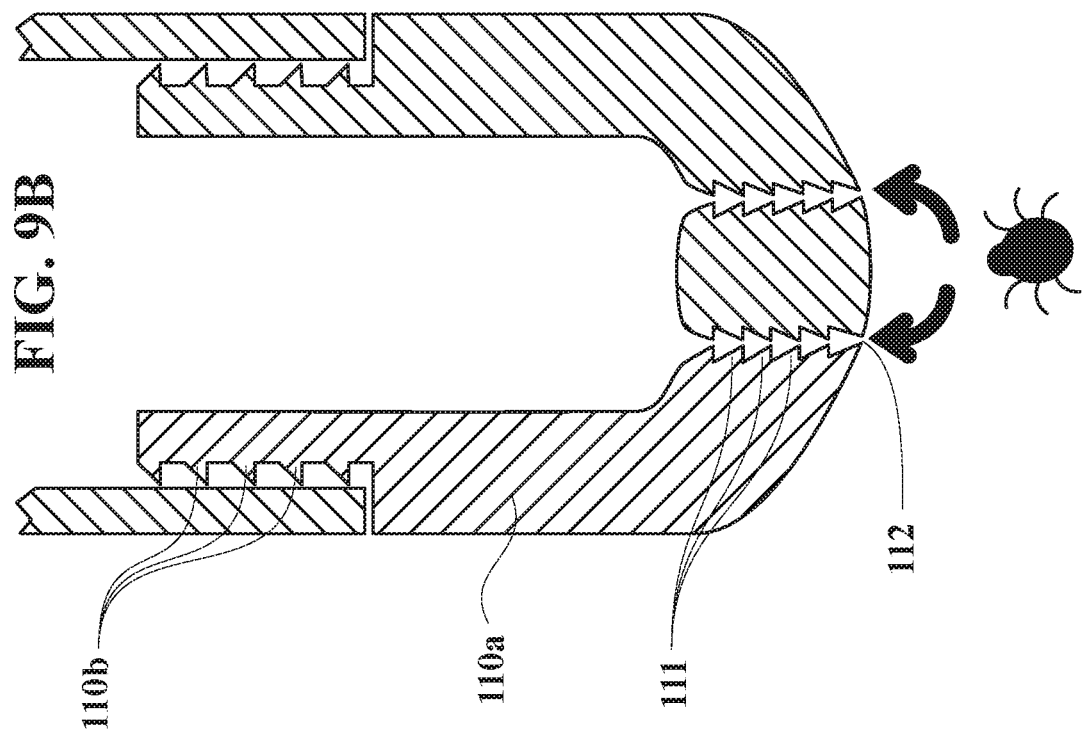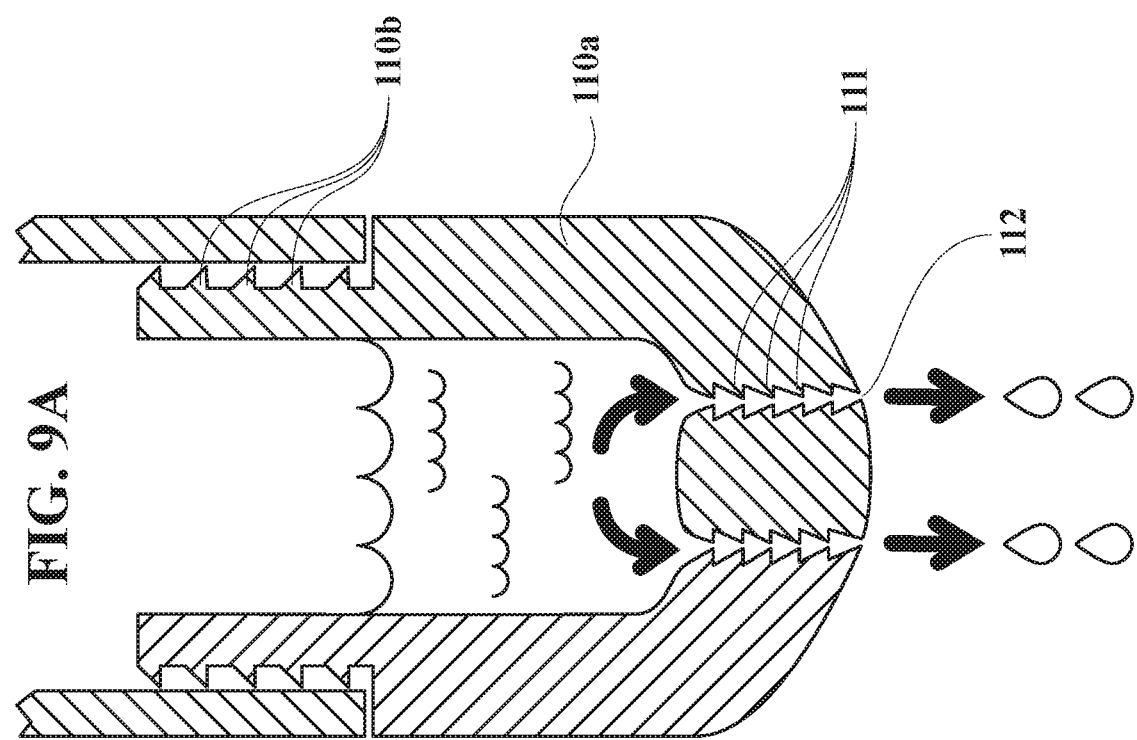

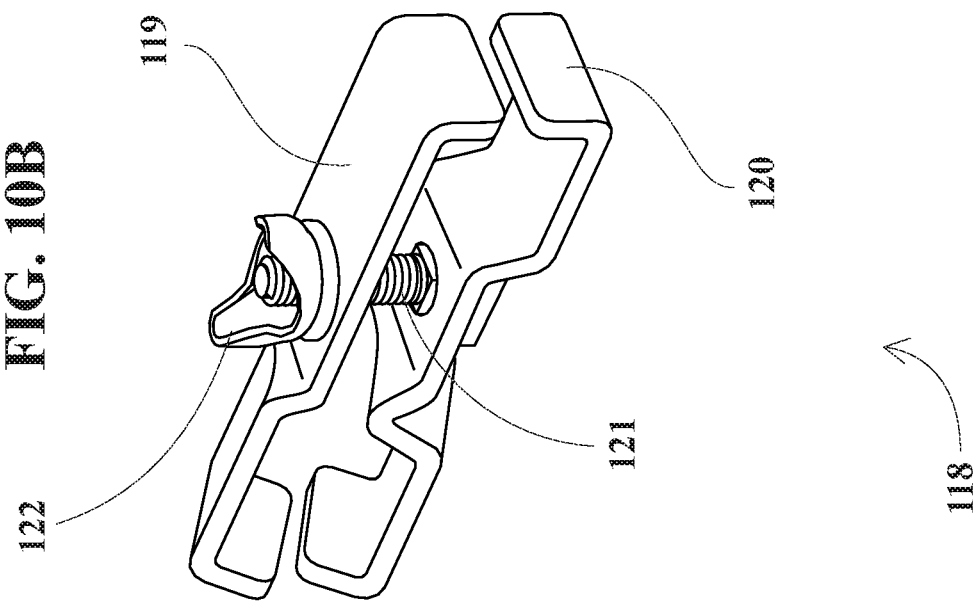
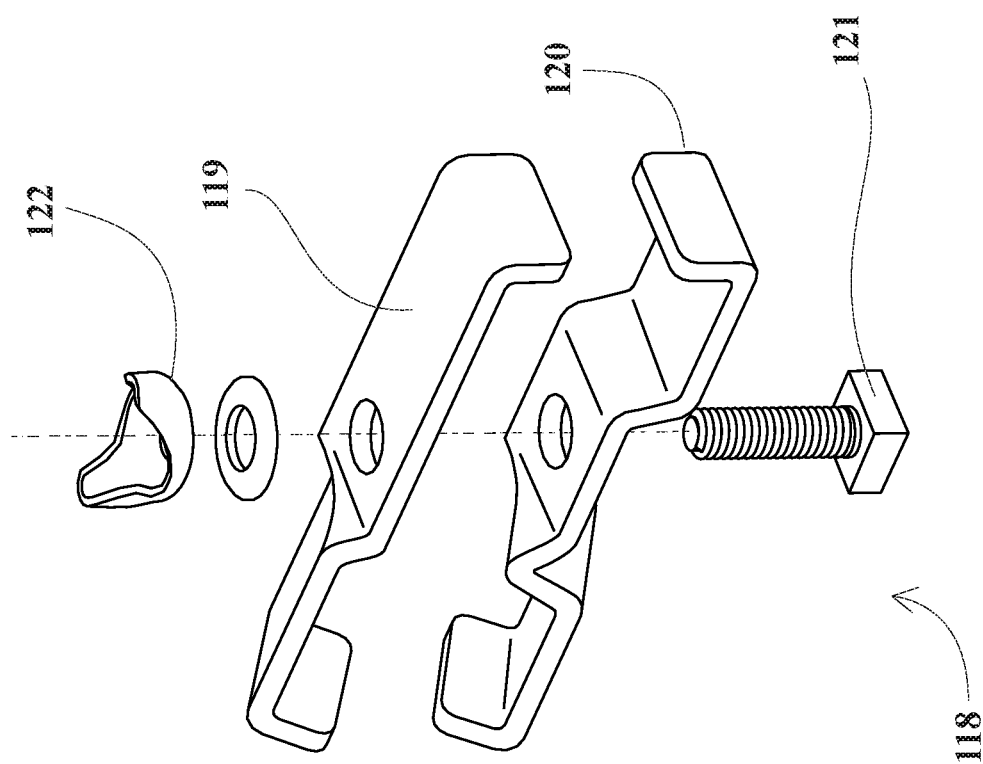

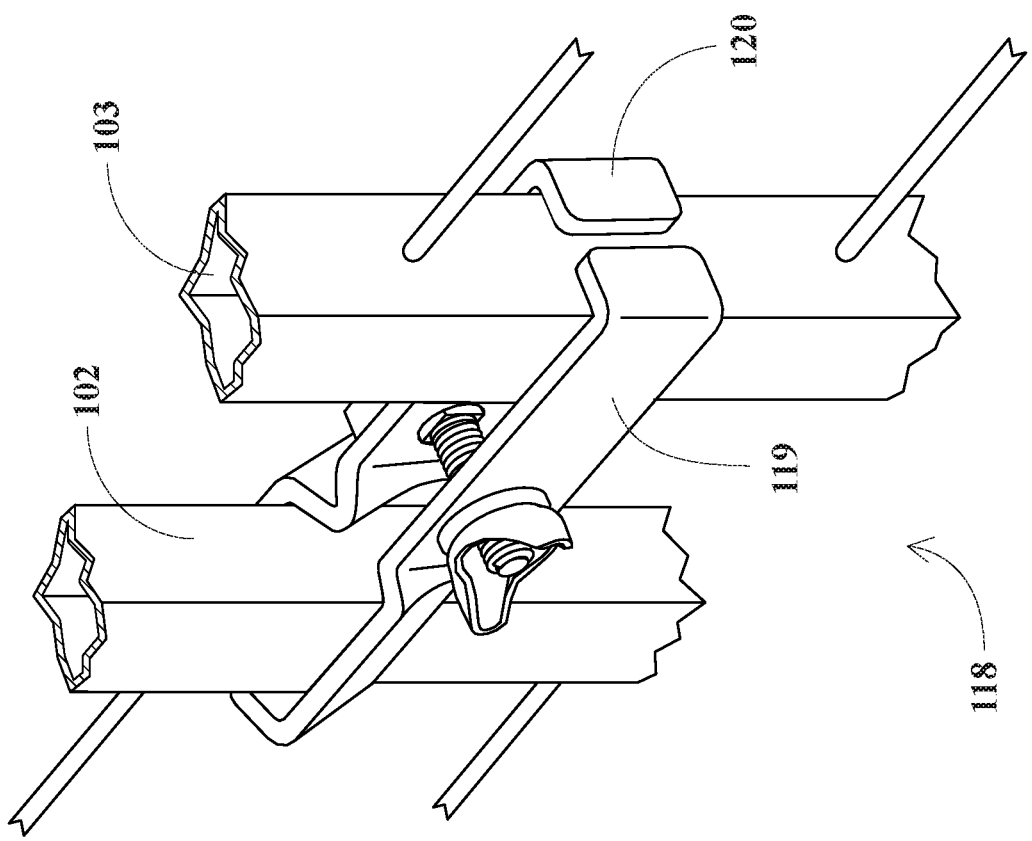

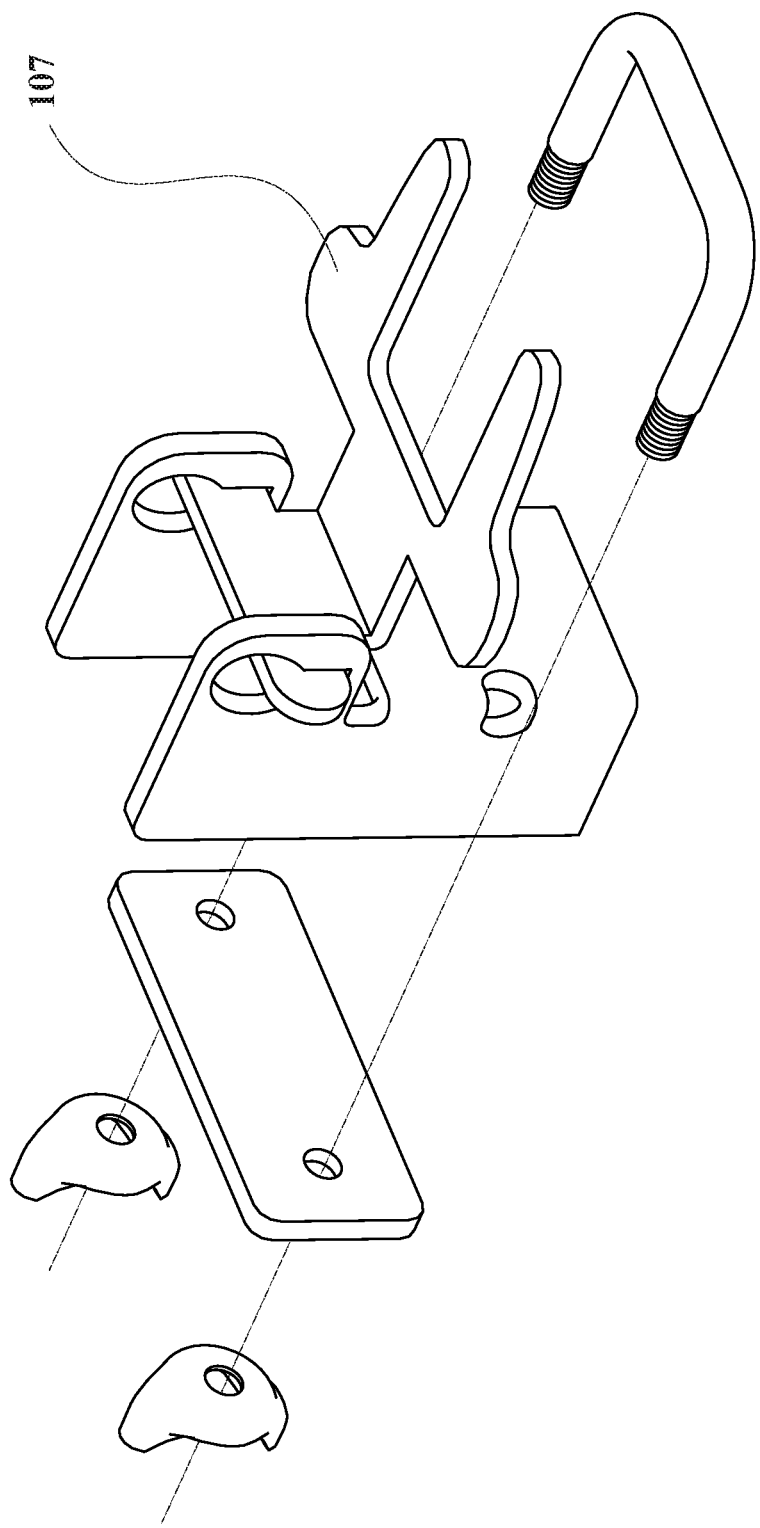

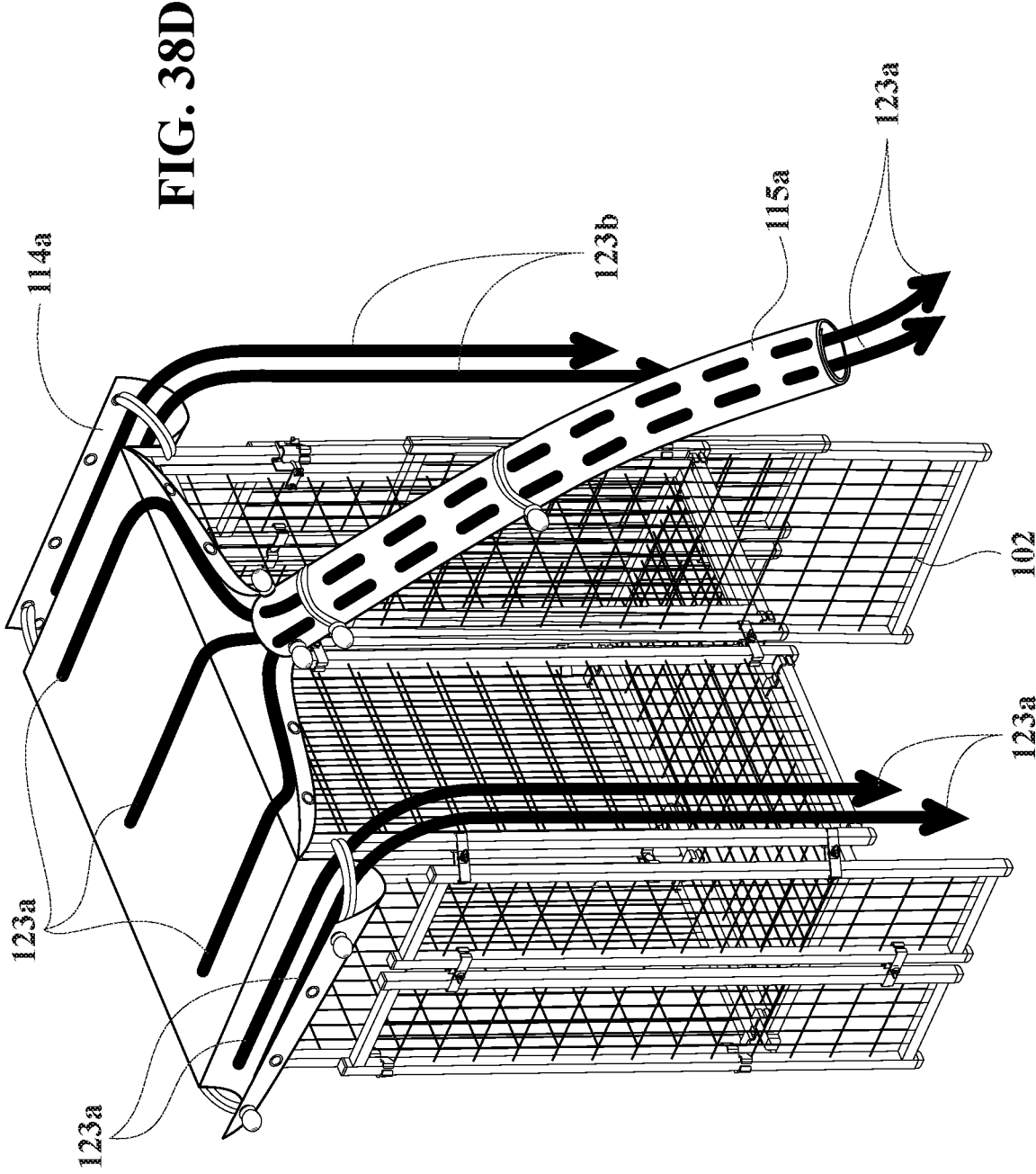

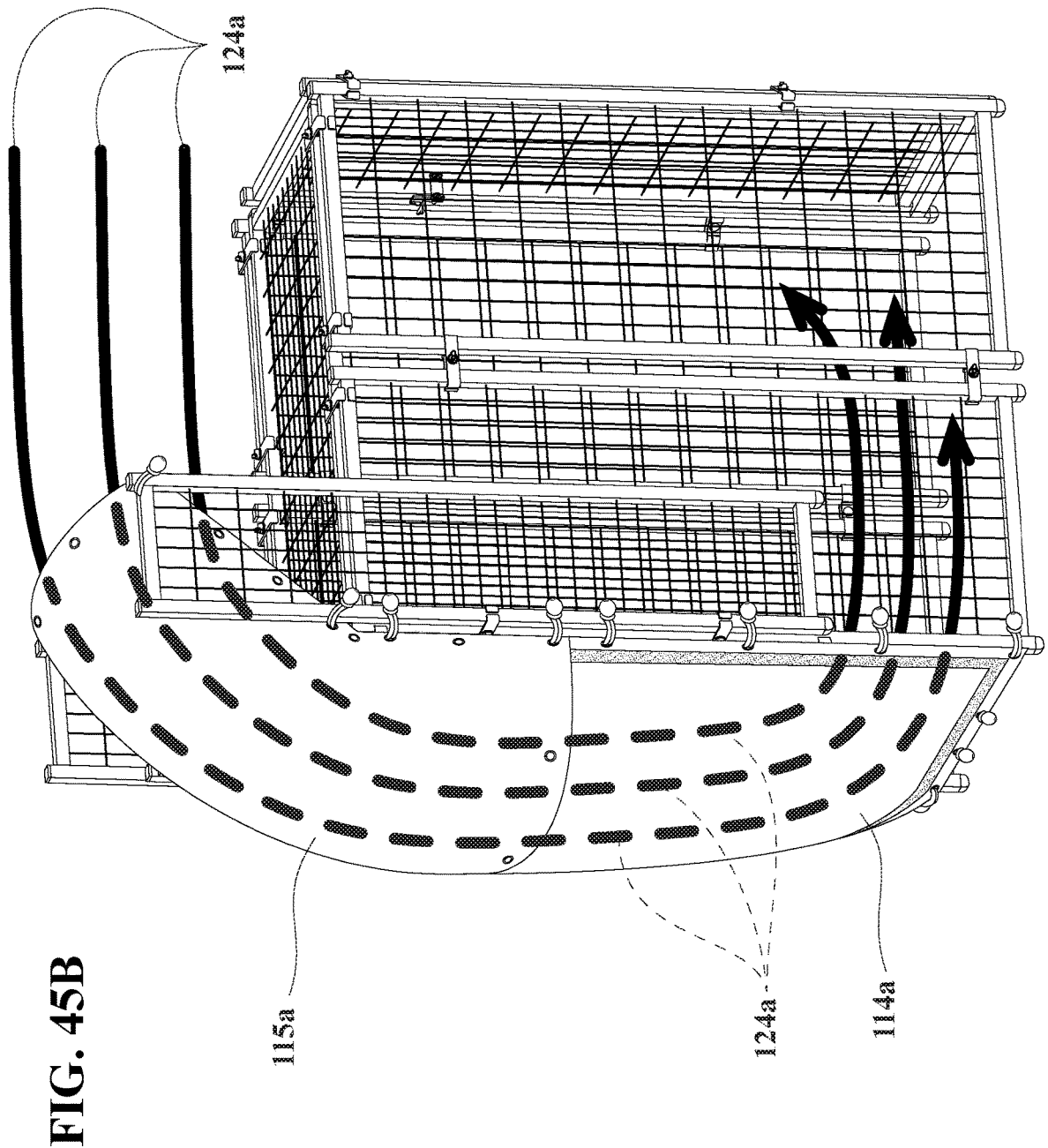

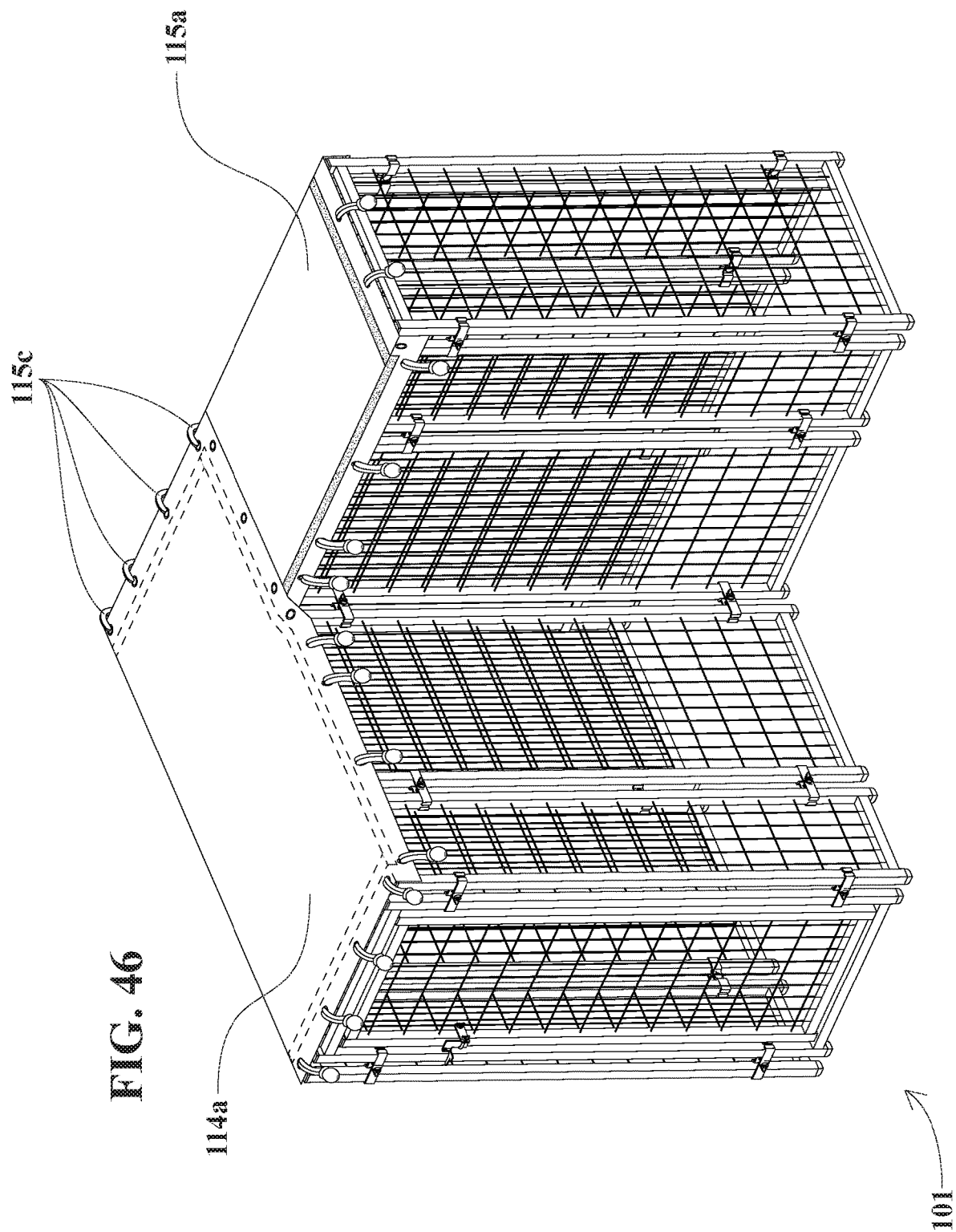

MULTIPLE-CONFIGURATION PET KENNEL

1. FIELD OF THE INVENTION

The present invention relates to a pet kennel, which is cheap to produce, is easy to ship as one unit, can quickly and easily be assembled and disassembled, and can quickly and easily be used. Particularly, the present invention relates to an at-least-twenty-four-different-configuration pet kennel, having:
1) Angled Clamp System,
2) Parallel Clamp System,
3) Angled Stilt System,
4) Parallel Stilt System,
5) Wind-Circulating Sail System,
6) Rain-Circulating Gutter System,
7) Angled-Stilt Panel,
8) Parallel-Stilt Panel,
9) Multi-Story Floor Panel,
10) Door Panel,
11) Window Panel,
12) Roof Panel,
13) Wall Panel, and
14) Patio Panel.

2. DESCRIPTION OF THE PRIOR ART

A number of pet kennels have been introduced.

U.S. Pat. No. 4,224,899, issued on 1980 Sep. 30 to Cruchelow, Marilyn, details a pet shelter utilizing a hollow housing having a pair of openings on one wall and a large opening in another opposed wall thereof. One of the pair of openings is provided with a transparent plastic-like hinged door, with the other opening adjacent thereto provided with a slip hinge arrangement for mounting a transparent window or screened panel thereover. The opposed opening is covered with a pair of slidable screen-like doors. An awning is disposed over the pair of adjacent openings, one of which is provided with a cleated ramp.

U.S. Pat. No. 4,696,259, issued on 1987 Sep. 29, to Fewox, Cary M., details an enclosure and housing assembly for an animal such as a dog, cat or like animal, sufficiently structured to be positioned at a given site to provide containment of the animal while at the same time providing housing facilities and protection from the elements. The assembly includes a lightweight material base such as rigid fiberglass molded into an integral, one-piece construction and an enclosure and cover secured thereto and extending upwardly therefrom in surrounding relation to the base.

U.S. Pat. No. 4,762,085, issued 1988 Aug. 9, to Ondrasik, Vladimir J., details a collapsible wire cage, having opposite side walls, upper and lower walls, and end walls of wire grille construction defining an enclosure. Each end wall is pivoted at one side edge to a respective one of the side walls and has a releasable locking mechanism at its other side edge for releasably securing it to the other side wall. The upper and lower walls are each formed in two panel sections, one of which is pivoted to one of the side walls and the other of which is pivoted to the other side wall.

U.S. Pat. No. 5,233,939, issued 1993 Aug. 10, to Randolph, Arthur J., details an animal cage providing a rectangular box-like cage structure having a top, bottom, right and left sides, and openable front and back ends, together defining an internal cavity. A movable internal vertical wall is adjustably supported on the structure top, and a movable internal horizontal wall is adjustably supported on one of the structure sides. An animal may be placed in the cage, and the vertical and horizontal inner walls slowly moved to restrict the animal, so that a user may inoculate or otherwise treat the animal safely.

U.S. Pat. No. 5,335,617, issued 1994 Aug. 9, to Hoffman, Oneal M., details an apparatus for use in the housing of dogs includes a molded fiberglass flooring, fencing and a top. The apparatus is movable and sanitary, and can be used in a modular fashion with standard-sizes of fencing that can be shared in part by adjacent modules. The fiberglass flooring has rimmed sides that act as "splash guards" and a trough with a drain at one end outside the fencing for flushing animal wastes into a sewage system.

U.S. Pat. No. 5,482,005, issued 1996 Jan. 9, to Thom, Jerry D., details a animal cage having an inclined floor, a plurality of upstanding walls mounted on the floor and an opening in the floor panel, positioned proximate an end of the floor panel, for evacuating waste material from the floor is disclosed. A cover, mounted on one of the walls extends over the opening to substantially preclude the housed animal from contacting the material in the opening.

U.S. Pat. No. 5,701,843, issued 1997 Dec. 30, to Lazides, Gus, details a pet carrier with adequate ventilation for even a large animal. The carrier has a handle which can be folded to conserve space and retractable wheels which can be placed in a down position when moving the carrier with the pet inside, or can be placed in an up or inactive position when mobility is not necessary or when it is desired to maintain the carrier in a stationary position.

U.S. Pat. No. 6,318,294, issued 2001 Nov. 20, to Richmond, Edward A., details a plurality of panels preferably made from a heat insulating material define an enclosure for a pet shelter. One of the panels has an opening for the pet to enter or exit the enclosure. The panels are disposed on a base member. Detents (e.g. hooks) on the panels are removably disposed in detents (e.g. openings) in the base member to position the panels in a particular relationship on the base member. The panels may be integral with one another or may be separate.

U.S. Pat. No. 6,318,295, issued 2001 Nov. 20, to Wade, Paul R., details a multi-level kennel enclosure including a structure formed by left and right side walls, top and bottom walls and back and front walls defining an interior. A shelf is mounted in the interior so as to divide the interior into an upper section defining a living section and a separate lower section including a toilet section. An opening in the shelf allows an animal in the interior to pass between the living section and the toilet section. The front wall includes a pivotable first door selectively movable from a closed position to an open position to provide access to the living section.

U.S. Pat. No. 6,553,940, issued 2003 Apr. 29, to Powell, Tony A., details an animal or dog kennel kit comprising a plurality of panels that can be connected or coupled together to form an enclosure. The plurality of panels includes at least one relatively small panel and one relatively large panel. The relatively small panel can be nested or placed within the relatively large panel to form a compact package for economical shipment.

U.S. Pat. No. 6,581,545, issued 2003 Jun. 24, to Foster, Michael A., details a soft sided cover for a kennel having a top wall, a bottom wall, a front wall, a rear wall and a pair of side walls forming an enclosure for covering a kennel. The bottom contains an aperture so that the cover can be placed over the kennel to protect the kennel interior from the outside environment.

U.S. Pat. No. 6,688,256, issued 2004 Feb. 10, to King, Lise, details a portable pet enclosure having a plurality of frame pieces connected via flexible netting. The frame pieces each contain a semicircular hoop having two end prongs for insertion into the ground. A cross-bar extends between the two legs of the frame several inches above the prongs to provide a base for resting on the ground. A door is attached to the end frame piece and secured closed via zipper. The pet enclosure is collapsible and easily transportable inside its own carrying bag.

U.S. Pat. No. 7,111,584, issued 2006 Sep. 26, to Wang, Steve, details a kennel including a plurality of side panels that are connected or coupled together with a gate panel to form an enclosure. The gate panel has a pair of ends that are configured for connecting to the side panels and allow access into and out of the enclosure via a doorway positioned between the ends.

U.S. Pat. No. 7,201,116, issued 2007 Apr. 10, to Axelrod, Glen S., details a foldable/collapsible structure that folds or collapses between a collapsed condition and an expanded condition. The structure includes a top and a bottom panel, and a pair of opposing sidewalls extending between the top and bottom panels. The opposing sidewalls each include a wall panel and an upper wall panel connected to one another by a hinge.

U.S. Pat. No. 7,228,820, issued 2007 Jun. 12, to Kellogg, Michael S., details an adjustable kennel providing an enclosure for an animal that is lightweight, expandable and collapsible for storage and travel. The kennel has a semi-rigid frame that can be adjusted for size and an expandable, pliable cover allowing the kennel to be adjusted appropriately for the animal occupying it. When in use, the frame includes slidably expandable support members such that the kennel can accommodate different sized animals or can be adjusted to be used over a long period of time as an animal grows.

U.S. Pat. No. 7,584,720, issued 2009 Sep. 8, to Jackson, Thomas J., details an animal habitat for confining an animal in a livable area that may adapted to have distinct areas. The habitat may be formed of sections are used to form modules. The modules may be joined by attaching two or more modules laterally, or the modules may be joined by vertical stacking. Grates are placed in openings within outer walls of the modules.

U.S. Pat. No. 7,721,678, issued 2010 May 25, to Jakubowski, Chris, details a pet shelter having a non-deformable steel cage defining a space therein suitable for the enclosure of a pet and deformable pieces removably attachable to the perimeter of the steel cage. The steel cage has a top shelter section and a side shelter section formed by a guide following door, wherein the guide following door can be recessed into the pet shelter and underneath and adjacent to the top shelter section. The deformable pieces are oriented on corners and edges of the steel cage.

U.S. Pat. No. 8,438,995, issued 2013 May 14, to Donahue, Karl J., details an animal run having first and second side panels operable to be pivotally mounted along a central plane. A front panel is pivotally coupled with one of the side panels and operable to be detachably coupled to the other side panel. The side panels are moveable between a stored position, in which each side panel is positioned parallel the central plane, and an operational position, in which they extend outward at an angle from the central plane.

U.S. Pat. No. 8,544,417, issued 2013 Oct. 1, to Sangl, Douglas L., details a pet crate broadly including a crate housing. The crate housing includes first and second connector sections and a support wall extending between and interconnecting the sections. The connector sections and wall extend between opposite housing ends of the crate housing to cooperatively present an enclosed pet space. The crate housing presents a crate opening at a corresponding housing end. The crate opening permits pet ingress and egress relative to the enclosed pet space.

U.S. Pat. No. 8,757,095, issued 2014 Jun. 24, to Farmer, Michael, details a pet enclosure including a cover and a collapsible support frame. The cover includes a bottom panel, a top panel opposite the bottom panel, and a plurality of side panels extending between the bottom panel and the top panel to define an interior space of the cover, wherein an aperture is defined in the cover for accessing the interior space. The collapsible support frame is configured for insertion into the interior space of the cover via the aperture, and the support frame includes a floor arrangement, a first truss hingedly connected to the floor arrangement, and a second truss hingedly connected to the floor arrangement opposite the first truss.

U.S. Pat. No. 8,915,216, issued 2014 Dec. 23, to Hoegh, Thomas Barry, details a device incorporating an automatically releasing door of a kennel or leash. For instance, the owner of a canine can place the dog in a kennel prior to leaving his or her residence. The owner can initiate a timer on the kennel or leash, and the kennel door opens or leash releases after a pre-determined amount of time, such as 30 minutes.

U.S. Pat. No. 9,107,385, issued 2015 Aug. 18, to Lever, Teresa E., details an animal kennel comprising front, rear, top, bottom, and opposite side walls that collectively define a cavity. At least a portion of the cavity has a horizontal cross-section that is bordered by the front, rear, and opposite side walls. The cross-section has a front portion and a rear portion.

U.S. Pat. No. 9,226,473, issued 2016 Jan. 5, to Hoffman, Jonathan, details a portable kennel and pet safety enclosure for use in vehicles which distributes deceleration forces across as large an area of the pet's body as possible and gently arrests the forward motion of a pet to protect them from bodily harm in the event of a sudden vehicle deceleration event and which may also be used outside of vehicles as a portable kennel. The enclosure also protects the vehicle interior from smells, stains, or scratching caused by a pet.

U.S. Pat. No. 9,339,006, issued 2016 May 17, to Eby, Michael L., details a pet kennel configured to restrain a pet indoors while allowing access to out-of-doors includes a bottom and a plurality of peripheral panels attached to the bottom and extending upwardly therefrom and wherein at least one of the panels is constructed of a durable mesh. A top is affixed to an upper edge of the plurality of peripheral panels. At least one access door is integrated in one of the panels and is selectively openable and closable for access to an interior of the kennel.

U.S. Pat. No. 9,380,759, issued 2016 Jul. 5, to Veness, David, details a pet kennel that is structured to receive an animal includes an upper kennel portion and a lower kennel portion that include first and second engagement structures that are slidingly engageable. The upper kennel portion is situated in a first position atop the lower kennel portion offset from one another along a longitudinal axis of the pet kennel.

U.S. Pat. No. D614815, issued 2010 Apr. 27, to Co., Alix K., discloses the ornamental design for a kennel.

U.S. Pat. No. D662264, issued 2012 Jun. 19, to Chau, Nam Wai, Ho, Ka Kin, Slater, Owen A., and Foster, Michael A., discloses the ornamental design for a pet carrier.

U.S. Publication No. 20060060151, published 2006 Mar. 23, to Sullivan, Jeffrey, M., demonstrates a canopy system for a dog kennel that includes parallel walls and parallel horizontal pipe sections at the top of the walls. A tarp support structure consisting of: a first beam attached at the ends thereof to the parallel horizontal pipe sections; a second beam attached at the ends thereof to the parallel horizontal pipe sections, the second beam being parallel to and from the first beam; and a ridge beam attached at one end thereof of the first beam and at the other end of the second beam.

U.S. Publication No. 20120037083, published 2012 Feb. 16, to Greene, Arthur Lewis, discloses a pet kennel having a lower compartment with a bottom, a rear wall, a front wall and two side walls, and an upper compartment having a fixed section and a swingable section. The fixed section of the upper compartment is removably attached to the lower compartment, and the swingable section is removably attached to the lower compartment and attached to the fixed section. Access to the pet kennel is provided when the swingable section is swung to an open position.

U.S. Publication No. 20160192616, published 2016 Jul. 17, to Kitchen, Mark Rusty, discloses the embodiments herein providing a modular dog house having a kennel/living area and a dog run. The kennel comprises four sidewalls, a base, a porch and a roof. The dog run attached to the front side of kennel is extended underneath the kennel. The kennel includes a large personal access door for providing full access to interior area and a vinyl flap door for providing access to the porch and the dog run for the dog. A ramp having cleats is attached to the porch.

Disadvantages of the Prior Art

The prior art have failed to solve many problems associated with such pet kennels, as follows:

1) No prior art mention or disclose any pet kennels, having
  seven first six-function panels 102.
  Therefore, the prior art of pet kennel:
    a) Can not function as an angled-stilt panel,
      to raise the at-least-twenty-four-different-configuration pet kennel above the ground to keep pets above wet ground, puddles, or uncomfortable terrain,
      to create large-footprint stilts to stabilize the at-least-twenty-four-different-configuration pet kennel, and
      to create unique entries, exits, and windows
      (see FIGS. 14, 15, 16, and 17);
    b) Can not function as a multi-story floor panel,
      to create multiple stories for multiple pets to rest in comfort, and
      to separate multiple pets from each other
      (see FIGS. 14, 15, 16, and 17);
    c) Can not function as a door panel,
      to hinge door
      (see FIGS. 14, 15, 16, and 17);
    d) Can not function as a window panel,
      to form a window
      (see FIGS. 14, 15, 16, and 17);
    e) Can not function as a roof panel,
      to provide shelter from the rain and other weather elements
      (see FIGS. 14, 15, 16, and 17);
    f) Can not function as a wall panel,
      to create a temporary enclosement
      (see FIGS. 14, 15, 16, and 17); and
    g) Can not function as a patio panel,
      to allow pets to rest above the ground outside the at-least-twenty-four-different-configuration pet kennel
      (see FIGS. 18 and 21).
    h) Can not function in a combination with four second six-function panels 103
      to form at least twentyfour configurations of the at-least-twenty-four-different-configuration pet kennel such;
      For example:
      an angled-stilt multi-story-roof-and-floor octagon configuration
      (see FIG. 14),
      an angled-stilt multi-story-floor octagon configuration
      (see FIG. 15),
      a parallel-stilt multi-story-roof-and-floor octagon configuration
      (see FIG. 16),
      a parallel-stilt panel multi-story-floor octagon configuration
      (see FIG. 17),
      a opposite-patio multi-kennel configuration
      (see FIG. 18),
      a joint-patio multi-kennel configuration
      (see FIG. 19),
      a parallel-stilt square configuration
      (see FIG. 20),
      a opposite-patio single-kennel configuration
      (see FIG. 21),
      a symmetric-octagon configuration
      (see FIG. 22),
      a asymmetric-octagon configuration
      (see FIG. 23),
      a T-shaped configuration
      (see FIG. 24),
      a X-shaped configuration
      (see FIG. 25),
      a L-shaped configuration
      (see FIG. 26),
      a three-sided corner-configuration
      (see FIG. 27),
      an I-shaped configuration
      (see FIG. 28),
      a rectangular configuration
      (see FIG. 29),
      a square configuration
      (see FIG. 30),
      a three-sided side-door configuration
      (see FIG. 31),
      an asymmetrical L-shaped configuration
      (see FIG. 32),
      a symmetrical L-shaped configuration
      (see FIG. 33),
      an asymmetrical T-shaped configuration
      (see FIG. 34),
      a symmetrical T-shaped configuration
      (see FIG. 35),
      a asymmetric five-sided configuration
      (see FIG. 36), and
      a symmetric seven-sided configuration
      (see FIG. 37).

2) No prior art mention or disclose any pet kennels, having
  four second six-function panels 103.

Therefore, the prior art of pet kennel:
  a) Can not function as an angled-stilt panel,
    to raise the at-least-twenty-four-different-configuration pet kennel above the ground to keep pets above wet ground, puddles, or uncomfortable terrain,
    to create large-footprint stilts to stabilize the at-least-twenty-four-different-configuration pet kennel, and
    to create unique entries, exits, and windows
    (see FIGS. 14, 15, 16, and 17);
  b) Can not function as a multi-story floor panel,
    to create multiple stories for multiple pets to rest in comfort, and
    to separate multiple pets from each other
    (see FIGS. 14, 15, 16, and 17);
  c) Can not function as a door panel
    to hinge door
    (see FIGS. 14, 15, 16, and 17);
  d) Can not function as a window panel
    to form a window
    (see FIGS. 14, 15, 16, and 17);
  e) Can not function as a roof panel
    to provide shelter from the rain and other weather element
    (see FIGS. 14, 15, 16, and 17);
  f) Can not function as a wall panel
    to create a temporary enclosement
    (see FIGS. 14, 15, 16, and 17); and
  g) Can not function as a patio panel
    to allow pets to rest above the ground outside the at-least-twenty-four-different-configuration pet kennel
    (see FIGS. 18 and 21).
  h) Can not function in a combination with four second six-function panels 103
    to form at least twentyfour configurations of the at-least-twenty-four-different-configuration pet kennel such;
    For example:
    an angled-stilt multi-story-roof-and-floor octagon configuration
    (see FIG. 14),
    an angled-stilt multi-story-floor octagon configuration
    (see FIG. 15),
    a parallel-stilt multi-story-roof-and-floor octagon configuration
    (see FIG. 16),
    a parallel-stilt panel multi-story-floor octagon configuration
    (see FIG. 17),
    a opposite-patio multi-kennel configuration
    (see FIG. 18),
    a joint-patio multi-kennel configuration
    (see FIG. 19),
    a parallel-stilt square configuration
    (see FIG. 20),
    a opposite-patio single-kennel configuration
    (see FIG. 21),
    a symmetric-octagon configuration
    (see FIG. 22),
    a asymmetric-octagon configuration
    (see FIG. 23),
    a T-shaped configuration
    (see FIG. 24),
    a X-shaped configuration
    (see FIG. 25),
    a L-shaped configuration
    (see FIG. 26),
    a three-sided corner-configuration
    (see FIG. 27),
    an I-shaped configuration
    (see FIG. 28),
    a rectangular configuration
    (see FIG. 29),
    a square configuration
    (see FIG. 30),
    a three-sided side-door configuration
    (see FIG. 31),
    an asymmetrical L-shaped configuration
    (see FIG. 32),
    a symmetrical L-shaped configuration
    (see FIG. 33),
    an asymmetrical T-shaped configuration
    (see FIG. 34),
    a symmetrical T-shaped configuration
    (see FIG. 35),
    a asymmetric five-sided configuration
    (see FIG. 36), and
    a symmetric seven-sided configuration
    (see FIG. 37).
3) No prior art mention or disclose any pet kennels, having
  a first wind-circulating sail 114*a*.
  Therefore, the prior art of pet kennel:
    a) Can not function as a wind circulator
      (attached to the at-least-twenty-four-different-configuration pet kennel in many different way)
        to catch and redirect rain water in the direction of arrows 123*a* and 123*b* (See FIGS. 38A, 38B, 38C, 38D, and 38E)
        to flow in many different directions and elevations, and
        to circulate wind in the direction of arrows 124*a* and 124*b*, upward, downward, sideway, and in opposite directions through the at-least-twenty-four-different-configuration pet kennel
        (See FIGS. 39, 40, 41, 42, 43, 44, 45A, 45B, 45C, 45D, and 45E);
        For example:
        a wind circulator
          for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
          (see FIG. 39);
        a wind circulator
          for redirecting wind flow from flowing horizontally, to flowing upward, into the twenty-four-different-configuration pet kennel, for cooling the twenty-four-different-configuration pet kennel
          (see FIG. 41);
        a wind circulator
          for redirecting wind flow from flowing horizontally to flowing downward, to flowing horizontally, to flowing upward, into the twenty-four-different-configuration pet kennel, for cooling the twenty-four-different-configuration pet kennel
          (see FIG. 42);

a wind circulator
for redirecting wind flow from flowing horizontally, to flowing upward, into the patio of the twenty-four-different-configuration pet kennel, for cooling the twenty-four-different-configuration pet kennel
(see FIG. 43);
a wind circulator
for redirecting wind flow from flowing horizontally, to flowing downward, into the twenty-four-different-configuration pet kennel, for cooling the twenty-four-different-configuration pet kennel
(see FIG. 44);
a wind circulator
for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
(see FIG. 45A);
a wind circulator
for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel
(see FIG. 45B);
a wind circulator
for redirecting wind flow from oppositely flowing horizontally, to flowing into the twenty-four-different-configuration pet kennel, for cooling the twenty-four-different-configuration pet kennel
(see FIG. 45C);
a wind circulator
for redirecting wind flow from flowing horizontally, into the first wind-circulating sail 114*a* and the second wind-circulating sail 115*a* being disposed side-by-side atop the twenty-four-different-configuration pet kennel, to flowing downward, into the twenty-four-different-configuration pet kennel, for cooling the inside of the twenty-four-different-configuration pet kennel
(see FIG. 45D); and
a wind circulator
for redirecting wind flow from flowing horizontally, into the first wind-circulating sail 114*a* and the second wind-circulating sail 115*a* being disposed longitudinally atop the twenty-four-different-configuration pet kennel, to flowing downward, into the twenty-four-different-configuration pet kennel, for cooling the twenty-four-different-configuration pet kennel
(see FIG. 45E).

b) Can not function as a wind blocker
(attached to the at-least-twenty-four-different-configuration pet kennel in many different way),
to catch and redirect rain water in the direction of arrows 123*a* and 123*b* to flow in many different directions and elevations
(See FIGS. 38A, 38B, 38C, 38D, and 38E), and
to block wind upward, downward, sideway, and in opposite directions through the at-least-twenty-four-different-configuration pet kennel
(See FIGS. 39, 40, 41, 42, 43, 44, 45A, 45B, 45C, 45D, and 45E);
For example:
a wind blocker attached to the twenty-four-different-configuration pet kennel,
for preventing cold wind from blowing into the twenty-four-different-configuration pet kennel, to keep a pet warm;
a wind blocker
for blocking rain from entering into the twenty-four-different-configuration pet kennel, to keep a pet dry;
a wind blocker
for providing privacy to multiple pets inside the twenty-four-different-configuration pet kennel;
a wind blocker
for blocking the sun's heat into the twenty-four-different-configuration pet kennel, to keep a pet cool;
a wind blocker
for isolating the twenty-four-different-configuration pet kennels, to keep pets therein isolated; and
a wind blocker
for providing an acoustic wall between multiple twenty-four-different-configuration pet kennels, to reduce noise.
c) Can not function as a roof and gutter
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C);
For example:
a gutter
for collecting rain water
(see FIGS. 38A, 38B, 38C, and 38D);
a gutter
for circulating rain water to prevent the rain water from pooling up
(see FIGS. 38A, 38B, 38C, and 38D); and
a gutter
for redirecting rain water, to flow in many predetermined directions and elevations
(see FIGS. 38A, 38B, 38C, and 38D).
d) Can not function as a gutter spout
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C); and
For example:
a gutter spout, configured by rolling a first six-function panel 102 or a second six-function panel 103 into a tube shape, and banding a for leading rain water in a predetermined direction
(see FIGS. 38B, 38C, and 38D);
a gutter spout
for leading rain water away from the twenty-four-different-configuration kennel, to keep the twenty-four-different-configuration pet kennel dry
(see FIGS. 38A, 38B, 38C, and 38D);
a gutter spout
for leading rain water away from the twenty-four-different-configuration pet
kennel, to prevent the rain water from pooling up
(see FIGS. 38B, 38C, and 38D); and
a gutter spout
for leading rain water away from the twenty-four-different-configuration pet kennel, to prevent the twenty-four-different-configuration pet kennel from rusting.
e) Can not function as a roof cover, wall cover, floor cover, patio cover, and stilt cover
(attached to the at-least-twenty-four-different-configuration pet kennel in many different way),
to catch and redirect rain water in the direction of arrows 123a and 123b to flow in many different directions and elevations
(FIGS. 38A, 38B, and 38C).
For example:
a cover
for partially covering seven first six-function panels 102 and the four second six-function panels 103;
a cover
for protecting a pet from rain
(see FIGS. 38E and 46);
a cover
for shielding a pet from the sun, and
(see FIG. 46);
a cover
for providing privacy to a pet from people
(see FIG. 46).
4) No prior art mention or disclose any pet kennels, having
a second wind-circulating sail 115a.
Therefore, the prior art of pet kennel:
a) Can not function as a wind circulator
(attached to the at-least-twenty-four-different-configuration pet kennel in many different way)
to catch and redirect rain water in the direction of arrows 123a and 123b (See FIGS. 38A, 38B, 38C, 38D, and 38E)
to flow in many different directions and elevations, and
to circulate wind in the direction of arrows 124a and 124b, upward, downward, sideway, and in opposite directions through the at-least-twenty-four-different-configuration pet kennel
(See FIGS. 39, 40, 41, 42, 43, 44, 45A, 45B, 45C, 45D, and 45E);
For example:
a wind circulator
for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
(see FIG. 39);
a wind circulator
for redirecting wind flow from flowing horizontally, to flowing upward, into the twenty-four-different-configuration pet kennel, for cooling the twenty-four-different-configuration pet kennel
(see FIG. 41);
a wind circulator
for redirecting wind flow from flowing horizontally to flowing downward, to flowing horizontally, to flowing upward, into the twenty-four-different-configuration pet kennel, for cooling the twenty-four-different-configuration pet kennel
(see FIG. 42);
a wind circulator
for redirecting wind flow from flowing horizontally, to flowing upward, into the patio of the twenty-four-different-configuration pet kennel, for cooling the twenty-four-different-configuration pet kennel
(see FIG. 43);
a wind circulator
for redirecting wind flow from flowing horizontally, to flowing downward, into the twenty-four-different-configuration pet kennel, for cooling the twenty-four-different-configuration pet kennel
(see FIG. 44);
a wind circulator
for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
(see FIG. 45A);
a wind circulator
for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel
(see FIG. 45B);
a wind circulator
for redirecting wind flow from oppositely flowing horizontally, to flowing into the twenty-four-different-configuration pet kennel, for cooling the twenty-four-different-configuration pet kennel
(see FIG. 45C);
a wind circulator
for redirecting wind flow from flowing horizontally, into the first wind-circulating sail 114a and the second wind-circulating sail 115a being disposed side-by-side atop the twenty-four-different-configuration pet kennel, to flowing downward, into the twenty-four-different-configuration pet kennel, for cooling the inside of the twenty-four-different-configuration pet kennel
(see FIG. 45D); and
a wind circulator
for redirecting wind flow from flowing horizontally, into the first wind-circulating sail 114*a* and the second wind-circulating sail 115*a* being disposed longitudinally atop the twenty-four-different-configuration pet kennel, to flowing downward, into the twenty-four-different-configuration pet kennel, for cooling the twenty-four-different-configuration pet kennel
(see FIG. 45E).

b) Can not function as a wind blocker
(attached to the at-least-twenty-four-different-configuration pet kennel in many different way),
to catch and redirect rain water in the direction of arrows 123*a* and 123*b* to flow in many different directions and elevations
(See FIGS. 38A, 38B, 38C, 38D, and 38E), and
to block wind upward, downward, sideway, and in opposite directions through the at-least-twenty-four-different-configuration pet kennel
(See FIGS. 39, 40, 41, 42, 43, 44, 45A, 45B, 45C, 45D, and 45E);
For example:
a wind blocker attached to the twenty-four-different-configuration pet kennel,
for preventing cold wind from blowing into the twenty-four-different-configuration pet kennel, to keep a pet warm;
a wind blocker
for blocking rain from entering into the twenty-four-different-configuration pet kennel, to keep a pet dry;
a wind blocker
for providing privacy to multiple pets inside the twenty-four-different-configuration pet kennel;
a wind blocker
for blocking the sun's heat into the twenty-four-different-configuration pet kennel, to keep a pet cool;
a wind blocker
for isolating the twenty-four-different-configuration pet kennels, to keep pets therein isolated; and
a wind blocker
for providing an acoustic wall between multiple twenty-four-different-configuration pet kennels, to reduce noise.

c) Can not function as a roof and gutter
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C);
For example:
a gutter
for collecting rain water
(see FIGS. 38A, 38B, 38C, and 38D);
a gutter
for circulating rain water to prevent the rain water from pooling up
(see FIGS. 38A, 38B, 38C, and 38D); and
a gutter
for redirecting rain water, to flow in many predetermined directions and elevations
(see FIGS. 38A, 38B, 38C, and 38D).

d) Can not function as a gutter spout
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C); and
For example:
a gutter spout, configured by rolling a first six-function panel 102 or a second six-function panel 103 into a tube shape, and banding a
for leading rain water in a predetermined direction
(see FIGS. 38B, 38C, and 38D);
a gutter spout
for leading rain water away from the twenty-four-different-configuration kennel, to keep the twenty-four-different-configuration pet kennel dry
(see FIGS. 38A, 38B, 38C, and 38D);
a gutter spout
for leading rain water away from the twenty-four-different-configuration pet
kennel, to prevent the rain water from pooling up
(see FIGS. 38B, 38C, and 38D); and
a gutter spout
for leading rain water away from the twenty-four-different-configuration pet kennel, to prevent the twenty-four-different-configuration pet kennel from rusting.

e) Can not function as a roof cover, wall cover, floor cover, patio cover, and stilt
cover (attached to the at-least-twenty-four-different-configuration pet kennel in many different ways),
to catch and redirect rain water in the direction of arrows 123*a* and 123*b* to flow in many different directions and elevations
(FIGS. 38A, 38B, and 38C).
For example:
a cover
for partially covering seven first six-function panels 102 and the four second six-function panels 103;
a cover
for protecting a pet from rain
(see FIGS. 38E and 46);
a cover
for shielding a pet from the sun, and
(see FIG. 46);
a cover
for providing privacy to a pet from people
(see FIG. 46).

5) No prior art mention or disclose any pet kennels, having
panel-tube legs 110*a*.
Therefore, the prior art of pet kennel:
a) Can not lift the at-least-twenty-four-different-configuration pet kennel, to allow cleaning thereunder;
b) Can not protect a floor surface under the at-least-twenty-four-different-configuration pet kennel from being scratched;

c) Can not plug the tube bottoms of seven first six-function panels, four second six-function panels, and door panel,
  to prevent fleas and ticks from hiding inside the tube bottoms from sprays, and thus from being able to get right back on pets; and
d) Can not dampen the bottom contact points of the at-least-twenty-four-different-configuration pet kennel,
  to provide shock-absorption and reduced impact upon floors, vehicles, and other surfaces, when placed and/or transported thereupon.

6) No prior art mention or disclose any pet kennels, having
  tick-blocking teeth 111.
  Therefore, the prior art of pet kennel:
    a) Can not prevent ticks from entering through water-draining holes,
      to prevent ticks from avoiding tick-killing spray;
    b) Can not prevent ticks from entering through water-draining holes,
      to prevent ticks from hiding therein
      (See FIG. 9B); and
    c) Can not prevent ticks from hiding inside,
      to protect pets from tick diseases
      (See FIG. 9B).

7) No prior art mention or disclose any pet kennels, having
  water-draining holes 112.
  Therefore, the prior art of pet kennel:
    a) Can not allow water and condensation to drip downward,
      to prevent rusting
      (See FIG. 9A);
    b) Can not allow condensation and rain water to drain away,
      to prevent rusting
      (See FIG. 9A); and
    c) Can not allow condensation to evaporate,
      to prevent rusting.

8) No prior art mention or disclose any pet kennels, having
  J-shaped clamps 119.
  Therefore, the prior art of pet kennel:
    a) Can not angledly clamp seven first six-function panels, four second six-function panels, and/or door panel together,
      to create at least twenty four different kennel-configurations for at least twenty four different purposes;
    b) Can not clamp seven first six-function panels, four second six-function panels, and/or door panel together,
      to create at least twenty four different kennel-configurations for at least twenty four different purposes;
    c) Can not fasten seven first six-function panels, to four second six-function panels, and/or door panel,
      to secure panels together without requiring the use of tools; and
    d) Can not couple seven first six-function panels, to four second six-function panels, and/or door panel,
      to be disposed independently at any position upon the perimeters thereof, respectively.

9) No prior art mention or disclose any pet kennels, having
  W-shaped clamps 120.
  Therefore, the prior art of pet kennel:
    a) Can not clamp seven first six-function panels, four second six-function panels, and/or door panel together,
      to create at least twenty four different kennel-configurations for at least twenty four different purposes;
    b) Can not fasten seven first six-function panels, to four second six-function panels, and/or door panel,
      to secure panels together without requiring the use of tools; and
    c) Can not couple seven first six-function panels, to four second six-function panels and/or door panel,
      to be disposed independently at any position upon the perimeters thereof, respectively.

Objects and Advantages of the Invention

The present invention substantially departs from the conventional concepts and designs of the prior art. In doing so, the present invention provides a at-least-twenty-four-different-configuration pet kennel, (having: a) Six-function twenty-four-configuration panel system, b) Panel-tube-cap-and-leg systems, c) Wind-circulating sail system, and d) Clamp systems), having many unique and significant features, functions, and advantages, which overcome all the disadvantages of the prior art, as follows:

1) It is an object of the present invention to provide an at-least-twenty-four-different-configuration pet kennel, having
  seven first six-function panels 102.
  Therefore, the at-least-twenty-four-different-configuration pet kennel:
    a) Can function as an angled-stilt panel,
      to raise the at-least-twenty-four-different-configuration pet kennel above the ground to keep pets above wet ground, puddles, or uncomfortable terrain,
      to create large-footprint stilts to stabilize the at-least-twenty-four-different-configuration pet kennel, and
      to create unique entries, exits, and windows
      (see FIGS. 14, 15, 16, and 17);
    b) Can function as a multi-story floor panel,
      to create multiple stories for multiple pets to rest in comfort, and
      to separate multiple pets from each other
      (see FIGS. 14, 15, 16, and 17);
    c) Can function as a door panel,
      to hinge door
      (see FIGS. 14, 15, 16, and 17);
    d) Can function as a window panel,
      to form a window
      (see FIGS. 14, 15, 16, and 17);
    e) Can function as a roof panel,
      to provide shelter from the rain and other weather elements
      (see FIGS. 14, 15, 16, and 17);
    f) Can function as a wall panel,
      to create a temporary enclosement
      (see FIGS. 14, 15, 16, and 17);

g) Can function as a patio panel,
   to allow pets to rest above the ground outside the at-least-twenty-four-different-configuration pet kennel
   (see FIGS. 18 and 21); and
h) Can function in a combination with four second six-function panels 103,
   to form at least twentyfour configurations of the at-least-twenty-four-different-configuration pet kennel such;
   For example:
   an angled-stilt multi-story-roof-and-floor octagon configuration
   (see FIG. 14),
   an angled-stilt multi-story-floor octagon configuration
   (see FIG. 15),
   a parallel-stilt multi-story-roof-and-floor octagon configuration
   (see FIG. 16),
   a parallel-stilt panel multi-story-floor octagon configuration
   (see FIG. 17),
   a opposite-patio multi-kennel configuration
   (see FIG. 18),
   a joint-patio multi-kennel configuration
   (see FIG. 19),
   a parallel-stilt square configuration
   (see FIG. 20),
   a opposite-patio single-kennel configuration
   (see FIG. 21),
   a symmetric-octagon configuration
   (see FIG. 22),
   a asymmetric-octagon configuration
   (see FIG. 23),
   a T-shaped configuration
   (see FIG. 24),
   a X-shaped configuration
   (see FIG. 25),
   a L-shaped configuration
   (see FIG. 26),
   a three-sided corner-configuration
   (see FIG. 27),
   an I-shaped configuration
   (see FIG. 28),
   a rectangular configuration
   (see FIG. 29),
   a square configuration
   (see FIG. 30),
   a three-sided side-door configuration
   (see FIG. 31),
   an asymmetrical L-shaped configuration
   (see FIG. 32),
   a symmetrical L-shaped configuration
   (see FIG. 33),
   an asymmetrical T-shaped configuration
   (see FIG. 34),
   a symmetrical T-shaped configuration
   (see FIG. 35),
   a asymmetric five-sided configuration
   (see FIG. 36), and
   a symmetric seven-sided configuration
   (see FIG. 37).

2) It is another object of the present invention to provide an at-least-twenty-four-different-configuration pet kennel, having
   four second six-function panels 103.

Therefore, the at-least-twenty-four-different-configuration pet kennel:
a) Can function as an angled-stilt panel,
   to raise the at-least-twenty-four-different-configuration pet kennel above the ground to keep pets above wet ground, puddles, or uncomfortable terrain,
   to create large-footprint stilts to stabilize the at-least-twenty-four-different-configuration pet kennel, and
   to create unique entries, exits, and windows
   (see FIGS. 14, 15, 16, and 17);
b) Can function as a multi-story floor panel,
   to create multiple stories for multiple pets to rest in comfort, and
   to separate multiple pets from each other
   (see FIGS. 14, 15, 16, and 17);
c) Can function as a door panel,
   to hinge door
   (see FIGS. 14, 15, 16, and 17);
d) Can function as a window panel,
   to form a window
   (see FIGS. 14, 15, 16, and 17);
e) Can function as a roof panel,
   to provide shelter from the rain and other weather element
   (see FIGS. 14, 15, 16, and 17);
f) Can function as a wall panel,
   to create a temporary enclosement
   (see FIGS. 14, 15, 16, and 17);
g) Can function as a patio panel,
   to allow pets to rest above the ground outside the at-least-twenty-four-different-configuration pet kennel
   (see FIGS. 18 and 21); and
h) Functioning in a various configurations with seven first six-function panels 102
   to form at least twentyfour configurations of the at-least-twenty-four-different-configuration pet kennel,
   For example:
   an angled-stilt multi-story-roof-and-floor octagon configuration
   (see FIG. 14),
   an angled-stilt multi-story-floor octagon configuration
   (see FIG. 15),
   a parallel-stilt multi-story-roof-and-floor octagon configuration
   (see FIG. 16),
   a parallel-stilt panel multi-story-floor octagon configuration
   (see FIG. 17),
   a opposite-patio multi-kennel configuration
   (see FIG. 18),
   a joint-patio multi-kennel configuration
   (see FIG. 19),
   a parallel-stilt square configuration
   (see FIG. 20),
   a opposite-patio single-kennel configuration
   (see FIG. 21),
   a symmetric-octagon configuration
   (see FIG. 22),
   a asymmetric-octagon configuration
   (see FIG. 23),
   a T-shaped configuration
   (see FIG. 24), a X-shaped configuration
(see FIG. 25),
a L-shaped configuration
(see FIG. 26),
a three-sided corner-configuration
(see FIG. 27),
an I-shaped configuration
(see FIG. 28),
a rectangular configuration
(see FIG. 29),
a square configuration
(see FIG. 30),
a three-sided side-door configuration
(see FIG. 31),
an asymmetrical L-shaped configuration
(see FIG. 32),
a symmetrical L-shaped configuration
(see FIG. 33),
an asymmetrical T-shaped configuration
(see FIG. 34),
a symmetrical T-shaped configuration
(see FIG. 35),
a asymmetric five-sided configuration
(see FIG. 36), and
a symmetric seven-sided configuration
(see FIG. 37).

3) It is a further object of the present invention to provide an at-least-twenty-four-different-configuration pet kennel, having
a first wind-circulating sail 114a.
Therefore, the at-least-twenty-four-different-configuration pet kennel:
a) Can function as a wind circulator
(attached to the at-least-twenty-four-different-configuration pet kennel in many different way),
to catch and redirect rain water in the direction of arrows 123a and 123b (See FIGS. 38A, 38B, 38C, 38D, and 38E)
to flow in many different directions and elevations, and
to circulate wind in the direction of arrows 124a and 124b, upward, downward, sideway, and in opposite directions through the at-least-twenty-four-different-configuration pet kennel
(See FIGS. 39, 40, 41, 42, 43, 44, 45A, 45B, 45C, 45D, and 45E);
For example:
a wind circulator
for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
(see FIG. 39);
a wind circulator
for redirecting wind flow from flowing horizontally, to flowing upward, into the twenty-four-different-configuration pet kennel, for cooling the twenty-four-different-configuration pet kennel
(see FIG. 41);
a wind circulator
for redirecting wind flow from flowing horizontally to flowing downward, to flowing horizontally, to flowing upward, into the twenty-four-different-configuration pet kennel, for cooling the twenty-four-different-configuration pet kennel
(see FIG. 42);
a wind circulator
for redirecting wind flow from flowing horizontally, to flowing upward, into the patio of the twenty-four-different-configuration pet kennel, for cooling the twenty-four-different-configuration pet kennel
(see FIG. 43);
a wind circulator
for redirecting wind flow from flowing horizontally, to flowing downward, into the twenty-four-different-configuration pet kennel, for cooling the twenty-four-different-configuration pet kennel
(see FIG. 44);
a wind circulator
for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
(see FIG. 45A);
a wind circulator
for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel
(see FIG. 45B);
a wind circulator
for redirecting wind flow from oppositely flowing horizontally, to flowing into the twenty-four-different-configuration pet kennel, for cooling the twenty-four-different-configuration pet kennel
(see FIG. 45C);
a wind circulator
for redirecting wind flow from flowing horizontally, into the first wind-circulating sail 114a and the second wind-circulating sail 115a being disposed side-by-side atop the twenty-four-different-configuration pet kennel, to flowing downward, into the twenty-four-different-configuration pet kennel, for cooling the inside of the twenty-four-different-configuration pet kennel
(see FIG. 45D); and
a wind circulator
for redirecting wind flow from flowing horizontally, into the first wind-circulating sail 114a and the second wind-circulating sail 115a being disposed longitudinally atop the twenty-four-different-configuration pet kennel, to flowing downward, into the twenty-four-different-configuration pet kennel, for cooling the twenty-four-different-configuration pet kennel
(see FIG. 45E).

b) Can function as a wind blocker
(attached to the at-least-twenty-four-different-configuration pet kennel in many different way),
to catch and redirect rain water in the direction of arrows 123*a* and 123*b* to flow in many different directions and elevations
(See FIGS. 38A, 38B, 38C, 38D, and 38E), and
to block wind upward, downward, sideway, and in opposite directions through the at-least-twenty-four-different-configuration pet kennel
(See FIGS. 39, 40, 41, 42, 43, 44, 45A, 45B, 45C, 45D, and 45E);
For example:
a wind blocker attached to the twenty-four-different-configuration pet kennel,
for preventing cold wind from blowing into the twenty-four-different-configuration pet kennel, to keep a pet warm;
a wind blocker
for blocking rain from entering into the twenty-four-different-configuration pet kennel, to keep a pet dry;
a wind blocker
for providing privacy to multiple pets inside the twenty-four-different-configuration pet kennel;
a wind blocker
for blocking the sun's heat into the twenty-four-different-configuration pet kennel, to keep a pet cool;
a wind blocker
for isolating the twenty-four-different-configuration pet kennels, to keep pets therein isolated; and
a wind blocker
for providing an acoustic wall between multiple twenty-four-different-configuration pet kennels, to reduce noise;
c) Can function as a roof and gutter
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C);
For example:
a gutter
for collecting rain water
(see FIGS. 38A, 38B, 38C, and 38D);
a gutter
for circulating rain water to prevent the rain water from pooling up
(see FIGS. 38A, 38B, 38C, and 38D); and
a gutter
for redirecting rain water, to flow in many predetermined directions and elevations
(see FIGS. 38A, 38B, 38C, and 38D);
d) Can function as a gutter spout
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C); and
For example:
a gutter spout, configured by rolling a first six-function panel 102 or a second six-function panel 103 into a tube shape, and banding a
for leading rain water in a predetermined direction
(see FIGS. 38B, 38C, and 38D);
a gutter spout
for leading rain water away from the twenty-four-different-configuration kennel, to keep the twenty-four-different-configuration pet kennel dry
(see FIGS. 38A, 38B, 38C, and 38D);
a gutter spout
for leading rain water away from the twenty-four-different-configuration pet kennel, to prevent the rain water from pooling up
(see FIGS. 38B, 38C, and 38D); and
a gutter spout
for leading rain water away from the twenty-four-different-configuration pet kennel, to prevent the twenty-four-different-configuration pet kennel from rusting;
e) Can function as a roof cover, wall cover, floor cover, patio cover, and stilt cover
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C);
For example:
a cover
for partially covering seven first six-function panels 102 and the four second six-function panels 103;
a cover
for protecting a pet from rain
(see FIGS. 38E and 46);
a cover
for shielding a pet from the sun, and
(see FIG. 46);
a cover
for providing privacy to a pet from people
(see FIG. 46).
4) It is an even further object of the present invention to provide an at-least-twenty-four-different-configuration pet kennel, having
a second wind-circulating sail 115*a*.
Therefore, the at-least-twenty-four-different-configuration pet kennel:
a) Can function as a wind circulator
(attached to the at-least-twenty-four-different-configuration pet kennel in many different way),
to catch and redirect rain water in the direction of arrows 123*a* and 123*b* (See FIGS. 38A, 38B, 38C, 38D, and 38E),
to flow in many different directions and elevations, and
to circulate wind in the direction of arrows 124*a* and 124*b*, upward, downward, sideway, and in opposite directions through the at-least-twenty-four-different-configuration pet kennel
(See FIGS. 39, 40, 41, 42, 43, 44, 45A, 45B, 45C, 45D, and 45E);

For example:
a wind circulator
- for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
  (see FIG. 39);

a wind circulator
- for redirecting wind flow from flowing horizontally, to flowing upward, into the twenty-four-different-configuration pet kennel, for cooling the twenty-four-different-configuration pet kennel
  (see FIG. 41);

a wind circulator
- for redirecting wind flow from flowing horizontally to flowing downward, to flowing horizontally, to flowing upward, into the twenty-four-different-configuration pet kennel, for cooling the twenty-four-different-configuration pet kennel
  (see FIG. 42);

a wind circulator
- for redirecting wind flow from flowing horizontally, to flowing upward, into the patio of the twenty-four-different-configuration pet kennel, for cooling the twenty-four-different-configuration pet kennel
  (see FIG. 43);

a wind circulator
- for redirecting wind flow from flowing horizontally, to flowing downward, into the twenty-four-different-configuration pet kennel, for cooling the twenty-four-different-configuration pet kennel
  (see FIG. 44);

a wind circulator
- for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
  (see FIG. 45A);

a wind circulator
- for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel
  (see FIG. 45B);

a wind circulator
- for redirecting wind flow from oppositely flowing horizontally, to flowing into the twenty-four-different-configuration pet kennel, for cooling the twenty-four-different-configuration pet kennel
  (see FIG. 45C);

a wind circulator
- for redirecting wind flow from flowing horizontally, into the first wind-circulating sail 114a and the second wind-circulating sail 115a being disposed side-by-side atop the twenty-four-different-configuration pet kennel, to flowing downward, into the twenty-four-different-configuration pet kennel, for cooling the inside of the twenty-four-different-configuration pet kennel
  (see FIG. 45D); and a wind circulator
- for redirecting wind flow from flowing horizontally, into the first wind-circulating sail 114a and the second wind-circulating sail 115a being disposed longitudinally atop the twenty-four-different-configuration pet kennel, to flowing downward, into the twenty-four-different-configuration pet kennel, for cooling the twenty-four-different-configuration pet kennel
  (see FIG. 45E);

b) Can function as a wind blocker
(attached to the at-least-twenty-four-different-configuration pet kennel in many different way),
to catch and redirect rain water in the direction of arrows 123a and 123b to flow in many different directions and elevations
(See FIGS. 38A, 38B, 38C, 38D, and 38E), and to block wind upward, downward, sideway, and in opposite directions through the at-least-twenty-four-different-configuration pet kennel
(See FIGS. 39, 40, 41, 42, 43, 44, 45A, 45B, 45C, 45D, and 45E);

For example:
a wind blocker attached to the twenty-four-different-configuration pet kennel,
- for preventing cold wind from blowing into the twenty-four-different-configuration pet kennel, to keep a pet warm;

a wind blocker
- for blocking rain from entering into the twenty-four-different-configuration pet kennel, to keep a pet dry;

a wind blocker
- for providing privacy to multiple pets inside the twenty-four-different-configuration pet kennel;

a wind blocker
- for blocking the sun's heat into the twenty-four-different-configuration pet kennel, to keep a pet cool;

a wind blocker
- for isolating the twenty-four-different-configuration pet kennels, to keep pets therein isolated; and a wind blocker
- for providing an acoustic wall between multiple twenty-four-different-configuration pet kennels, to reduce noise;

c) Can function as a roof and gutter
(attached to the at-least-twenty-four-different-configuration pet kennel in many different way),
to catch and redirect rain water in the direction of arrows 123a and 123b to flow in many different directions and elevations
(FIGS. 38A, 38B, and 38C);

For example:
a gutter
for collecting rain water
(see FIGS. 38A, 38B, 38C, and 38D);
a gutter
for circulating rain water to prevent the rain water from pooling up
(see FIGS. 38A, 38B, 38C, and 38D); and
a gutter
for redirecting rain water, to flow in many predetermined directions and elevations
(see FIGS. 38A, 38B, 38C, and 38D);
d) Can function as a gutter spout
(attached to the at-least-twenty-four-different-configuration pet kennel in many different way),
to catch and redirect rain water in the direction of arrows 123a and 123b to flow in many different directions and elevations
(FIGS. 38A, 38B, and 38C); and
For example:
a gutter spout, configured by rolling a first six-function panel 102 or a second six-function panel 103 into a tube shape, and banding a
for leading rain water in a predetermined direction
(see FIGS. 38B, 38C, and 38D);
a gutter spout
for leading rain water away from the twenty-four-different-configuration kennel, to keep the twenty-four-different-configuration pet kennel dry
(see FIGS. 38A, 38B, 38C, and 38D);
a gutter spout
for leading rain water away from the twenty-four-different-configuration pet
kennel, to prevent the rain water from pooling up
(see FIGS. 38B, 38C, and 38D); and
a gutter spout
for leading rain water away from the twenty-four-different-configuration pet kennel, to prevent the twenty-four-different-configuration pet kennel from rusting;
e) Can function as a roof cover, wall cover, floor cover, patio cover, and stilt cover
(attached to the at-least-twenty-four-different-configuration pet kennel in many different way),
to catch and redirect rain water in the direction of arrows 123a and 123b, to flow in many different directions and elevations
(FIGS. 38A, 38B, and 38C);
For example:
a cover
for partially covering seven first six-function panels 102 and the four second six-function panels 103;
a cover
for protecting a pet from rain
(see FIGS. 38E and 46);
a cover
for shielding a pet from the sun, and
(see FIG. 46);
a cover
for providing privacy to a pet from people
(see FIG. 46).
5) It is another object of the present invention to provide an at-least-twenty-four-different-configuration pet kennel, having
panel-tube legs 110a.

Therefore, the at-least-twenty-four-different-configuration pet kennel:
a) Can lift the at-least-twenty-four-different-configuration pet kennel,
to allow cleaning thereunder;
b) Can protect a floor surface under the at-least-twenty-four-different-configuration pet kennel from being scratched;
c) Can plug the tube bottoms of seven first six-function panels, four second six-function panels, and door panel,
to prevent fleas and ticks from hiding inside the tube bottoms from sprays, and thus from being able to get right back on pets; and
d) Can dampen the bottom contact points of the at-least-twenty-four-different-configuration pet kennel,
to provide shock-absorption and reduced impact upon floors, vehicles, and other surfaces, when placed and/or transported thereupon.
6) It is another object of the present invention to provide an at-least-twenty-four-different-configuration pet kennel, having
tick-blocking teeth 111.
Therefore, the at-least-twenty-four-different-configuration pet kennel:
a) Can prevent ticks from entering through water-draining holes,
to prevent ticks from avoiding tick-killing spray;
b) Can prevent ticks from entering through water-draining holes,
to prevent ticks from hiding therein
(See FIG. 9B); and
c) Can prevent ticks from hiding inside,
to protect pets from tick diseases
(See FIG. 9B).
7) It is yet another object of the present invention to provide an at-least-twenty-four-different-configuration pet kennel, having
water-draining holes 112.
Therefore, the at-least-twenty-four-different-configuration pet kennel:
a) Can allow water and condensation to drip downward,
to prevent rusting
(See FIG. 9A);
b) Can allow condensation and rain water to drain away,
to prevent rusting
(See FIG. 9A); and
c) Can allow condensation to evaporate,
to prevent rusting.
8) It is still yet another object of the present invention to provide an at-least-twenty-four-different-configuration pet kennel, having
J-shaped clamps 119.
Therefore, the at-least-twenty-four-different-configuration pet kennel:
a) Can angledly clamp seven first six-function panels, four second six-function panels, and/or door panel together,
to create at least twenty four different kennel-configurations for at least twenty four different purposes;
b) Can clamp seven first six-function panels, four second six-function panels, and/or door panel together, to create at least twenty four different kennel-configurations for at least twenty four different purposes;

c) Can fasten seven first six-function panels, to four second six-function panels, and/or door panel, to secure panels together without requiring the use of tools; and d) Can couple seven first six-function panels, to four second six-function panels, and/or door panel, to be disposed independently at any position upon the perimeters thereof, respectively.

9) It is still yet an even further object of the present invention to provide an at-least-twenty-four-different-configuration pet kennel, having
W-shaped clamps 120.

Therefore, the at-least-twenty-four-different-configuration pet kennel:

a) Can clamp seven first six-function panels, four second six-function panels, and/or door panel together,
to create at least twenty four different kennel-configurations for at least twenty four different purposes;

b) Can fasten seven first six-function panels, to four second six-function panels, and/or door panel, to secure panels together without requiring the use of tools; and c) Can couple seven first six-function panels, to four second six-function panels and/or door panel, to be disposed independently at any position upon the perimeters thereof, respectively.

Other objects and advantages of the present invention will become apparent from a consideration of the accompanying drawings and ensuing description.

SUMMARY OF THE INVENTION

A twenty-four-different-configuration pet kennel comprises seven first six-function panels, four second six-function panels, a door panel, a door, J-shaped clamps and W-shaped clamps (for angledly and parallelly clamping seven first six-function panels and four second six-function panels together), panel-tube legs (for plugging the bottom ends of seven first six-function panels and four second six-function panels to absorb shocks and vibrations), tick-blocking teeth (molded inside the panel-tube legs to prevent ticks from entering and hiding inside seven first six-function panels and four second six-function panels), and first and second wind-circulating sails (attached to seven first six-function panels and four second six-function panels to redirect and circulate wind and rain water in multiple different directions and multiple opposite directions into and out of the twenty-four-different-configuration pet kennel, to block the sun, and also to function as a rain water gutter and gutter spout). Seven first six-function panels and four second six-function panels can function as 1) stilts, 2) floors, 3) windows, 4) roofs, 5) walls, and 6) patios (to assemble at least twenty four different configurations of the twenty-four-different-configuration pet kennel).

BRIEF DESCRIPTION OF THE DRAWINGS

FIGS. 3A and 3B illustrate perspective views of the first and second wind-circulating sails, the first and second wing-circulating grommets and the first and second hook-and-loop velcro straps.

FIG. 4 illustrates perspective views of the first and second wind-circulating ball ties.

FIGS. 7 and 8 illustrate front views of how the panel-tube caps and panel-tube legs attach to the first six-function panel and the second six-function panel.

FIGS. 9A and 9B illustrate cross sectional views of the tick-blocking teeth (to prevent ticks from entering into the panel-tube leg), water-draining holes, panel-tube legs, and legs rings.

FIGS. 10A and 10B illustrate perspective views of the clamp system, demonstrating how the J-shaped clamp, W-shaped clamp, square-head screw, and wing-nut function together.

FIGS. 11A, 11B, and 11C illustrate perspective and front views of how the clamp system connects first six-function panels, second six-function panels, and door panels together.

FIGS. 12A, 12B, and 13 illustrate perspective views of how the U-shaped door latch, door, door panel, and two door hinges are connected together.

FIGS. 38A, 38B, 38C, and 38D illustrate perspective views of the first and second wind-circulating sails functioning as a gutter and gutter spout to catch and redirect rain water to flow in many different directions and elevations.

FIGS. 39, 40, 41, 42, 43, 44, 45A, 45B, 45C, 45D, and 45E illustrate front and perspective views of the first and second wind-circulating sails functioning as a wind blocker and wind circulator to redirect the wind from the outside of the kennels to the inside of the kennels to cool down animals.

FIGS. 46 and 47 illustrate perspective views of how the first and second wind-circulating sails function as covers for all the six-function twenty-four-configuration panels and door panels.

DETAILED DESCRIPTION OF THE INVENTION

Component

Figure 1:
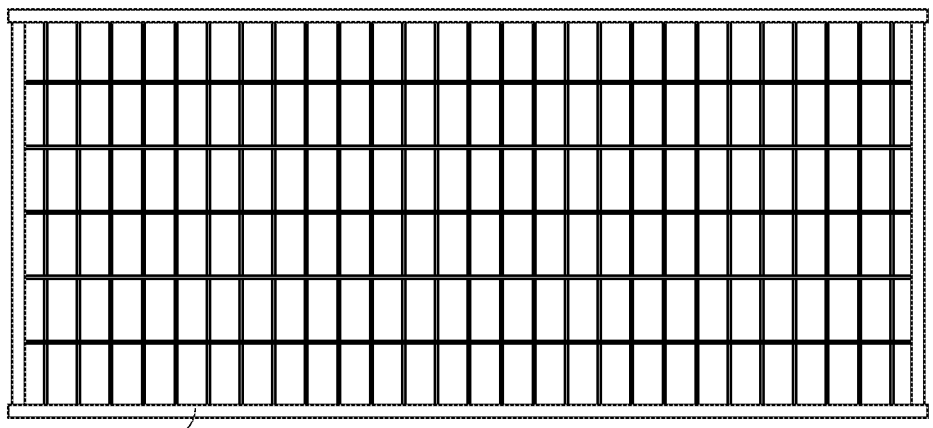
FIGS. 1 and 2 illustrate front views of a first six-function panel and a second six-function panel.
Figure 2:
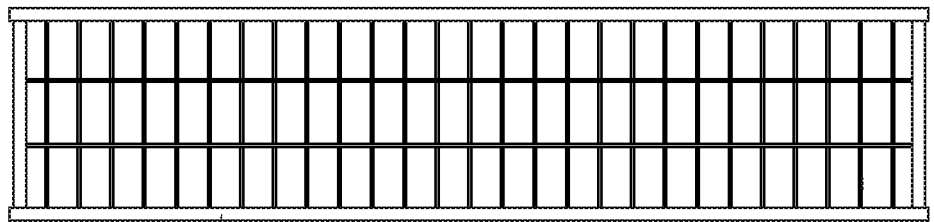
Figure 6:
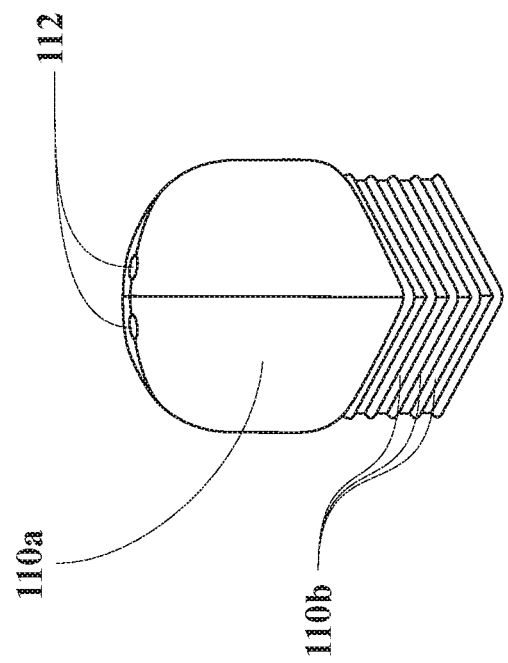
FIGS. 5 and 6 illustrate perspective views of a panel-tube cap, cap rings, a panel-tube leg, leg rings, and water-draining holes.
Figure 5:
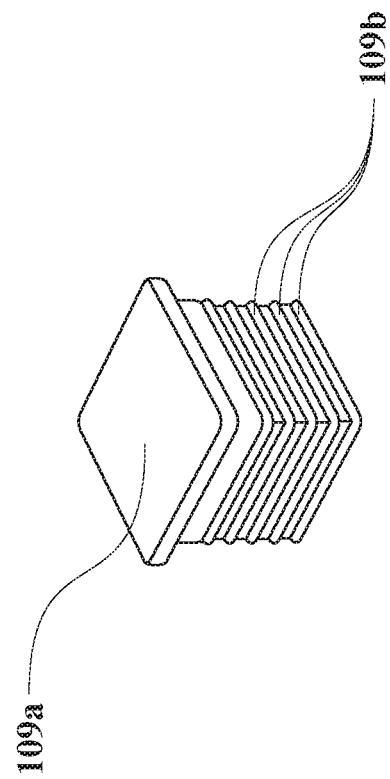
Figure 11B:
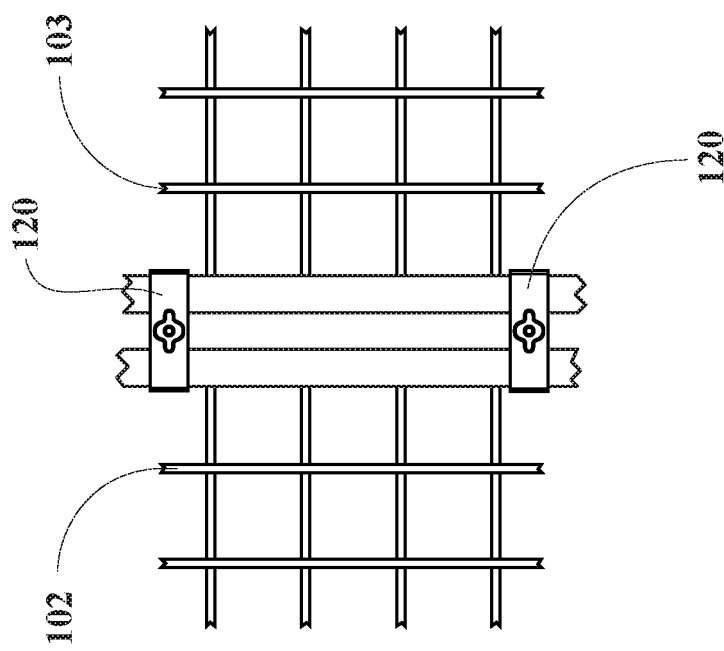
Figure 11A:
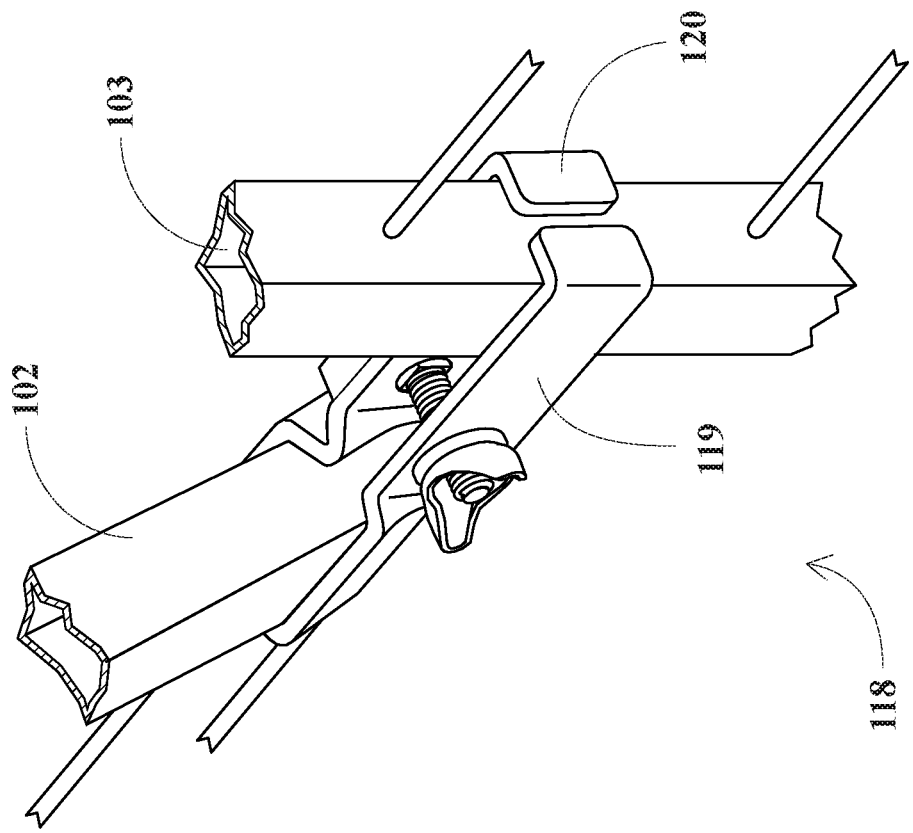
Figure 13:
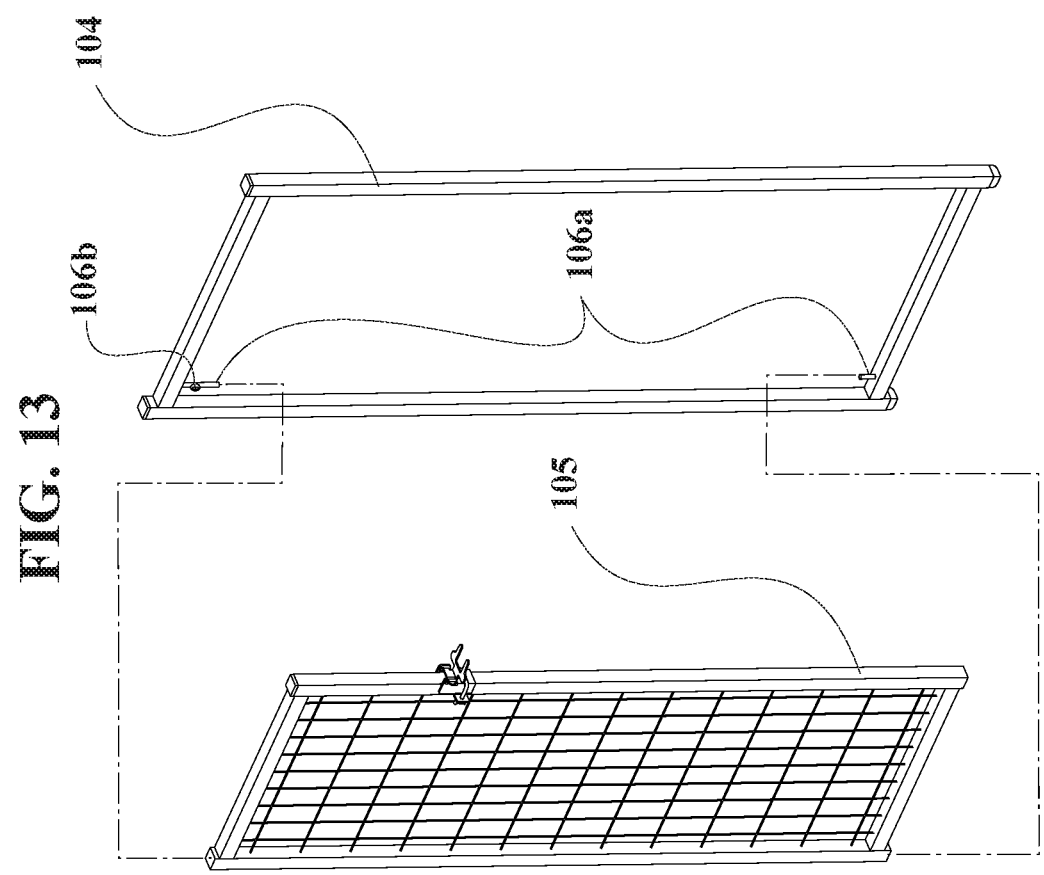
Figure 12B:
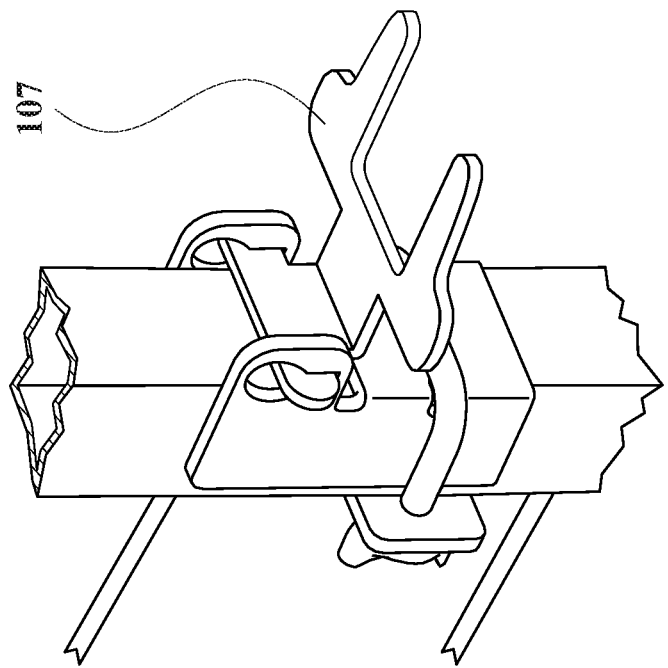

A panel of the at-least-twenty-four-different-configuration pet kennel for at least twenty four different purposes (having angled clamp system, parallel clamp system, angled stilt system, parallel stilt system, wind-circulating sail system, and rain-circulating gutter system) can function as:
1) Angled-Stilt Panel,
2) Parallel-Stilt Panel,
3) Multi-Story Floor Panel,
4) Door Panel,
5) Window Panel,
6) Roof Panel,
7) Wall Panel, and
8) Patio Panel.

A sail of the at-least-twenty-four-different-configuration pet kennel for at least twenty four different purposes (having angled clamp system, parallel clamp system, angled stilt system, parallel stilt system, wind-circulating sail system, and rain-circulating gutter system) can function as:
1) Wind Circulator,
2) Wind Blocker,
3) Roof and Gutter,
4) Gutter Spout,
5) Roof Cover,
6) Wall Cover,
7) Floor Cover, and
8) Patio Cover.

The at-least-twenty-four-different-configuration pet kennel has:
1) Angled Clamp System,
2) Parallel Clamp System,
3) Angled Stilt System,
4) Parallel Stilt System,
5) Wind-Circulating Sail System, and
6) Rain-Circulating Gutter System.

Referring to FIGS. 1, 2, 3A, 3B, 4, 5, 6, 7, 8, 9A, 9B, 10A, 10B, 11A, 11B, 11C, 12A, 12B, and 13, the at-least-twenty-four-different-configuration pet kennel for at least twenty four different purposes (having angled clamp system, parallel clamp system, angled stilt system, parallel stilt system, wind-circulating sail system, and rain-circulating gutter system) comprises:
1) Six-function, twenty-four-configuration panel system 101, comprising:
2) Seven first six-function panels 102,
3) Four second six-function panels 103,
4) One door panel 104,
5) One door 105,
6) Two door hinges 106a,
One door screw 106b, and
7) One U-shaped door latch 107;
8) Panel-tube-cap-and-leg systems 108, respectively comprising:
9) Panel-tube caps 109a,
Cap rings 109b,
10) Panel-tube legs 110a,
Leg rings 110b,
11) Tick-blocking teeth 111, and
12) Water-draining holes 112;
13) Wind-circulating sail system 113, comprising:
14) First wind-circulating sail 114a,
First wind-circulating grommets 114b,
First wind-circulating ball ties 114c,
15) Second wind-circulating sail 115a,
Second wind-circulating grommets 115b,
Second wind-circulating ball ties 115c,
16) First hook-and-loop velcro straps 116, and
17) Second hook-and-loop velcro straps 117; and
18) Clamp systems 118, respectively comprising:
19) J-shaped clamps 119,
20) W-shaped clamps 120,
21) Square-head screws 121, and
22) Wing-nuts 122.

Material

Referring to FIGS. 1, 2, 3A, 3B, 4, 5, 6, 7, 8, 9A, 9B, 10A, 10B, 11A, 11B, 11C, 12A, 12B, and 13:
1) Six-function twenty-four-configuration panel system 101 is made of the combined materials of its components.
2) Seven first six-function panels 102
each are made of metallic material.
3) Four second six-function panels 103
each are made of metallic material.
4) Door panel 104
is made of metallic material.
5) Door 105
is made of metallic material.
6) Two door hinges 106a
each are made of metallic and/or plastic materials.
Door screw 106b
is made of metallic material.
7) U-shaped door latch 107
is made of metallic and/or plastic materials.
8) Panel-tube-cap-and-leg systems 108 each are made of the combined materials of its components.
9) Panel-tube caps 109a
each are made of plastic material.
Cap rings 109b
each are made of plastic material.
10) Panel-tube legs 110a
each are made of plastic material.
Leg rings 110b
each are made of plastic material.
11) Tick-blocking teeth 111
each are made of plastic material.
12) Water-draining holes 112
each are made of empty space.
13) Wind-circulating sail system 113 is made of the combined materials of its components.
14) First wind-circulating sail 114a
is made of plastic, fabric, polyethylene, the like, and/or the equivalent material.
First wind-circulating grommets 114b
each are made of metallic material.
First wind-circulating ball ties 114c
each are made of plastic and elastic materials.
15) Second wind-circulating sail 115a
is made of plastic, fabric, polyethylene, the like, and/or the equivalent material.
Second wind-circulating grommets 115b
each are made of metallic material.
Second wind-circulating ball ties 115c
each are made of plastic and elastic materials.
16) First-sail hook-and-loop Velcro straps 116
each are made of nylon, fabric, polyester, plastic, the like, and/or the equivalent material.
17) Second-sail hook-and-loop Velcro straps 117
each are made of nylon, fabric, polyester, plastic, the like, and/or the equivalent material.
18) Clamp systems 118 each are made of the combined materials of its components.

19) J-shaped clamps 119
each are made of metallic material.
20) W-shaped clamps 120
each are made of metallic material.
21) Square-head screws 121
each are made of metallic material.
22) Wing-nuts 122
each are made of metallic material.

Shape

Referring to FIGS. 1, 2, 3A, 3B, 4, 5, 6, 7, 8, 9A, 9B, 10A, 10B, 11A, 11B, 11C, 12A, 12B, and 13:

1) Six-function twenty-four-configuration panel system 101 has the combined shapes of its components.
2) Seven first six-function panels 102
each have a rectangular shape.
3) Four second six-function panels 103
each have a rectangular shape.
4) Door panel 104
has a rectangular shape.
5) Door 105
has a rectangular shape.
6) Two door hinges 106a
each have a cylindrical shape.
Door screw 106b
has a screw shape.
7) U-shaped door latch 107
has a U shape.
8) Panel-tube-cap-and-leg systems 108 each have the combined shapes of its components.
9) Panel-tube caps 109a
each have a square-cylinder shape with a flat top.
Cap rings 109b
each have a square-ring shape.
10) Panel-tube legs 110a
each have a square-cylinder shape with a dome bottom.
Leg rings 110b
each have a square-ring shape.
11) Tick-blocking teeth 111
each have a tooth-like shape.
12) Water-draining holes 112
each have a circular shape.
13) Wind-circulating sail system 113 has the combined shapes of its components.
14) First wind-circulating sail 114a
has a rectangular shape.
First wind-circulating grommets 114b
each have a ring shape.
First wind-circulating ball ties 114c
each have a pendulum shape.
15) Second wind-circulating sail 115a
has a rectangular shape.
Second wind-circulating grommets 115b
each have a ring shape.
Second wind-circulating ball ties 115c
each have a pendulum shape.
16) First hook-and-loop velcro straps 116
each have a rectangular shape.
17) Second hook-and-loop velcro straps 117
each have a rectangular shape.
18) Clamp systems 118 each have the combined shapes of its components.
19) J-shaped clamps 119
each have a C-shape.
20) W-shaped clamps 120
each have a W-shape.
21) Square-head screws 121
each have a screw shape with a square head.
22) Wing-nuts 122
each have a wing shape.

Connection

Referring to FIGS. 1, 2, 3A, 3B, 4, 5, 6, 7, 8, 9A, 9B, 10A, 10B, 11A, 11B, 11C, 12A, 12B, and 13:

1) Six-function twenty-four-configuration panel system 101 has the combined connections of its components.
2) Seven first six-function panels 102
respectively are clamped to one another and/or four second six-function panels 103.
3) Four second six-function panels 103
respectively are clamped to one another and/or seven first six-function panels 102.
4) Door panel 104
is clamped to two adjacent ones of seven first six-function panels 102 and/or four second six-function panels 103.
5) Door 105
is swingably hinged to door panel 104.
6) Two door hinges 106a
respectively are welded to door panel 104.
Door screw 106b
is screwed on one of two door hinges 106a.
7) U-shaped door latch 107
is pivotably clamped to door 105.
8) Panel-tube-cap-and-leg systems 108 respectively have the combined connections of its components.
9) Panel-tube caps 109a
respectively are snapped into the top ends of seven first six-function panel 102, four second six-function panels 103, and/or door panel 104.
Cap rings 109b
respectively are molded to panel-tube caps 109a.
10) Panel-tube legs 110a
respectively are snapped into the bottom ends of seven first six-function panel 102, four second six-function panels 103, and/or door panel 104.
Leg rings 110b
respectively are molded to panel-tube legs 110a.
11) Tick-blocking teeth 111
respectively are molded to the walls of water-draining holes 112.
12) Water-draining holes 112
respectively are molded inside panel-tube legs 110a.
13) Wind-circulating sail system 113 has the combined connections of its components.
14) First wind-circulating sail 114a
is attached to second wind-circulating sail 115a, seven first six-function panel 102, four second six-function panels 103, and/or door panel 104.
First wind-circulating grommets 114b
respectively are clamped on first wind-circulating sail 114a.
First wind-circulating ball ties 114c
respectively are threaded through first wind-circulating grommets 114b and/or second wind-circulating sail 115a.
15) Second wind-circulating sail 115a
is attached to first wind-circulating sail 114a, seven first six-function panel 102, four second six-function panels 103, and/or door panel 104.
Second wind-circulating grommets 115b
respectively are clamped on second wind-circulating sail 115a.
Second wind-circulating ball ties 115c
respectively are threaded through second wind-circulating grommets 115d and/or
second wind-circulating sail 115a.

16) First hook-and-loop Velcro straps 116 respectively are sewn to first wind-circulating sail 114*a*.

17) Second hook-and-loop Velcro straps 117 respectively are sewn to second wind-circulating sail 115*a*.

18) Clamp systems 118 respectively have the combined connections of its components.

19) J-shaped clamps 119 respectively are clamped to seven first six-function panel 102, four second six-function panels 103, and/or door panel 104.

20) W-shaped clamps 120 respectively are clamped to of seven first six-function panel 102, four second six-function panels 103, and/or door panel 104.

21) Square-head screws 121 respectively are screwed through J-shaped clamps 119 and W-shaped clamps 120.

22) Wing-nuts 122 respectively are screwed onto square-head screws 121.

Function

1) Six-function twenty-four-configuration panel system 101 is for performing the combined functions of its components.

Figure 15:
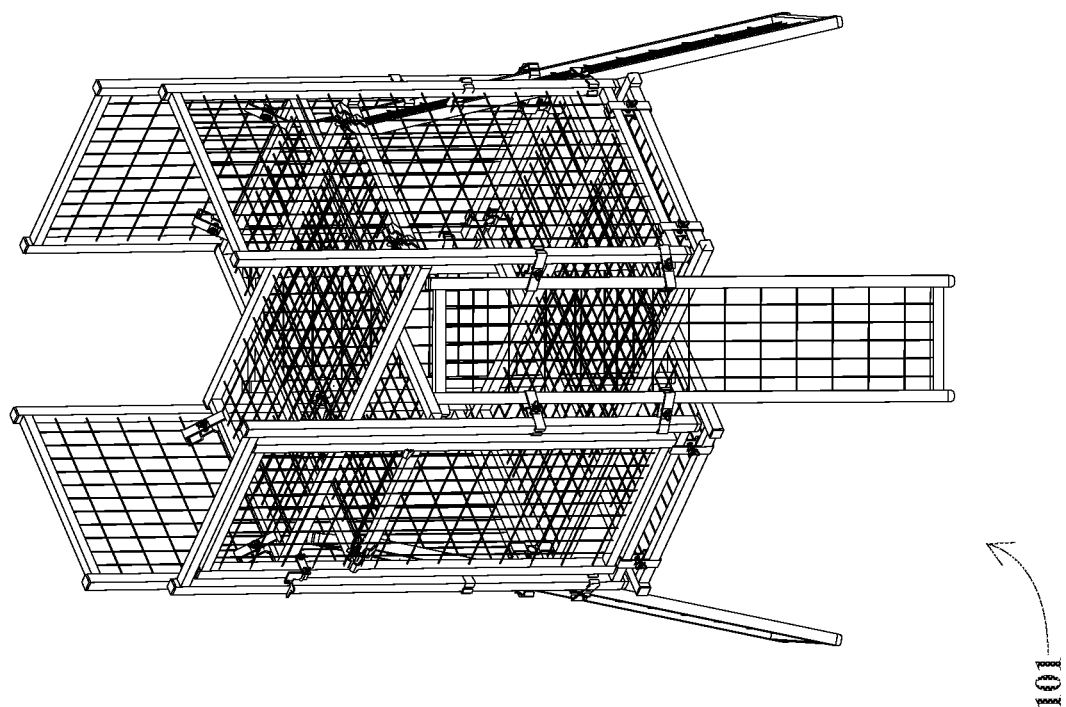
FIGS. 14 and 15 illustrate perspective views of how the six-function twenty-four-configuration panel system can be configured into kennels of different configurations that each raise multiple animals, with angled stilts, off from the ground, and each provide four open windows.
Figure 14:
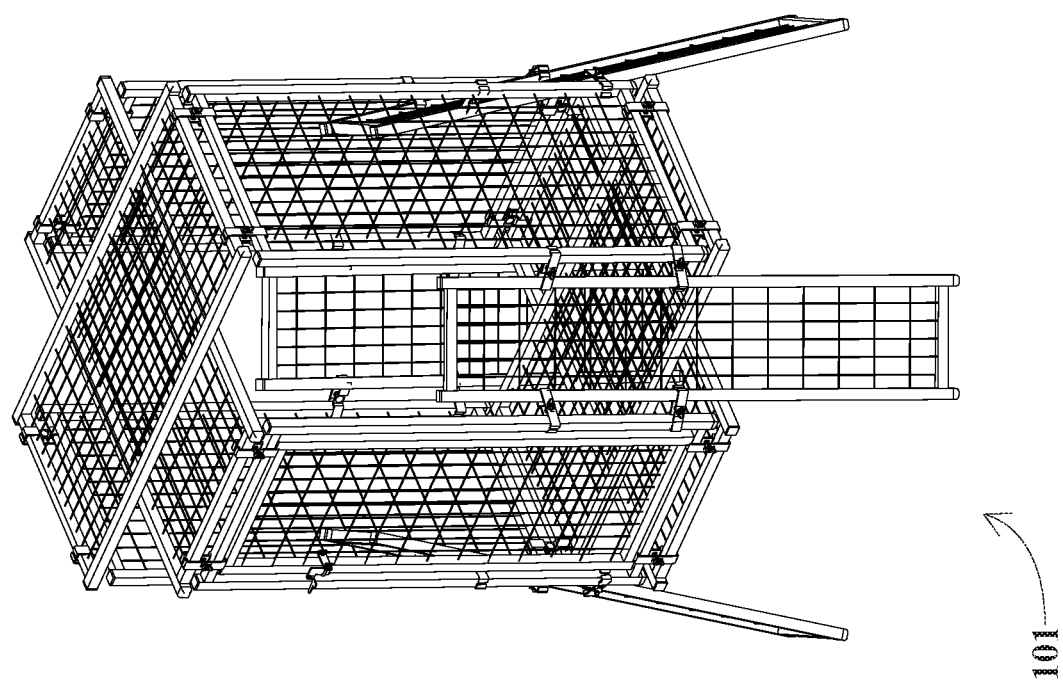
Figure 16:
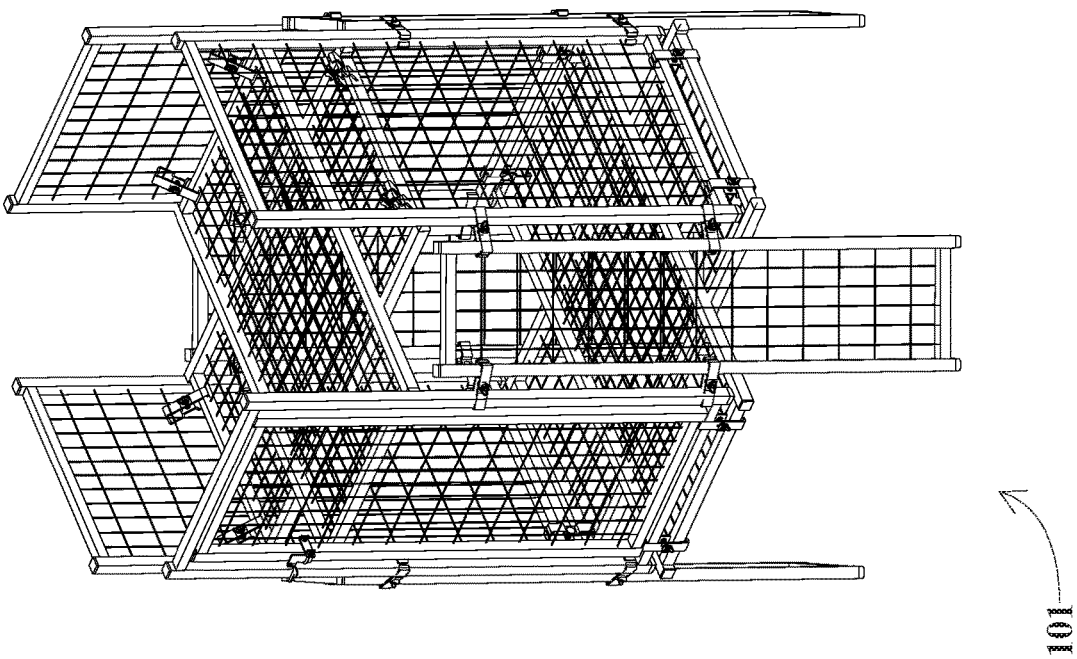
FIGS. 16 and 17 illustrate perspective views of how the six-function twenty-four-configuration panel system can be configured into kennels of different configurations that each raise multiple animals, with parallel stilts, off from the ground, and each provide four open windows.
Figure 17:
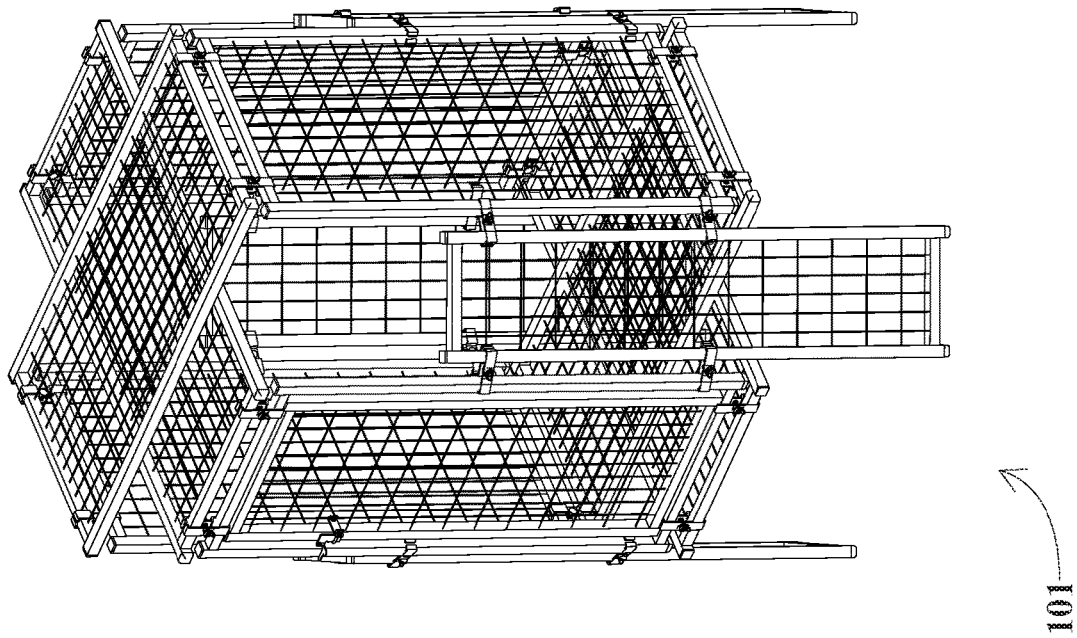
Figure 18:
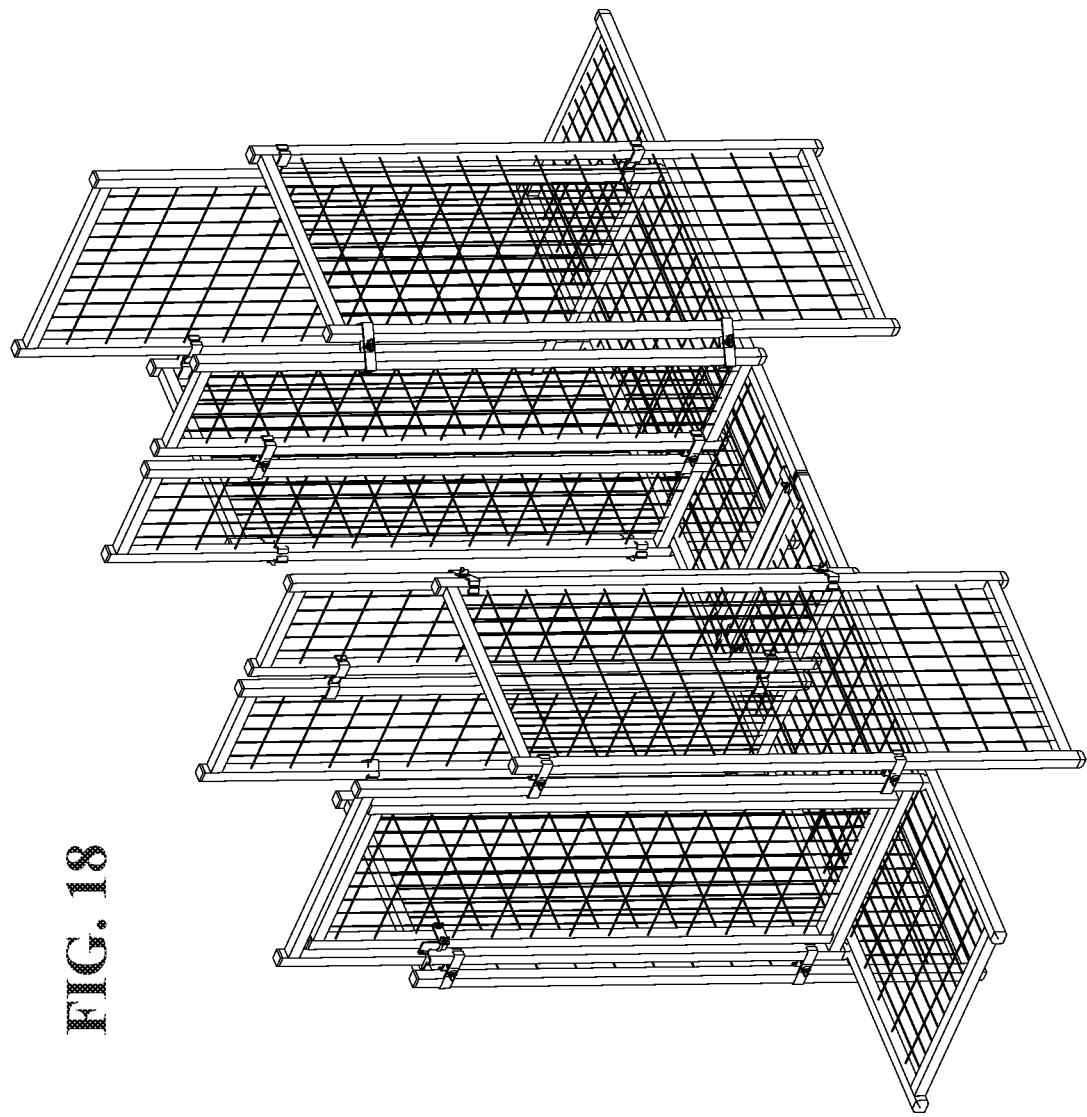
FIGS. 18, 19, 20, and 21 illustrate perspective views of how the six-function, twenty-four-configuration panel system can be configured into kennels of different configurations that each raise animals off from the ground, each provide two separate kennels to separate two animals, and each provide raised patios for animals to rest outside the kennels.
Figure 19:
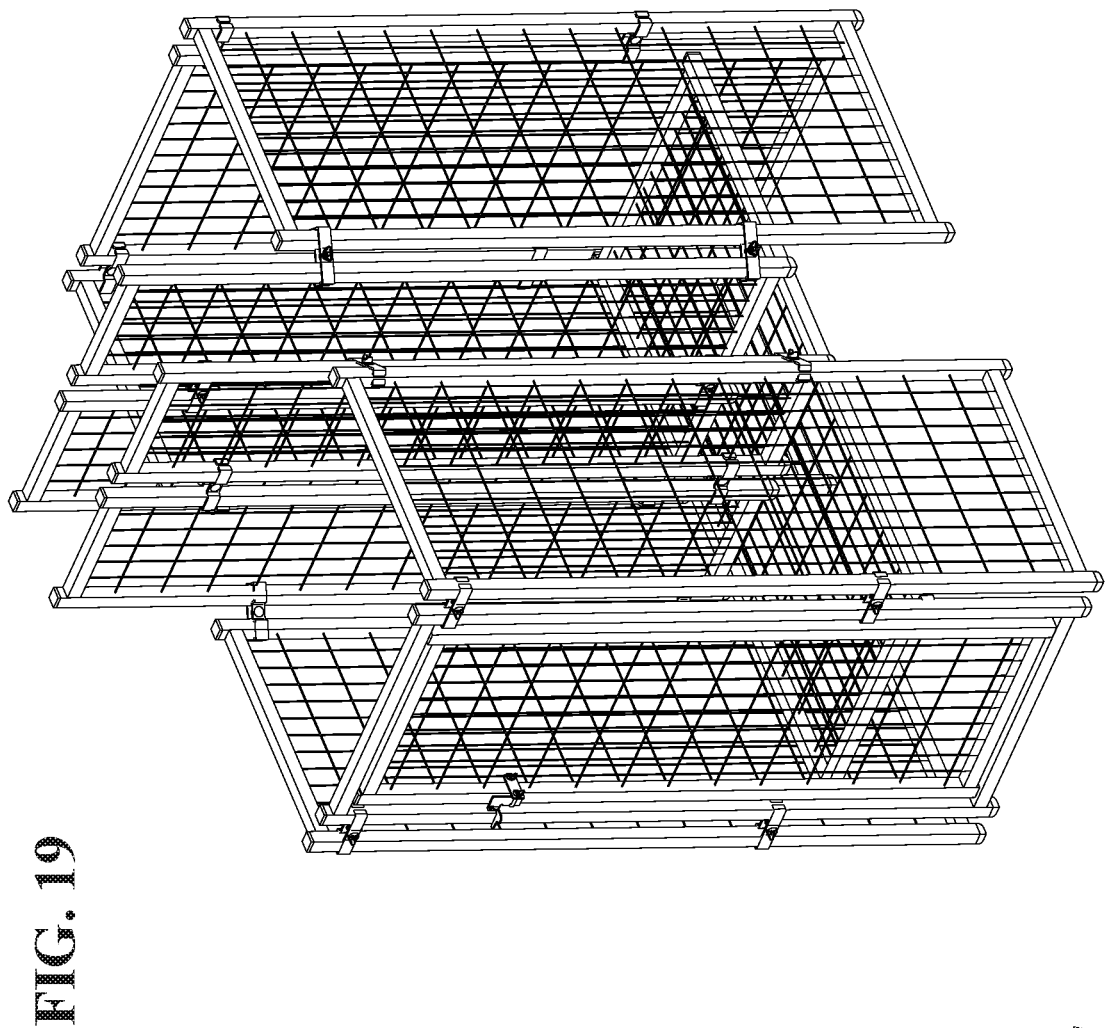
Figure 20:
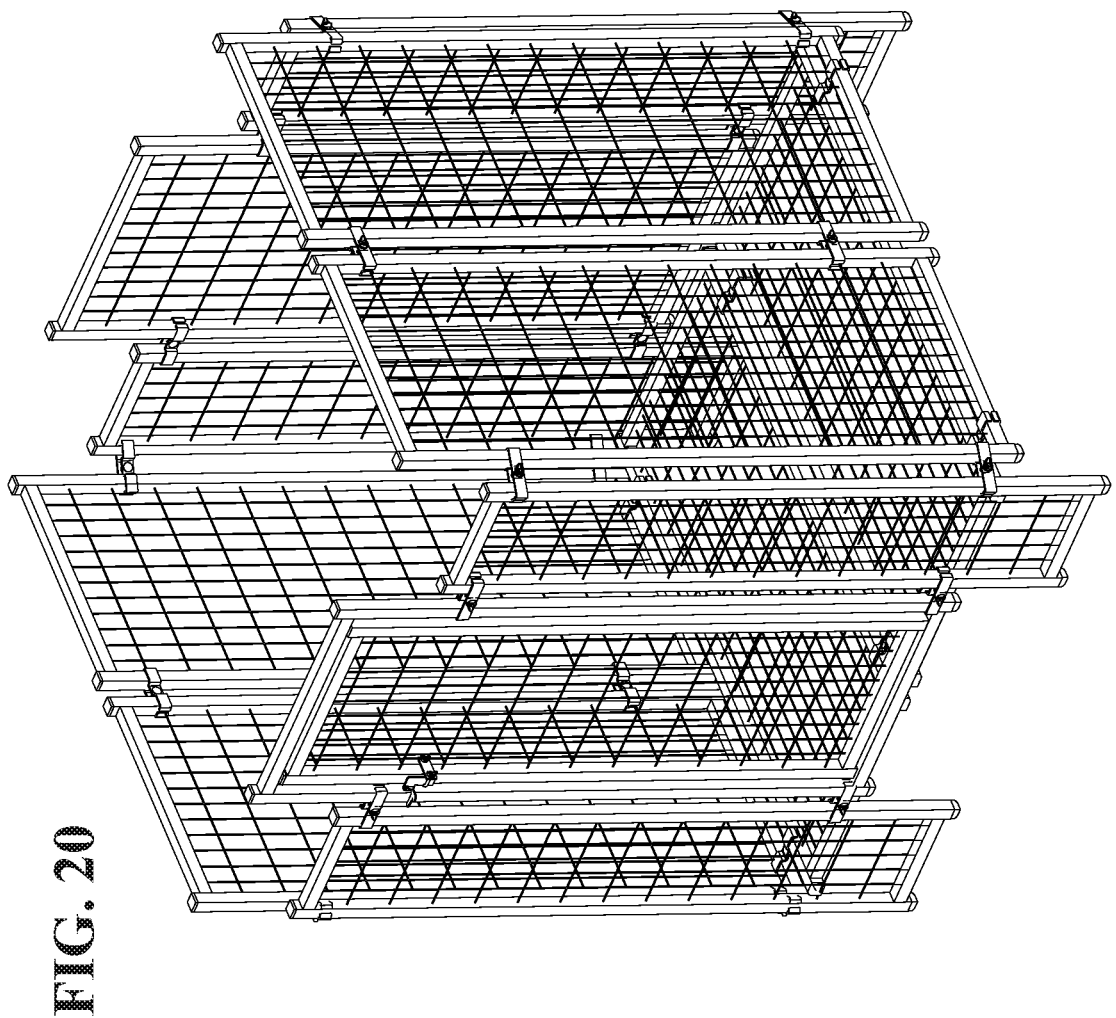
Figure 21:
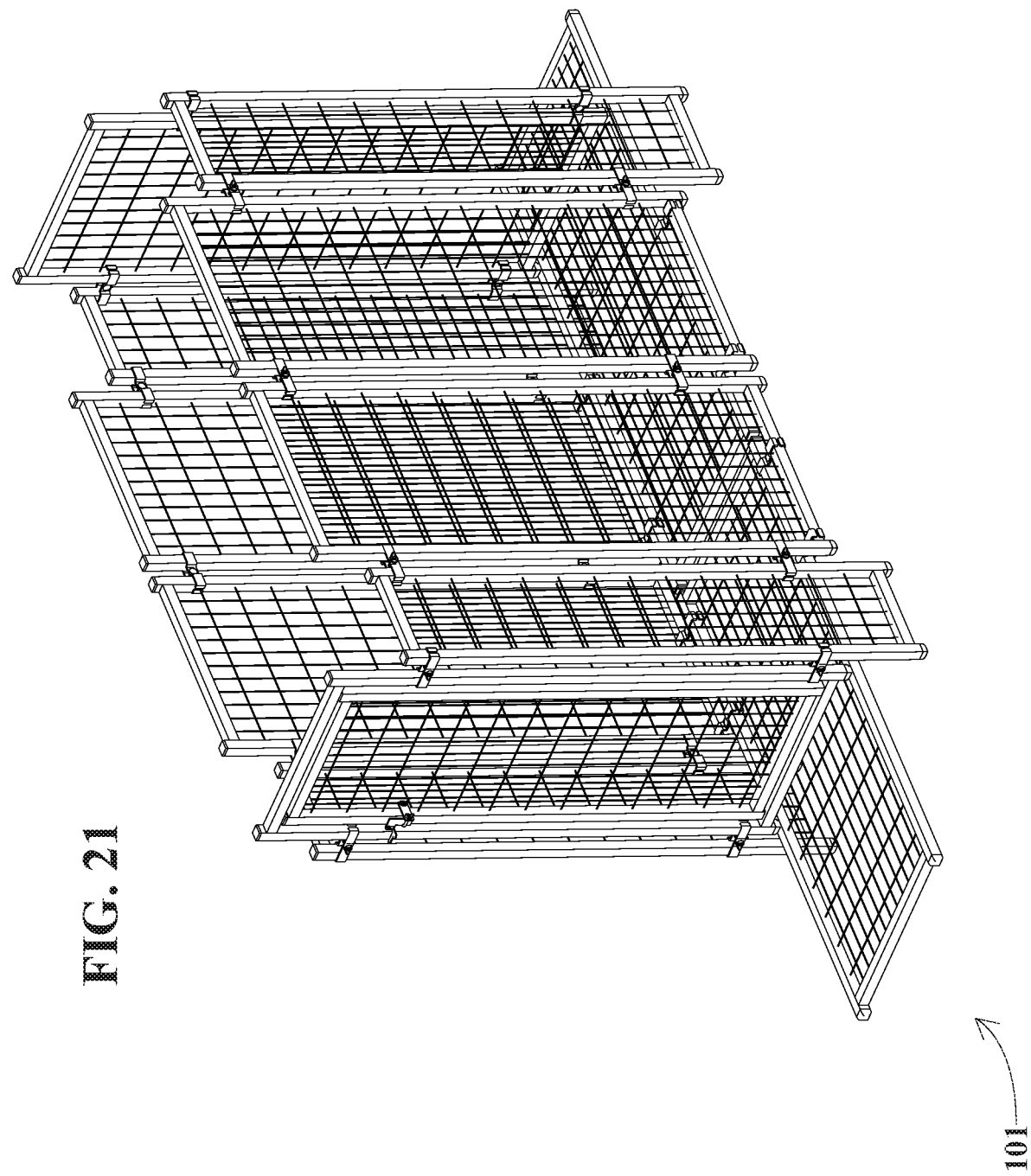
Figure 22:
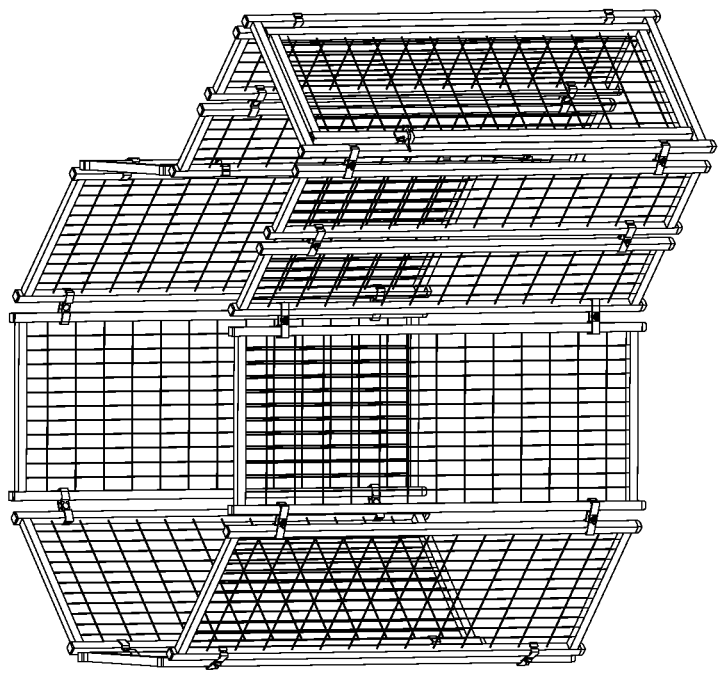
FIGS. 22, 23, 24, 25, 26, 27, 28, 29, 30, 31, 32, 33, 34, 35, 36, and 37 illustrate perspective views of how the six-function, twenty-four-configuration panel system can be configured into kennels of multiple different configurations.
Figure 23:
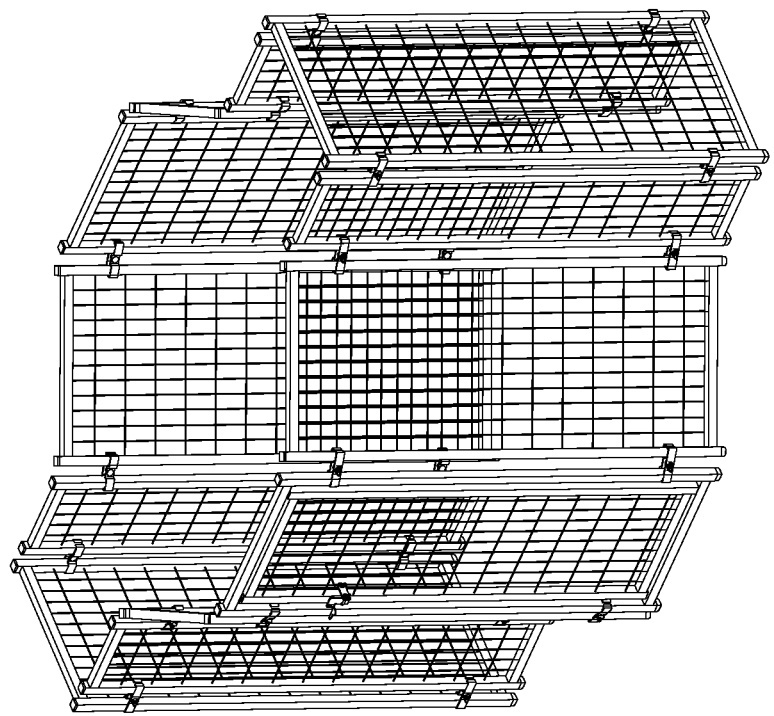
Figure 24:
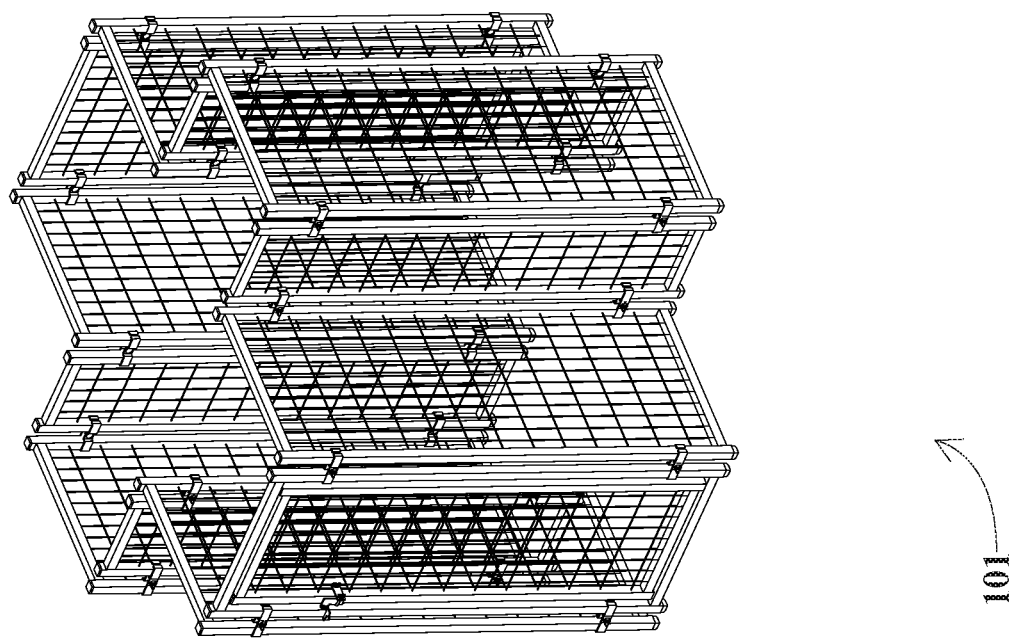
Figure 25:
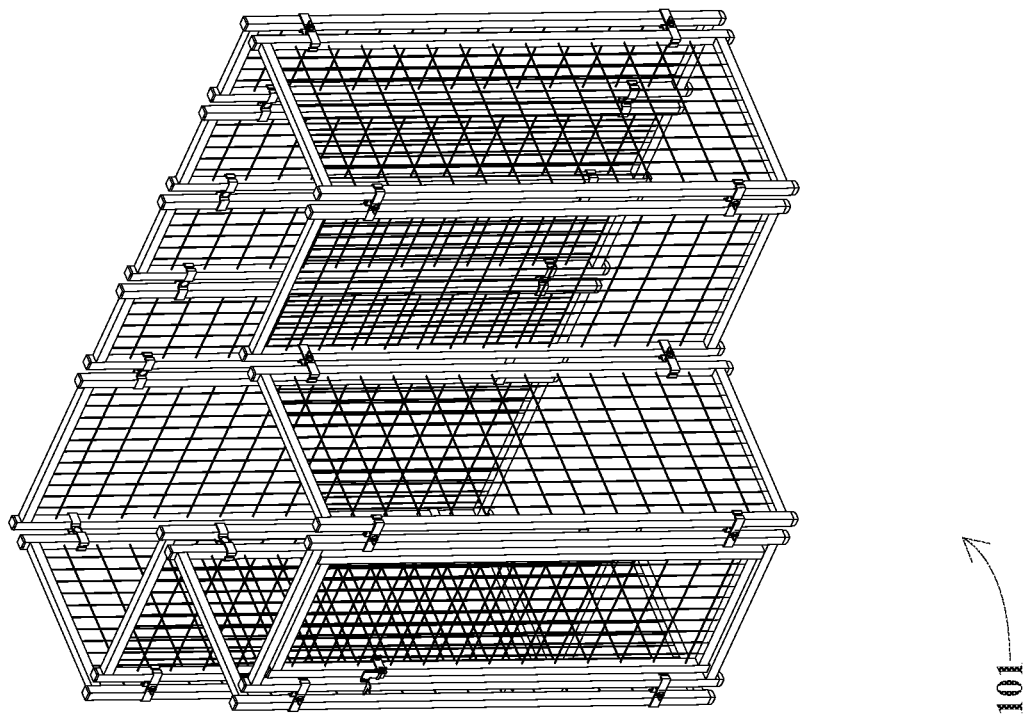
Figure 26:
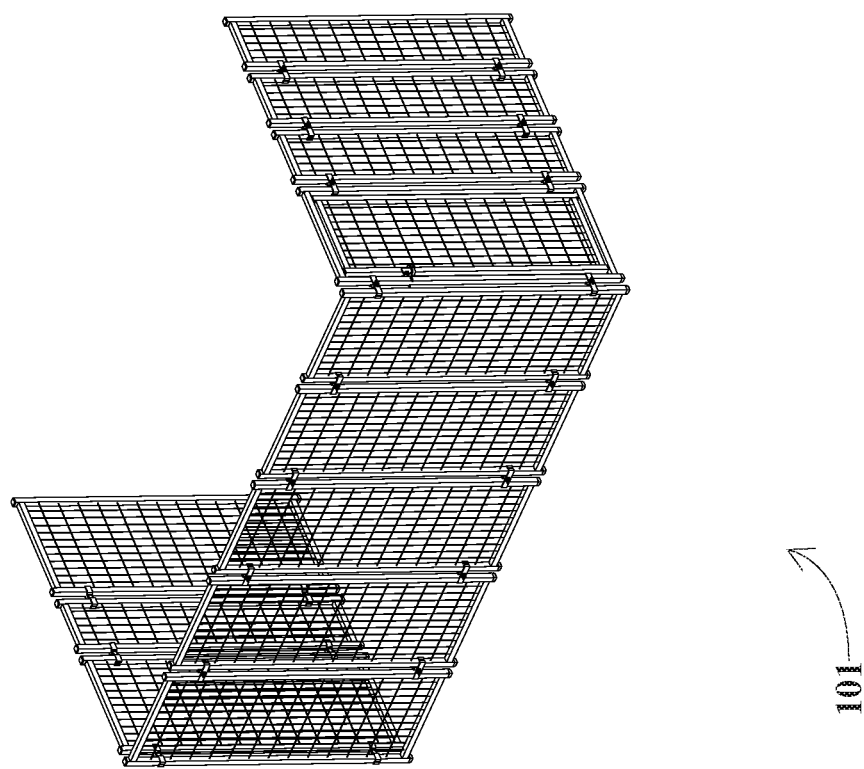
Figure 27:
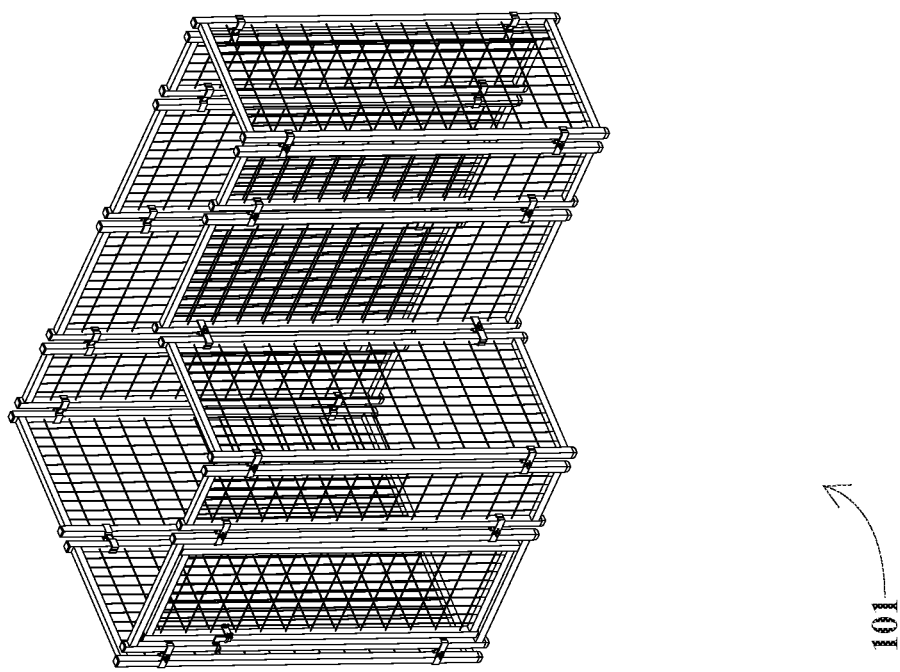
Figure 29:
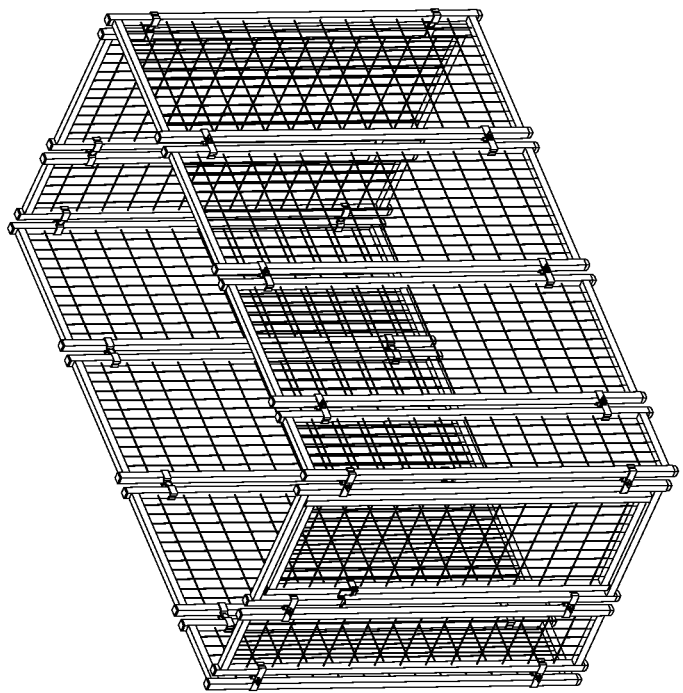
Figure 28:
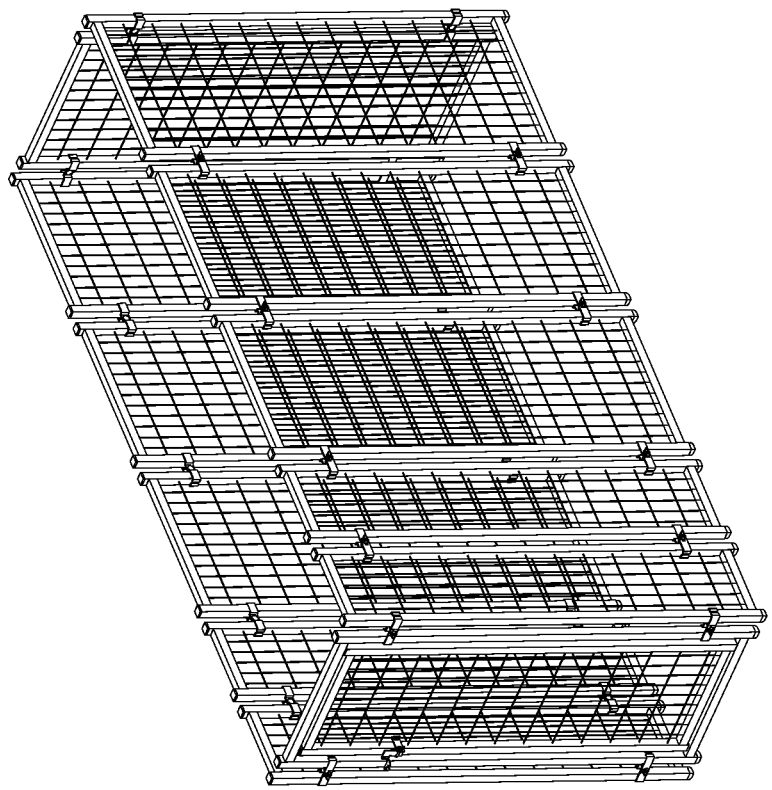
Figure 31:
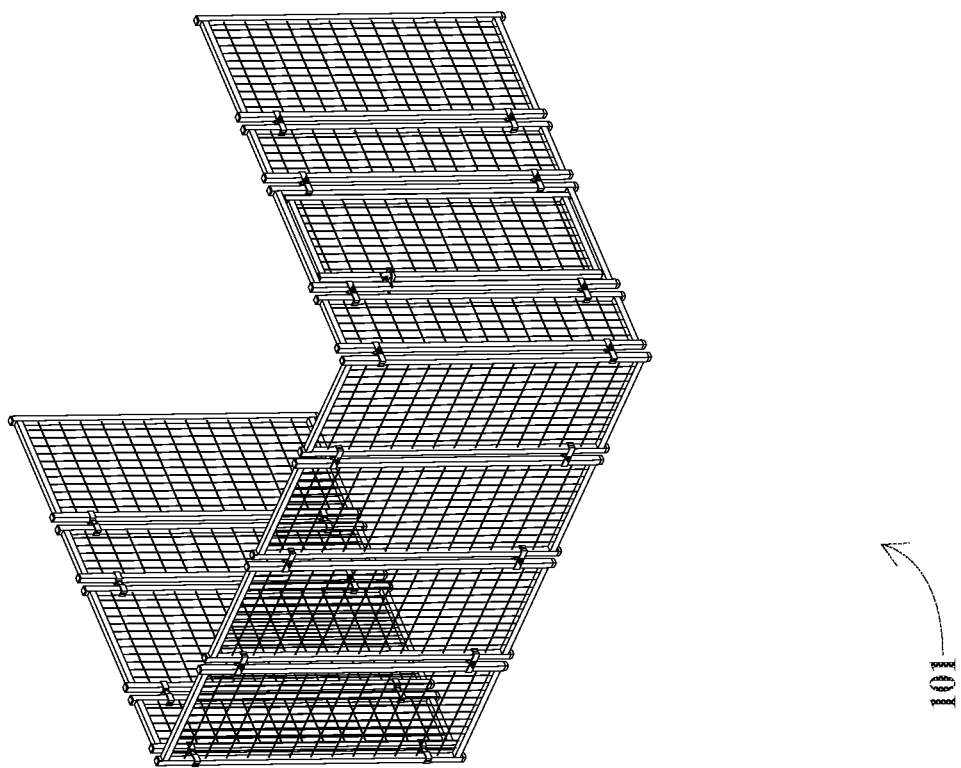
Figure 30:
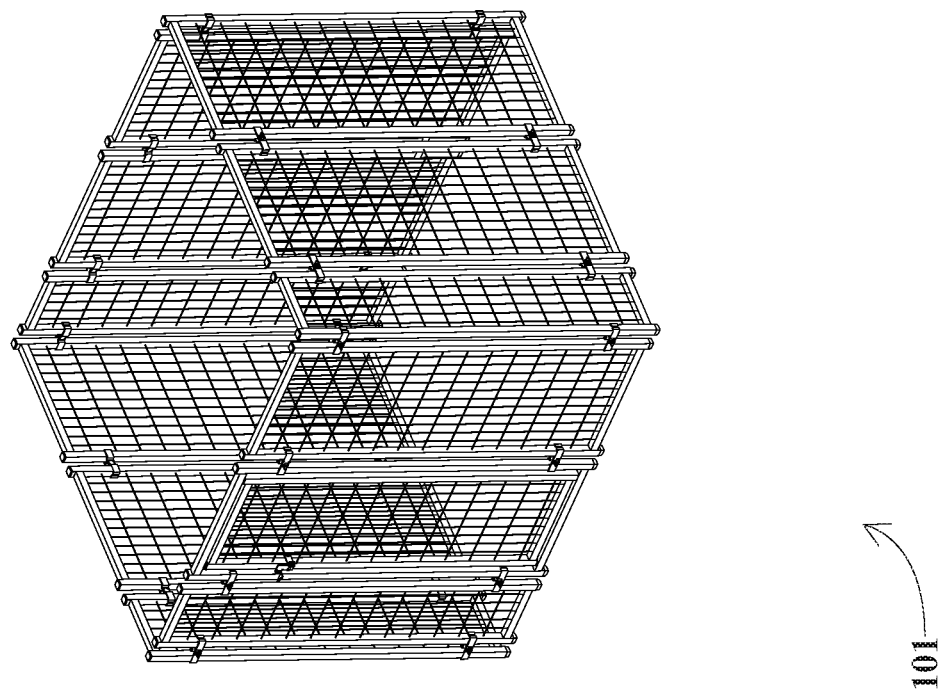
Figure 32:
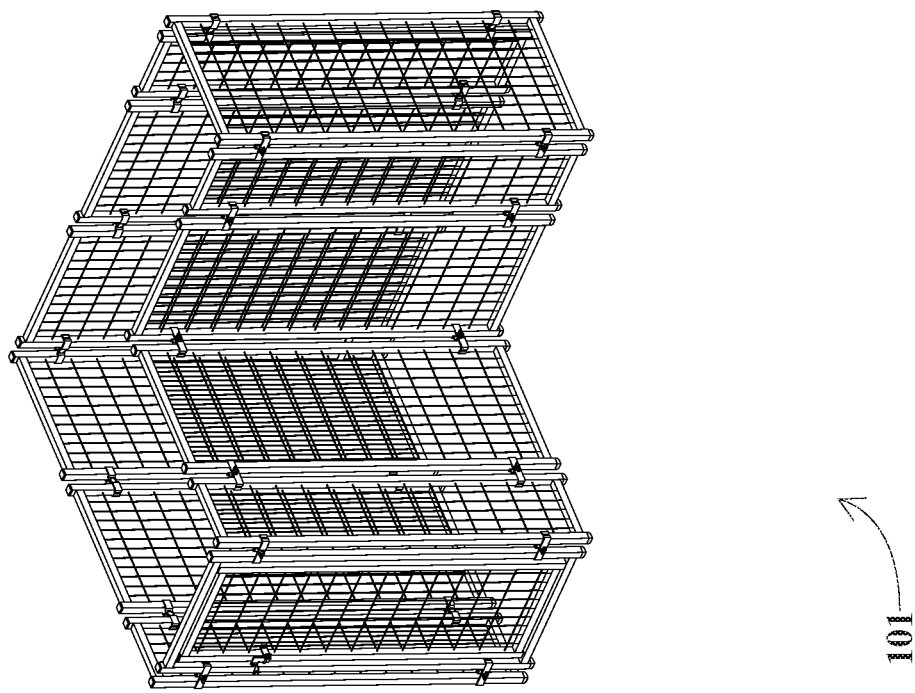
Figure 33:
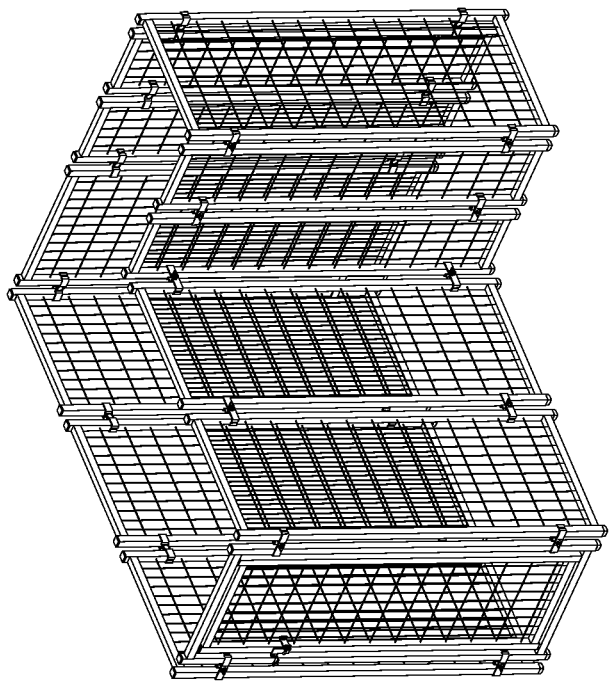
Figure 35:
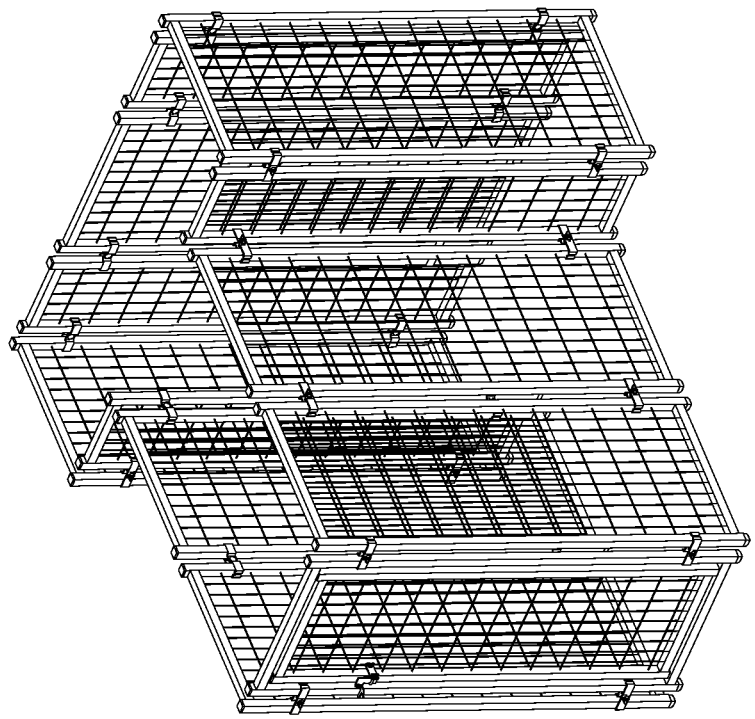
Figure 34:
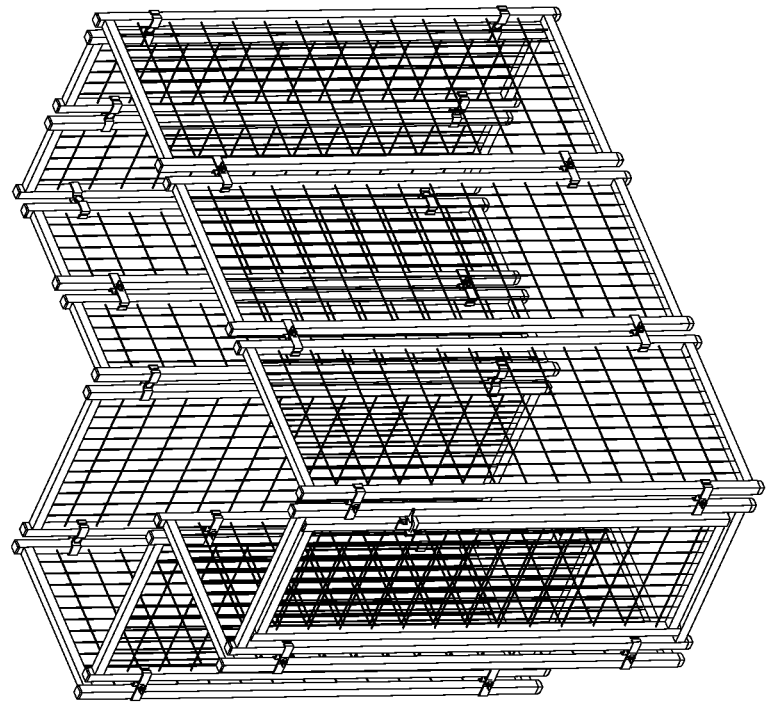
Figure 37:
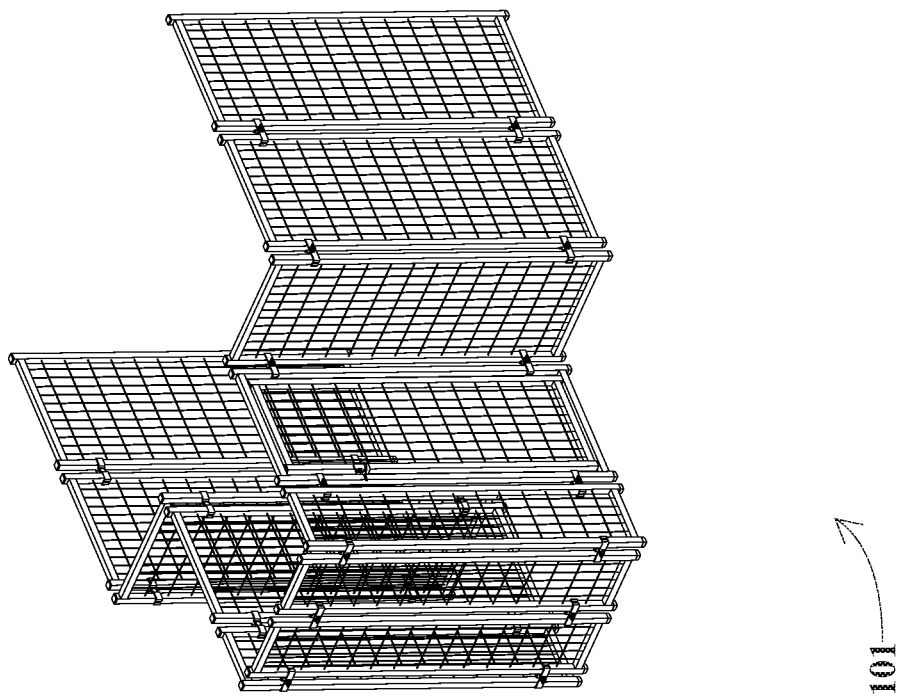
Figure 36:
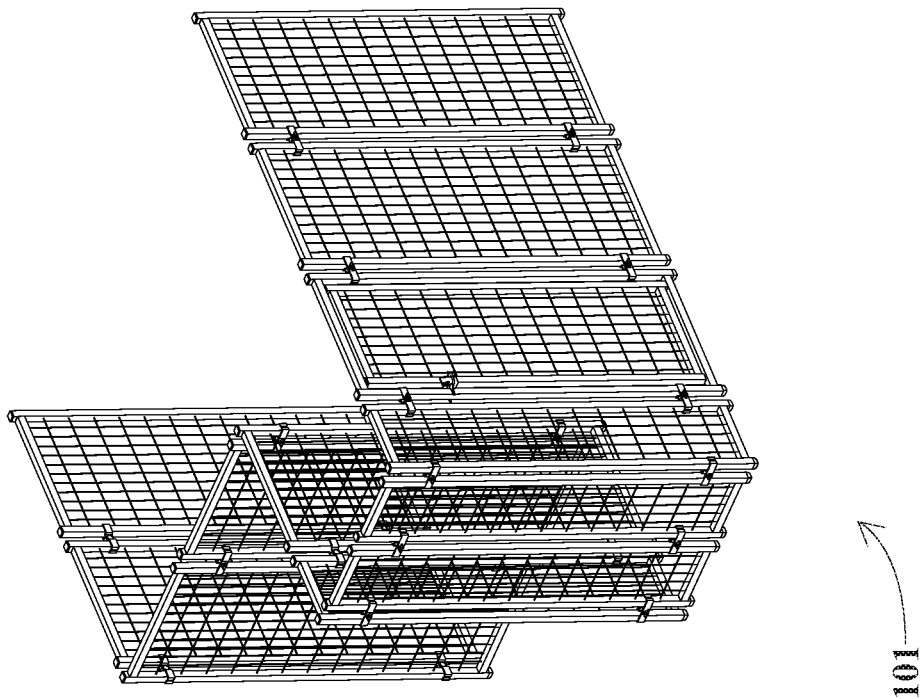

2) Seven first six-function panels 102 respectively are for:
  a) Functioning as an angled-stilt panel
    to raise the at-least-twenty-four-different-configuration pet kennel above the ground to keep pets above wet ground, puddles, or uncomfortable terrain,
    to create large-footprint stilts to stabilize the at-least-twenty-four-different-configuration pet kennel, and
    to create unique entries, exits, and windows
    (see FIGS. 14, 15, 16, and 17);
  b) Functioning as a multi-story floor panel
    to create multiple stories for multiple pets to rest in comfort
      (one above the other to save space), and
    to separate multiple pets from each other
      (one above the other to save space)
    (see FIGS. 14, 15, 16, and 17);
  c) Functioning as a window panel
    to form a window
    (see FIGS. 14, 15, 16, and 17);
  d) Functioning as a roof panel
    to provide shelter from the rain and other weather element
    (see FIGS. 14, 15, 16, and 17);
  e) Functioning as a wall panel
    to create a temporary enclosement
    (see FIGS. 14, 15, 16, and 17);
  f) Functioning as a patio panel
    to allow pets to rest above the ground outside the at-least-twenty-four-different-configuration pet kennel
    (see FIGS. 18 and 21); and
  g) Functioning in various configurations with four second six-function panels 103
    to form at least twentyfour configurations of the at-least-twenty-four-different-configuration pet kennel. For example:
      an angled-stilt multi-story-roof-and-floor octagon configuration
      (see FIG. 14),
      an angled-stilt multi-story-floor octagon configuration
      (see FIG. 15),
      a parallel-stilt multi-story-roof-and-floor octagon configuration
      (see FIG. 16),
      a parallel-stilt panel multi-story-floor octagon configuration
      (see FIG. 17),
      a opposite-patio multi-kennel configuration
      (see FIG. 18),
      a joint-patio multi-kennel configuration
      (see FIG. 19),
      a parallel-stilt square configuration
      (see FIG. 20),
      a opposite-patio single-kennel configuration
      (see FIG. 21),
      a symmetric-octagon configuration
      (see FIG. 22),
      a asymmetric-octagon configuration
      (see FIG. 23),
      a T-shaped configuration
      (see FIG. 24),
      a X-shaped configuration
      (see FIG. 25),
      a L-shaped configuration
      (see FIG. 26),
      a three-sided corner-configuration
      (see FIG. 27),
      an I-shaped configuration
      (see FIG. 28),
      a rectangular configuration
      (see FIG. 29),
      a square configuration
      (see FIG. 30),
      a three-sided side-door configuration
      (see FIG. 31),
      an asymmetrical L-shaped configuration
      (see FIG. 32),
      a symmetrical L-shaped configuration
      (see FIG. 33),
      an asymmetrical T-shaped configuration
      (see FIG. 34),
      a symmetrical T-shaped configuration
      (see FIG. 35),
      a asymmetric five-sided configuration
      (see FIG. 36), and
      a symmetric seven-sided configuration
      (see FIG. 37).

Figure 38A:
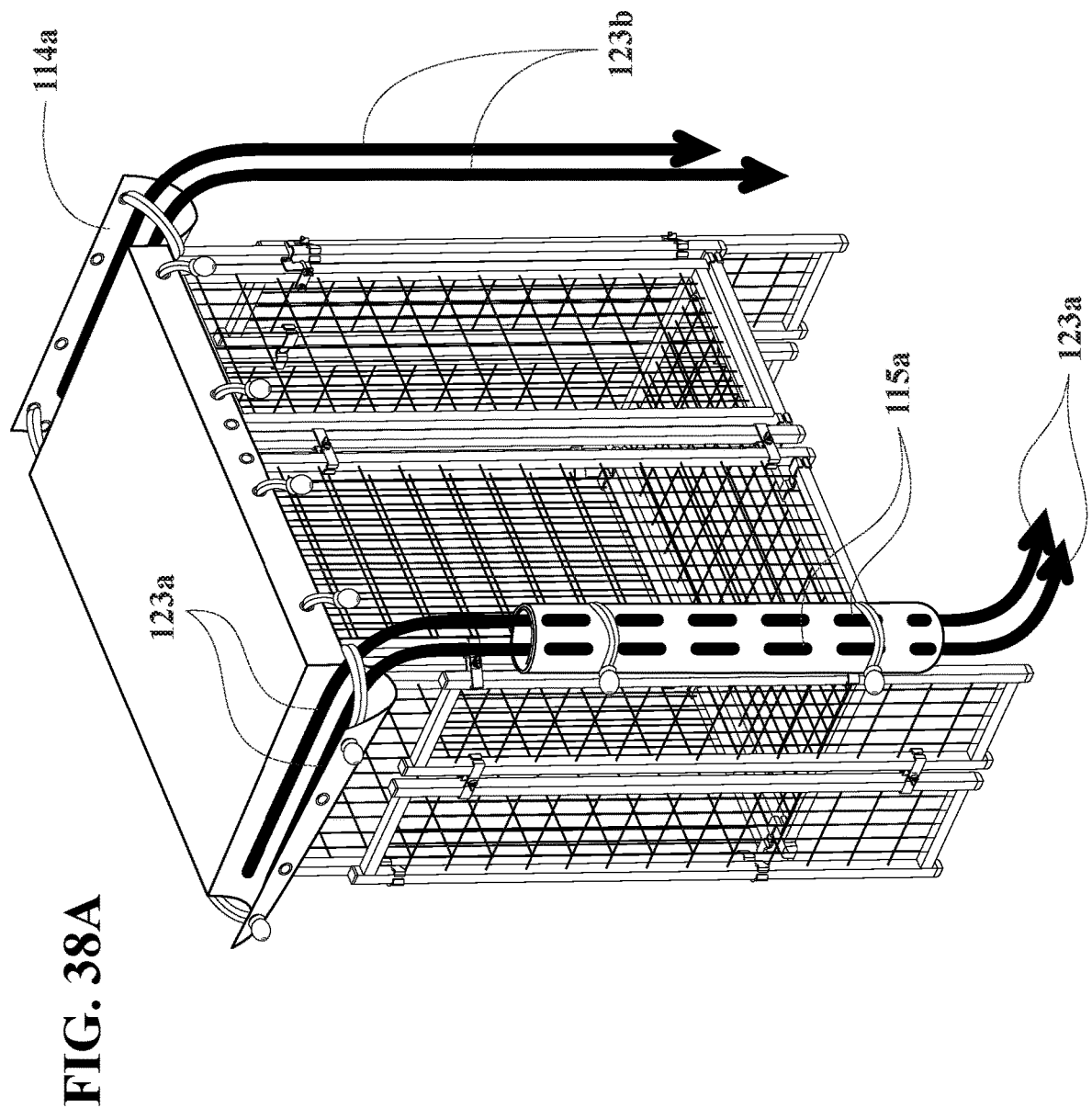
Figure 38B:
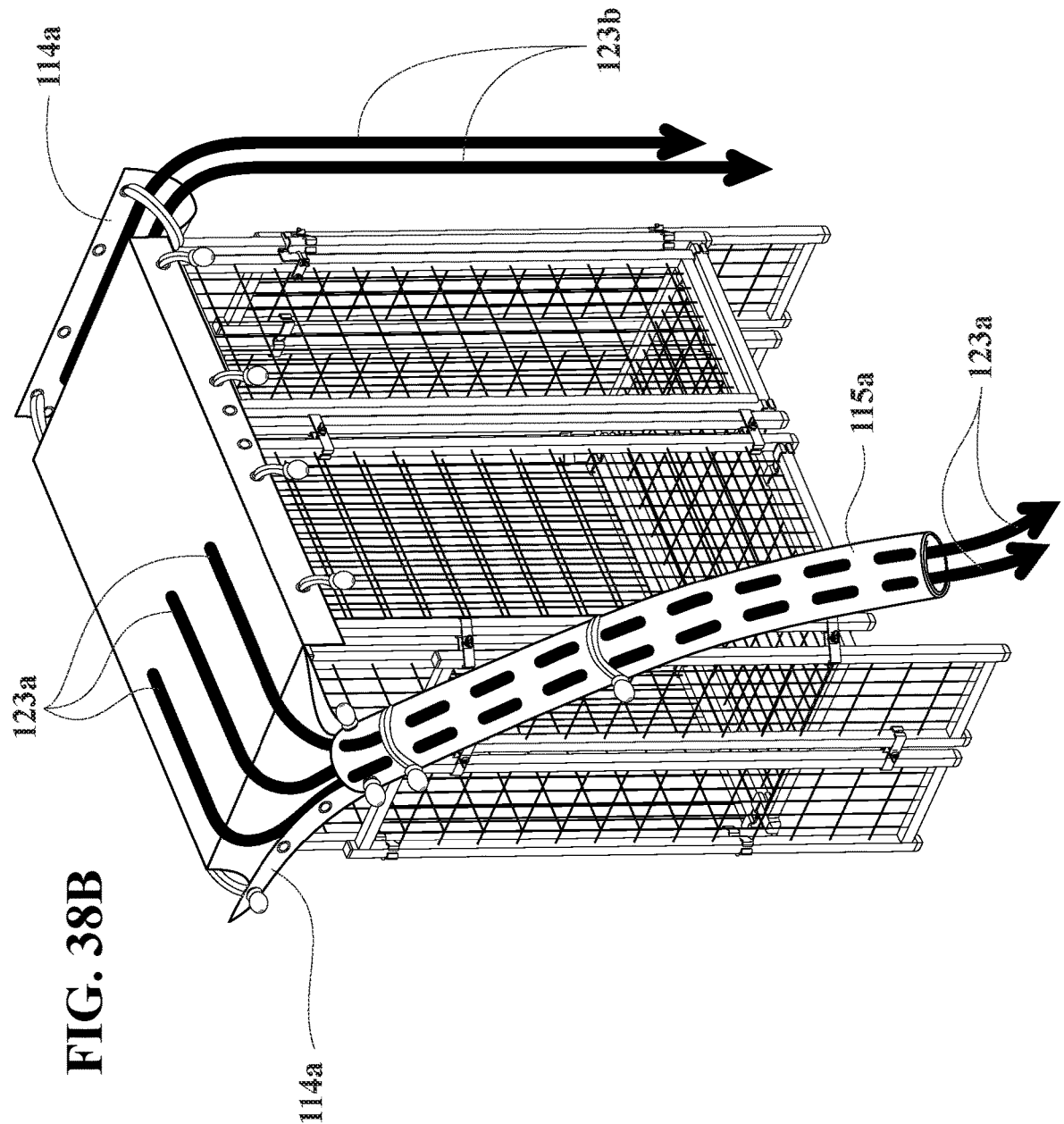
Figure 38C:
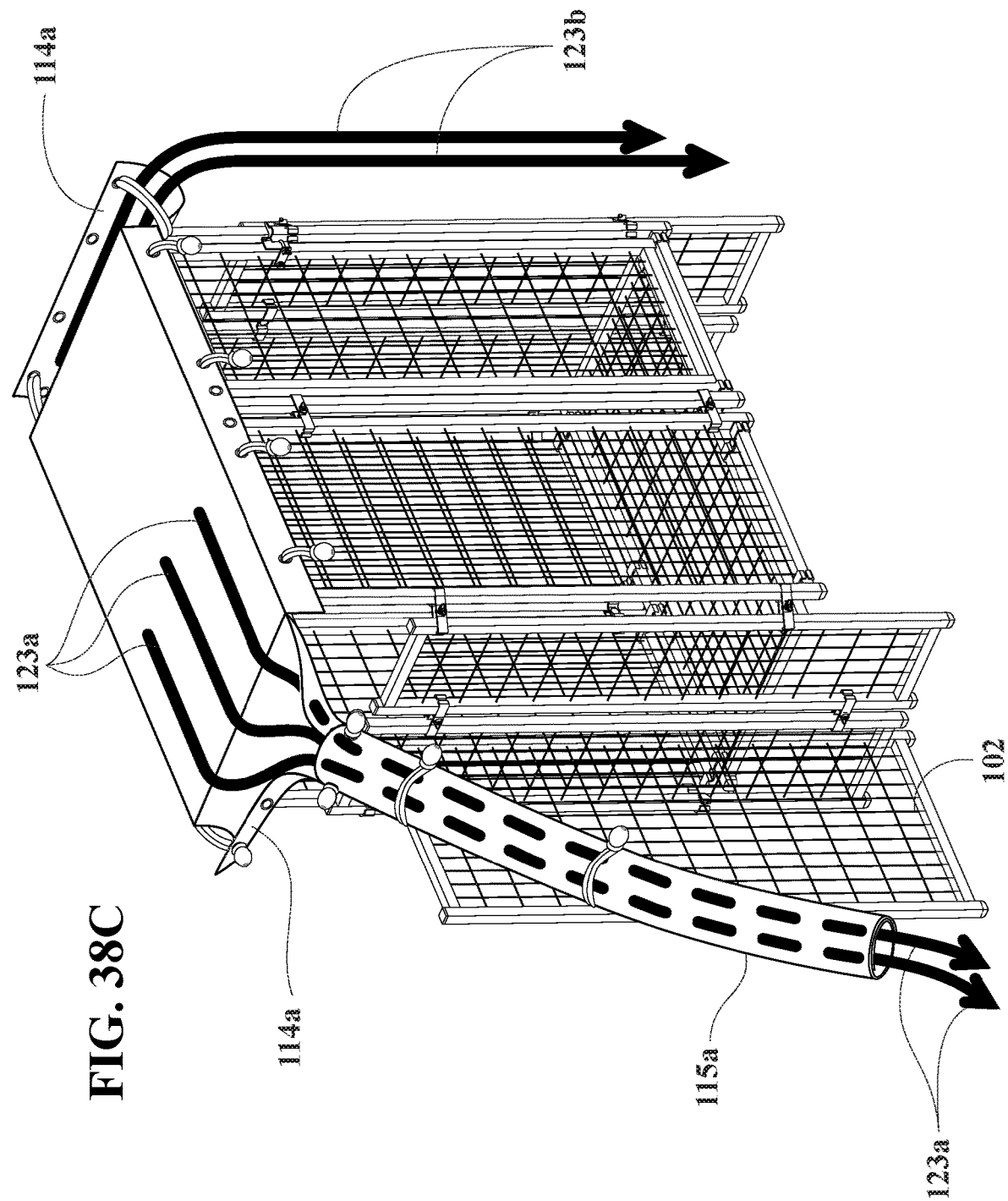
Figure 45A:
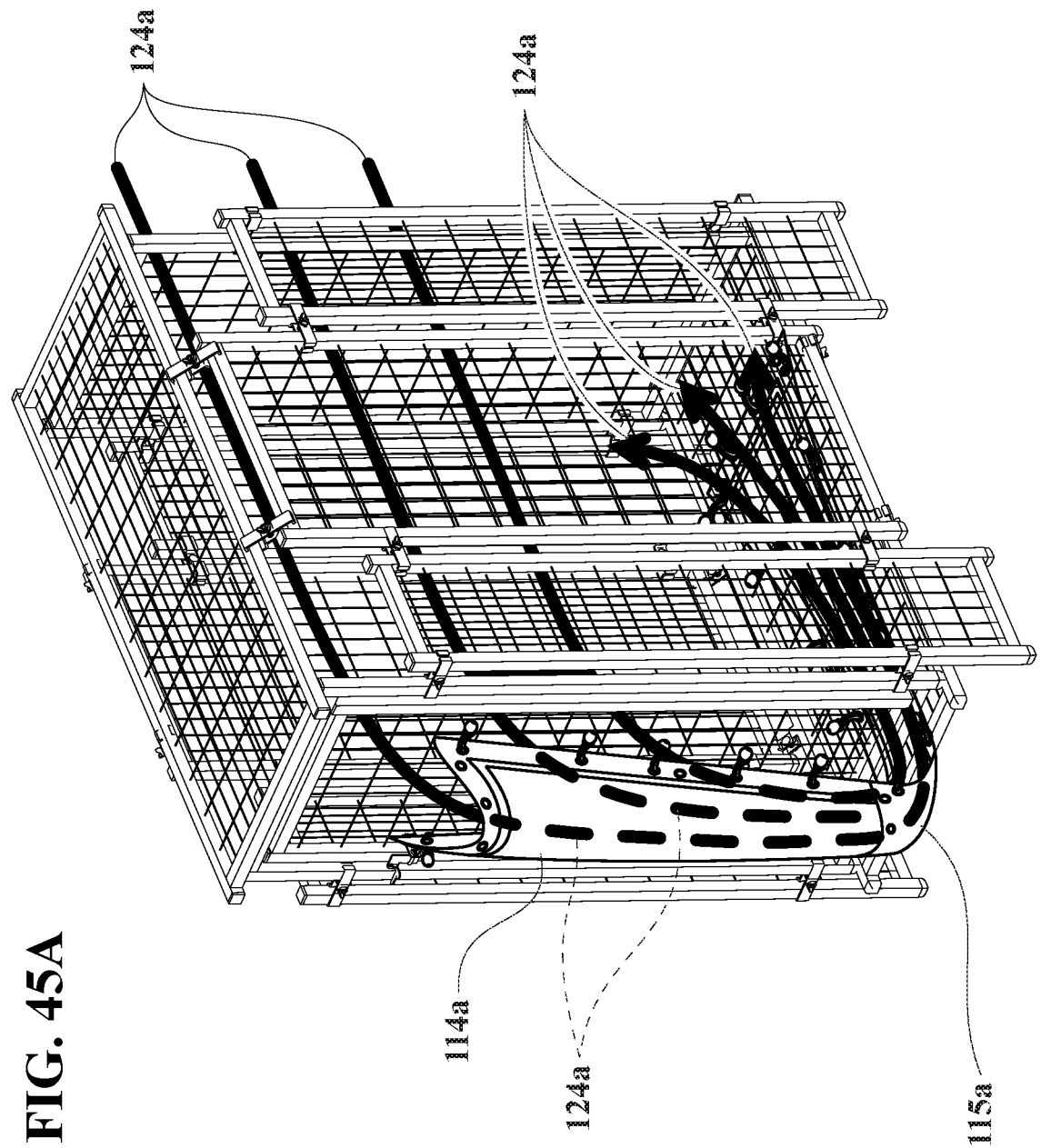
Figure 45C:
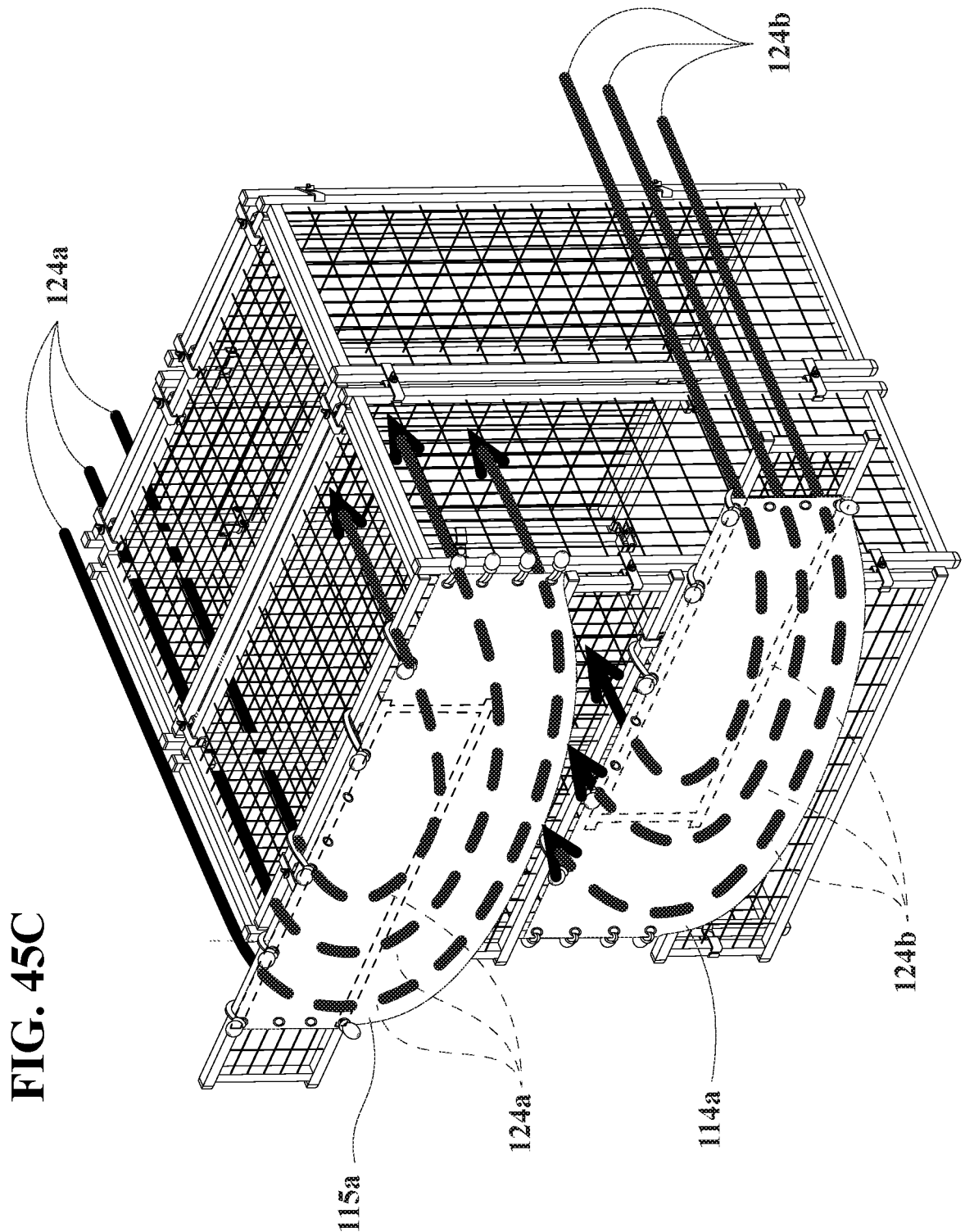
Figure 45D:
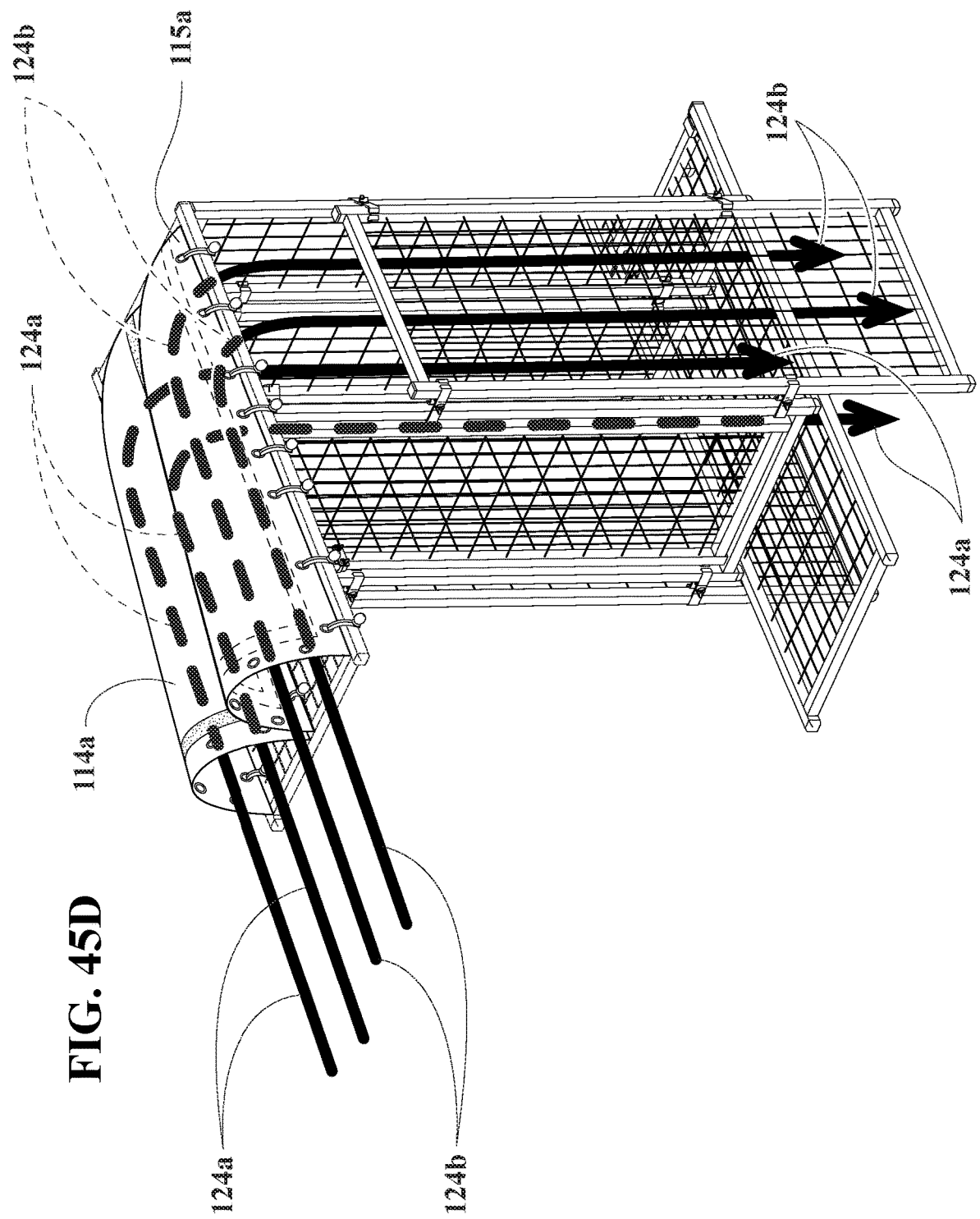

3) Four second six-function panels 103 respectively are for:
  a) Functioning as an angled-stilt panel
    to raise the at-least-twenty-four-different-configuration pet kennel above the ground to keep pets above wet ground, puddles, or uncomfortable terrain,
    to create large-footprint stilts to stabilize the at-least-twenty-four-different-configuration pet kennel, and
    to create unique entries, exits, and windows
    (see FIGS. 14, 15, 16, and 17);
  b) Functioning as a multi-story floor panel
    to create multiple stories for multiple pets to rest in comfort
      (one above the other to save space), and
    to separate multiple pets from each other
      (one above the other to save space)
    (see FIGS. 14, 15, 16, and 17);
  c) Functioning as a window panel
    to form a window
    (see FIGS. 14, 15, 16, and 17);

d) Functioning as a roof panel
   to provide shelter from the rain and other weather element
   (see FIGS. 14, 15, 16, and 17);
e) Functioning as a wall panel
   to create a temporary enclosement
   (see FIGS. 14, 15, 16, and 17);
f) Functioning as a patio panel
   to allow pets to rest above the ground outside the at-least-twenty-four-different-configuration pet kennel
   (see FIGS. 18 and 21); and
g) Functioning in various configurations with seven first six-function panels 102
   to form at least twentyfour configurations of the at-least-twenty-four-different-configuration pet kennel. For example:
      an angled-stilt multi-story-roof-and-floor octagon configuration
      (see FIG. 14),
      an angled-stilt multi-story-floor octagon configuration
      (see FIG. 15),
      a parallel-stilt multi-story-roof-and-floor octagon configuration
      (see FIG. 16),
      a parallel-stilt panel multi-story-floor octagon configuration
      (see FIG. 17),
      a opposite-patio multi-kennel configuration
      (see FIG. 18),
      a joint-patio multi-kennel configuration
      (see FIG. 19),
      a parallel-stilt square configuration
      (see FIG. 20),
      a opposite-patio single-kennel configuration
      (see FIG. 21),
      a symmetric-octagon configuration
      (see FIG. 22),
      a asymmetric-octagon configuration
      (see FIG. 23),
      a T-shaped configuration
      (see FIG. 24),
      a X-shaped configuration
      (see FIG. 25),
      a L-shaped configuration
      (see FIG. 26),
      a three-sided corner-configuration
      (see FIG. 27),
      an I-shaped configuration
      (see FIG. 28),
      a rectangular configuration
      (see FIG. 29),
      a square configuration
      (see FIG. 30),
      a three-sided side-door configuration
      (see FIG. 31),
      an asymmetrical L-shaped configuration
      (see FIG. 32),
      a symmetrical L-shaped configuration
      (see FIG. 33),
      an asymmetrical T-shaped configuration
      (see FIG. 34),
      a symmetrical T-shaped configuration
      (see FIG. 35),
      a asymmetric five-sided configuration
      (see FIG. 36), and
      a symmetric seven-sided configuration
      (see FIG. 37).
4) Door panel 104 is for:
   creating a door frame for door 105.
5) Door 105 is for:
   closing the opening within door panel 104.
6) Two door hinges 106a respectively are for:
   swingably hinging door 105 to door panel 104.
   Door screw 106b is for:
   locking door 105 on two door hinges 106a.
7) U-shaped door latch 107 is for:
   releasably latching door 105 to door panel 104.
8) Panel-tube-cap-and-leg systems 108 respectively are for performing the combined functions of its components.
9) Panel-tube caps 109a respectively are for:
   sealing the tube tops of seven first six-function panels 102, four second six-function panels 103, and door panel 104.
   Cap rings 109b respectively are for:
   locking panel-tube caps 109a in place and blocking rain water from entering into seven first six-function panels 102, four second six-function panels 103, and door panel 104.
10) Panel-tube legs 110a respectively are for:
   a) Lifting the at-least-twenty-four-different-configuration pet kennel to allow cleaning thereunder;
   b) Protecting a floor surface under the at-least-twenty-four-different-configuration pet kennel from being scratched;
   c) Plugging the tube bottoms of seven first six-function panels 102, four second six-function panels 103, and door panel 104
      to prevent fleas and ticks from hiding inside the seven first six-function panels 102, and/or four second six-function panels 103 from sprays; and
   d) Dampening the bottom contact points of the at-least-twenty-four-different-configuration pet kennel,
      to provide shock-absorption and reduced damage to floors, vehicles, and other surfaces, when placed and/or transported thereupon.
   Leg rings 110b respectively are for:
   locking panel-tube legs 110a in place and blocking rain water from entering into seven first six-function panels 102, four second six-function panels 103, and door panel 104.
11) Tick-blocking teeth 111 respectively are for:
   a) Preventing ticks from entering through water-draining holes 112 and hiding inside seven first six-function panels 102, four second six-function panels 103, and door panel 104 (while allowing rain water to drain away)
      to prevent ticks from avoiding tick-killing spray.
   b) Preventing ticks from entering through water-draining holes,
      to prevent ticks from hiding therein
      (See FIG. 9B); and
   c) Preventing ticks from hiding inside,
      to protect pets from tick diseases
      (See FIG. 9B).
12) Water-draining holes 112 respectively are for:
   a) Allowing rain water to drain away from seven first six-function panels 102, four second six-function panels 103, and door panel 104
      to prevent them from rusting;
   b) Allowing water and condensation to drip downward,
      to prevent rusting
      (See FIG. 9A); and c) Allowing condensation to evaporate,
to prevent rusting
(See FIG. 9A).
13) Wind-circulating sail system 113 is for performing the combined functions of its components.
14) First wind-circulating sail 114a is for:
a) Functioning as a wind circulator
(attached to the at-least-twenty-four-different-configuration pet kennel in many different way)
to catch and redirect rain water in the direction of arrows 123a and 123b (See FIGS. 38A, 38B, 38C, 38D, and 38E)
to flow in many different directions and elevations, and
to circulate wind in the direction of arrows 124a and 124b upward, downward, sideway, and in opposite directions through the at-least-twenty-four-different-configuration pet kennel
(See FIGS. 39, 40, 41, 42, 43, 44, 45A, 45B, 45C, 45D, and 45E).
For example:
a wind circulator
for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
(see FIG. 39);
a wind circulator
for redirecting wind flow from flowing horizontally, to flowing upward, into the twenty-four-different-configuration pet kennel, for cooling the twenty-four-different-configuration pet kennel
(see FIG. 41);
a wind circulator
for redirecting wind flow from flowing horizontally to flowing downward, to flowing horizontally, to flowing upward, into the twenty-four-different-configuration pet kennel, for cooling the twenty-four-different-configuration pet kennel
(see FIG. 42);
a wind circulator
for redirecting wind flow from flowing horizontally, to flowing upward, into the patio of the twenty-four-different-configuration pet kennel, for cooling the twenty-four-different-configuration pet kennel
(see FIG. 43);
a wind circulator
for redirecting wind flow from flowing horizontally, to flowing downward, into the twenty-four-different-configuration pet kennel, for cooling the twenty-four-different-configuration pet kennel
(see FIG. 44);
a wind circulator
for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
(see FIG. 45A);

a wind circulator
for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel
(see FIG. 45B);
a wind circulator
for redirecting wind flow from oppositely flowing horizontally, to flowing into the twenty-four-different-configuration pet kennel, for cooling the twenty-four-different-configuration pet kennel
(see FIG. 45C);
a wind circulator
for redirecting wind flow from flowing horizontally, into the first wind-circulating sail 114a and the second wind-circulating sail 115a being disposed side-by-side atop the twenty-four-different-configuration pet kennel, to flowing downward, into the twenty-four-different-configuration pet kennel, for cooling the inside of the twenty-four-different-configuration pet kennel
(see FIG. 45D); and
a wind circulator
for redirecting wind flow from flowing horizontally, into the first wind-circulating sail 114a and the second wind-circulating sail 115a being disposed longitudinally atop the twenty-four-different-configuration pet kennel, to flowing downward, into the twenty-four-different-configuration pet kennel, for cooling the twenty-four-different-configuration pet kennel
(see FIG. 45E).
b) Functioning as a wind blocker
(attached to the at-least-twenty-four-different-configuration pet kennel in many different way)
to catch and redirect rain water in the direction of arrows 123a and 123b (See FIGS. 38A, 38B, 38C, 38D, and 38E) to flow in many different directions and elevations, and to block wind upward, downward, sideway, and in opposite directions through the at-least-twenty-four-different-configuration pet kennel
(See FIGS. 39, 40, 41, 42, 43, 44, and 45).
For example:
a wind blocker attached to the twenty-four-different-configuration pet kennel,
for preventing cold wind from blowing into the twenty-four-different-configuration pet kennel, to keep a pet warm;
a wind blocker
for blocking rain from entering into the twenty-four-different-configuration pet kennel, to keep a pet dry;
a wind blocker
for providing privacy to multiple pets inside the twenty-four-different-configuration pet kennel;
a wind blocker
for blocking the sun's heat into the twenty-four-different-configuration pet kennel, to keep a pet cool;
a wind blocker
for isolating the twenty-four-different-configuration pet kennels, to keep pets therein isolated; and
a wind blocker
for providing an acoustic wall between multiple twenty-four-different-configuration pet kennels, to reduce noise.

c) Functioning as a roof and gutter
  (attached to the at-least-twenty-four-different-configuration pet kennel in many different way)
    to catch and redirect rain water in the direction of arrows 123a and 123b to flow in many different directions and elevations
    (FIGS. 38A, 38B, and 38C).
  For example:
a gutter
  for collecting rain water
    (see FIGS. 38A, 38B, 38C, and 38D);
a gutter
  for circulating rain water to prevent the rain water from pooling up
    (see FIGS. 38A, 38B, 38C, and 38D); and
a gutter
  for redirecting rain water, to flow in many predetermined directions and elevations
    (see FIGS. 38A, 38B, 38C, and 38D).
d) Functioning as a gutter spout
  (attached to the at-least-twenty-four-different-configuration pet kennel in many different way)
    to catch and redirect rain water in the direction of arrows 123a and 123b to flow in many different directions and elevations
    (FIGS. 38A, 38B, and 38C).
  For example:
a gutter spout, configured by rolling a first six-function panel 102 or a second six-function panel 103 into a tube shape, and banding a
  for leading rain water in a predetermined direction
    (see FIGS. 38B, 38C, and 38D);
a gutter spout
  for leading rain water away from the twenty-four-different-configuration kennel, to keep the twenty-four-different-configuration pet kennel dry
    (see FIGS. 38A, 38B, 38C, and 38D);
a gutter spout
  for leading rain water away from the twenty-four-different-configuration pet kennel, to prevent the rain water from pooling up
    (see FIGS. 38B, 38C, and 38D); and
a gutter spout
  for leading rain water away from the twenty-four-different-configuration pet kennel, to prevent the twenty-four-different-configuration pet kennel from rusting.
e) Functioning as a roof cover, wall cover, floor cover, patio cover, and stilt cover
  (attached to the at-least-twenty-four-different-configuration pet kennel in many different way)
    to catch and redirect rain water in the direction of arrows 123a and 123b to flow in many different directions and elevations
    (See FIGS. 38A, 38B, 38C, 38D, and 38E).
  For example:
a cover
  for partially covering seven first six-function panels 102 and the four second six-function panels 103;
a cover
  for protecting a pet from rain
    (see FIGS. 38E and 46);
a cover
  for shielding a pet from the sun, and
    (see FIG. 46);
a cover
  for providing privacy to a pet from people
    (see FIG. 46).
First wind-circulating grommets 114b respectively are for:
  threading first wind-circulating ball ties 114c and second wind-circulating ball ties 115c therethrough to secure them thereon.
First wind-circulating ball ties 114c respectively are for:
  securing first wind-circulating sail 114a to seven first six-function panels 102, four second six-function panels 103, door panel 104, and/or second wind-circulating sail 115a.
15) Second wind-circulating sail 115a is for:
a) Functioning as a wind circulator
  (attached to the at-least-twenty-four-different-configuration pet kennel in many different way)
    to flow in many different directions and elevations, and to circulate wind in the direction of arrows 124a and 124b upward, downward, sideway, and in opposite directions through the at-least-twenty-four-different-configuration pet kennel
    (See FIGS. 39, 40, 41, 42, 43, 44, 45A, 45B, 45C, 45D, and 45E).
  For example:
a wind circulator
  for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
    (see FIG. 39);
a wind circulator
  for redirecting wind flow from flowing horizontally, to flowing upward, into the twenty-four-different-configuration pet kennel, for cooling the twenty-four-different-configuration pet kennel
    (see FIG. 41);
a wind circulator
  for redirecting wind flow from flowing horizontally to flowing downward, to flowing horizontally, to flowing upward, into the twenty-four-different-configuration pet kennel, for cooling the twenty-four-different-configuration pet kennel
    (see FIG. 42);
a wind circulator
  for redirecting wind flow from flowing horizontally, to flowing upward, into the patio of the twenty-four-different-configuration pet kennel, for cooling the twenty-four-different-configuration pet kennel
    (see FIG. 43);
a wind circulator
  for redirecting wind flow from flowing horizontally, to flowing downward, into the twenty-four-different-configuration pet kennel, for cooling the twenty-four-different-configuration pet kennel
    (see FIG. 44);
a wind circulator
  for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
    (see FIG. 45A);

a wind circulator
for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel (see FIG. 45B);

a wind circulator
for redirecting wind flow from oppositely flowing horizontally, to flowing into the twenty-four-different-configuration pet kennel, for cooling the twenty-four-different-configuration pet kennel (see FIG. 45C);

a wind circulator
for redirecting wind flow from flowing horizontally, into the first wind-circulating sail 114*a* and the second wind-circulating sail 115*a* being disposed side-by-side atop the twenty-four-different-configuration pet kennel, to flowing downward, into the twenty-four-different-configuration pet kennel, for cooling the inside of the twenty-four-different-configuration pet kennel (see FIG. 45D); and a wind circulator
for redirecting wind flow from flowing horizontally, into the first wind-circulating sail 114*a* and the second wind-circulating sail 115*a* being disposed longitudinally atop the twenty-four-different-configuration pet kennel, to flowing downward, into the twenty-four-different-configuration pet kennel, for cooling the twenty-four-different-configuration pet kennel. (see FIG. 45E).

b) Functioning as a wind blocker
(attached to the at-least-twenty-four-different-configuration pet kennel in many different way)
to catch and redirect wind in the direction of arrows 123*a* and 123*b* (See FIGS. 38A, 38B, 38C, 38D, and 38E)
to flow in many different directions and elevations, and
to block wind upward, downward, sideway, and in opposite directions through the at-least-twenty-four-different-configuration pet kennel (See FIGS. 39, 40, 41, 42, 43, 44, and 45).

For example:
a wind blocker attached to the twenty-four-different-configuration pet kennel,
for preventing cold wind from blowing into the twenty-four-different-configuration pet kennel, to keep a pet warm;

a wind blocker
for blocking rain from entering into the twenty-four-different-configuration pet kennel, to keep a pet dry;

a wind blocker
for providing privacy to multiple pets inside the twenty-four-different-configuration pet kennel;

a wind blocker
for blocking the sun beams into the twenty-four-different-configuration pet kennel, to keep a pet cool;

a wind blocker
for isolating the twenty-four-different-configuration pet kennels, to keep pets therein isolated; and a wind blocker
for providing an acoustic wall on the twenty-four-different-configuration pet kennels, to reduce noise.

c) Functioning as a roof and gutter
(attached to the at-least-twenty-four-different-configuration pet kennel in many different way)
to catch and redirect rain water in the direction of arrows 123*a* and 123*b* to flow in many different directions and elevations (FIGS. 38A, 38B, and 38C).

Figure 38E:
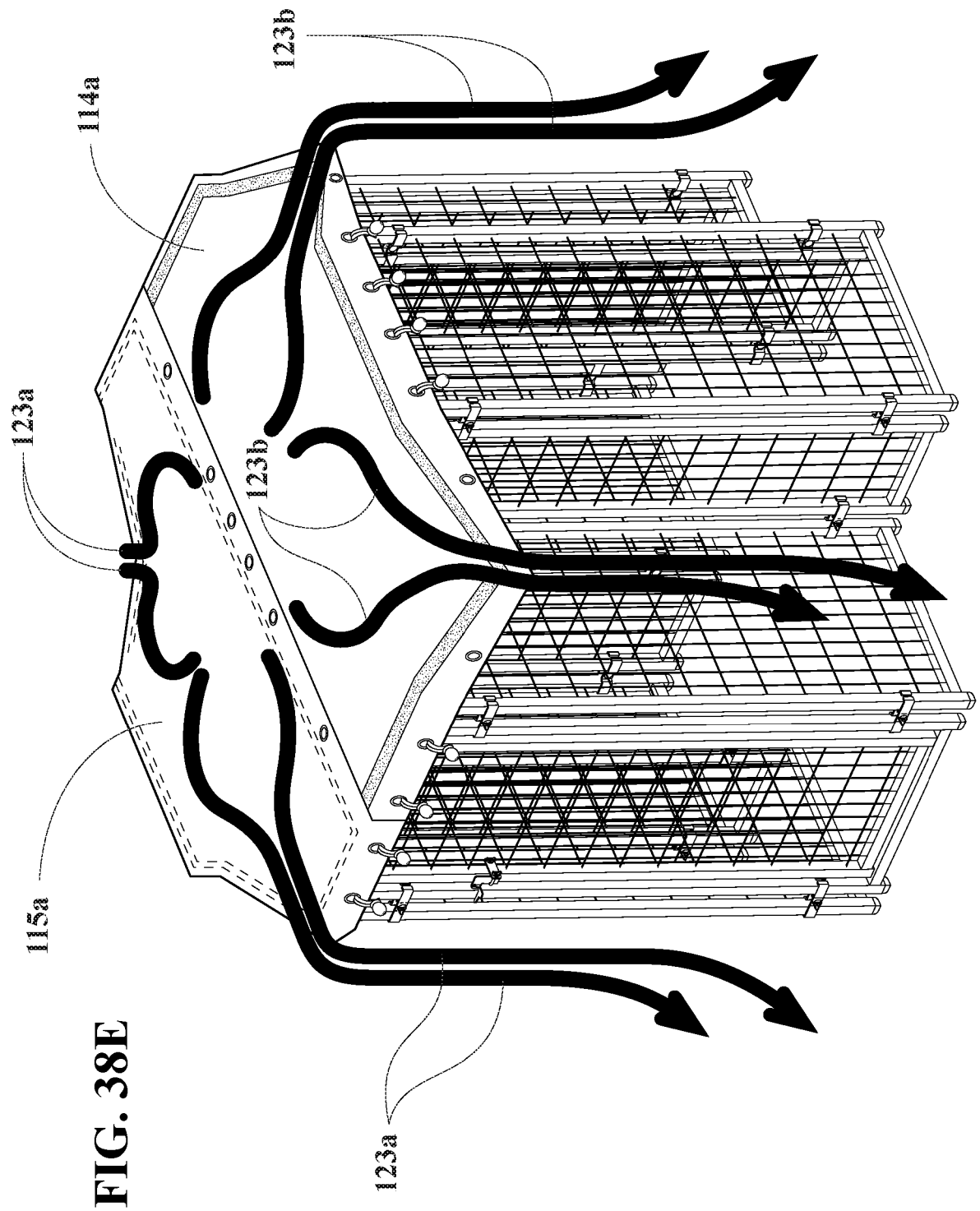
FIG. 38E illustrates a perspective view of the first and second wind-circulating sails functioning as a cover to redirect rain water to flow away from the six-function, twenty-four-configuration panel system.

For example:
a gutter
for collecting rain water
(see FIGS. 38A, 38B, 38C, and 38D);

a gutter
for circulating rain water to prevent the rain water from pooling up
(see FIGS. 38A, 38B, 38C, and 38D); and a gutter
for redirecting rain water, to flow in many predetermined directions and elevations
(see FIGS. 38A, 38B, 38C, and 38D).

d) Functioning as a gutter spout
(attached to the at-least-twenty-four-different-configuration pet kennel in many different way)
to catch and redirect rain water in the direction of arrows 123*a* and 123*b* to flow in many different directions and elevations
(FIGS. 38A, 38B, and 38C);

For example:
a gutter spout, configured by rolling a first six-function panel 102 or a second six-function panel 103 into a tube shape, and banding a
for leading rain water in a predetermined direction (see FIGS. 38B, 38C, and 38D);

a gutter spout
for leading rain water away from the twenty-four-different-configuration kennel, to keep the twenty-four-different-configuration pet kennel dry
(see FIGS. 38A, 38B, 38C, and 38D);

a gutter spout
for leading rain water away from the twenty-four-different-configuration pet kennel, to prevent the rain water from pooling up (see FIGS. 38B, 38C, and 38D); and a gutter spout
for leading rain water away from the twenty-four-different-configuration pet kennel, to prevent the twenty-four-different-configuration pet kennel from rusting;

e) Functioning as a roof cover, wall cover, floor cover, patio cover, and stilt cover
(attached to the at-least-twenty-four-different-configuration pet kennel in many different way)
to catch and redirect rain water in the direction of arrows 123*a* and 123*b* to flow in many different directions and elevations
(See FIGS. 38A, 38B, 38C, 38D, and 38E);

For example:
a cover
for partially covering seven first six-function panels 102 and the four second six-function panels 103;

a cover
for protecting a pet from rain
(see FIGS. 38E and 46);

a cover
for shielding a pet from the sun, and
(see FIG. 46);

a cover
for providing privacy to a pet from people
(see FIG. 46).
Second wind-circulating grommets 115b respectively are for:
threading first wind-circulating ball ties 114c and second wind-circulating ball ties 115c therethrough to secure them thereon.
Second wind-circulating ball ties 115c respectively are for:
securing second wind-circulating ball ties 115c to seven first six-function panels 102, four second six-function panels 103, door panel 104, and/or first wind-circulating sail 114a.
16) First hook-and-loop velcro straps 116 respectively are for:
attaching first wind-circulating sail 114a to second wind-circulating sail 115a.
17) Second hook-and-loop velcro straps 117 respectively are for:
attaching first wind-circulating sail 114a to second wind-circulating sail 115a.
18) Clamp systems 118 respectively are for performing the combined functions of its components.
19) J-shaped clamps 119 respectively are for:
a) Angledly clamping seven first six-function panels 102, four second six-function panels 103, and/or door panel 104 together
to create at least twenty four different kennel-configurations
for at least twenty four different purposes;
b) Parallel clamping seven first six-function panels 102, four second six-function panels 103, and/or door panel 104 together
to create at least twenty four different kennel-configurations
for at least twenty four different purposes;
c) Fastening seven first six-function panels 102, four second six-function panels
103, and/or door panel 104 together
without requiring the use of tools; and
d) Coupling seven first six-function panels 102, four second six-function panels 103, and/or door panel 104 together
to be disposed independently at any position upon the perimeters thereof, respectively.
20) W-shaped clamps 120 respectively are for:
a) Parallel clamping seven first six-function panels 102, four second six-function panels 103, and/or door panel 104 together
to create at least twenty four different kennel-configurations
for at least twenty four different purposes.
b) Fastening seven first six-function panels 102, four second six-function panels 103, and/or door panel 104 together
without requiring the use of tools; and
c) Coupling seven first six-function panels 102, four second six-function panels 103, and/or door panel 104 together
to be disposed independently at any position upon the perimeters thereof, respectively.
21) Square-head screws 121 respectively are for:
securing J-shaped clamps 119 and W-shaped clamps 120 together.
22) Wing-nuts 122 respectively are for:
securing square-head screws 121 on J-shaped clamps 119 and W-shaped clamps 120.

Operation

At-Least-Twenty-Four-Different-Configuration Pet Kennels

Referring to FIGS. 14, 15, 16, 17, 18, 19, 20, 21, 22, 23, 24, 25, 26, 27, 28, 29, 30, 31, 32, 33, 34, 35, 36, and 37, the at-least-twenty-four-different-configuration pet kennel for at least twenty four different purposes (having angled clamp system, parallel clamp system, angled stilt system, parallel stilt system, wind-circulating sail system, and rain-circulating gutter system) can be configured into at least twenty-four-different-configuration pet kennels.

Gutter, Gutter Spout, Wind Circulator, Wind Blocker, and Cover

Referring to FIGS. 38, 39, 40, 41, 42, 43, 44, 45, 46, and 47, first wind-circulating sail 114a and second wind-circulating sail 115a of the at-least-twenty-four-different-configuration pet kennel can work as gutters and gutter spouts to guide water 123a and 123b, wind circulators and wind blockers to guide wind 124a and 124b, roof covers, wall covers, floor covers, patio covers, and stilt covers.

Figure 48A:
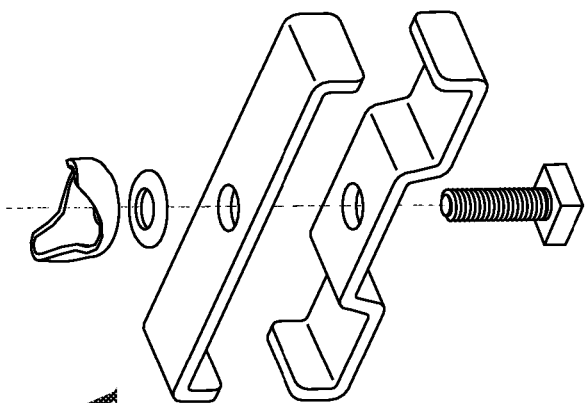
FIGS. 48A and 48B illustrate perspective views of the variations of J-shaped clamps and W-shaped clamps before and after they are assembled.
Figure 48B:
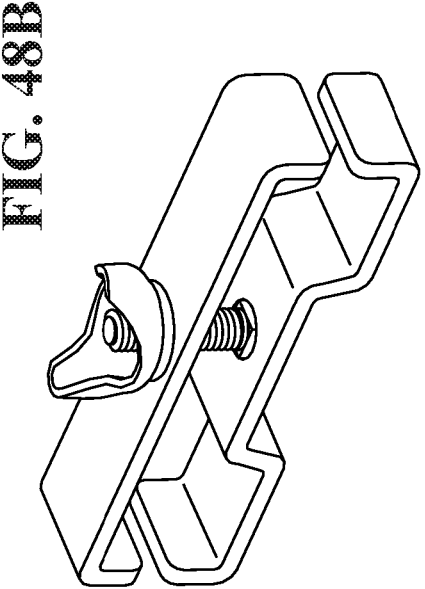
Figure 47:
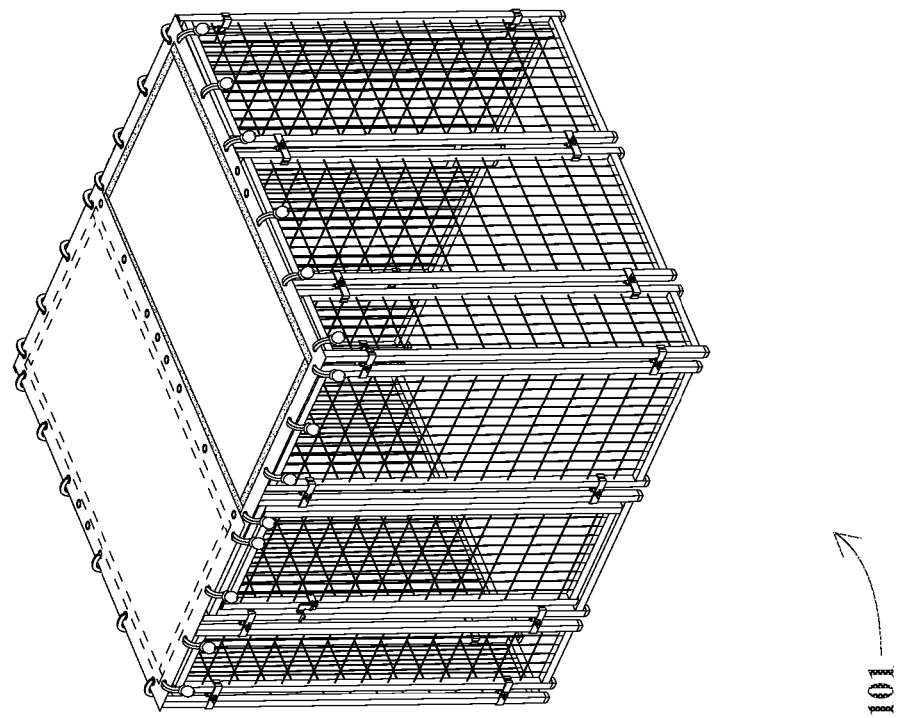

FIGS. 48A and 48B illustrate variations of J-shaped clamp 119 and W-shaped clamp 120.

Major Advantages of the Invention

The present invention substantially departs from the conventional concepts and designs of the prior art. In doing so, the present invention provides a at-least-twenty-four-different-configuration pet kennel, (having: a) Six-function twenty-four-configuration panel system, b) Panel-tube-cap-and-leg systems, c) Wind-circulating sail system, and d) Clamp systems), having many unique and significant features, functions, and advantages, which overcome all the disadvantages of the prior art, as follows:

1) It is an object of the present invention to provide an at-least-twenty-four-different-configuration pet kennel, having
seven first six-function panels 102.
Therefore, the at-least-twenty-four-different-configuration pet kennel:
a) Can function as an angled-stilt panel,
to raise the at-least-twenty-four-different-configuration pet kennel above the ground to keep pets above wet ground, puddles, or uncomfortable terrain,
to create large-footprint stilts to stabilize the at-least-twenty-four-different-configuration pet kennel, and
to create unique entries, exits, and windows
(see FIGS. 14, 15, 16, and 17);
b) Can function as a multi-story floor panel,
to create multiple stories for multiple pets to rest in comfort, and
to separate multiple pets from each other
(see FIGS. 14, 15, 16, and 17);
c) Can function as a door panel,
to hinge door
(see FIGS. 14, 15, 16, and 17);
d) Can function as a window panel,
to form a window
(see FIGS. 14, 15, 16, and 17);
e) Can function as a roof panel,
to provide shelter from the rain and other weather elements
(see FIGS. 14, 15, 16, and 17);

f) Can function as a wall panel,
   to create a temporary enclosement
   (see FIGS. 14, 15, 16, and 17);
g) Can function as a patio panel,
   to allow pets to rest above the ground outside the at-least-twenty-four-different-configuration pet kennel
   (see FIGS. 18 and 21); and
h) Can function in a combination with four second six-function panels 103,
   to form at least twentyfour configurations of the at-least-twenty-four-different-configuration pet kennel such;
   For example:
   an angled-stilt multi-story-roof-and-floor octagon configuration
   (see FIG. 14),
   an angled-stilt multi-story-floor octagon configuration
   (see FIG. 15),
   a parallel-stilt multi-story-roof-and-floor octagon configuration
   (see FIG. 16),
   a parallel-stilt panel multi-story-floor octagon configuration
   (see FIG. 17),
   a opposite-patio multi-kennel configuration
   (see FIG. 18),
   a joint-patio multi-kennel configuration
   (see FIG. 19),
   a parallel-stilt square configuration
   (see FIG. 20),
   a opposite-patio single-kennel configuration
   (see FIG. 21),
   a symmetric-octagon configuration
   (see FIG. 22),
   a asymmetric-octagon configuration
   (see FIG. 23),
   a T-shaped configuration
   (see FIG. 24),
   a X-shaped configuration
   (see FIG. 25),
   a L-shaped configuration
   (see FIG. 26),
   a three-sided corner-configuration
   (see FIG. 27),
   an I-shaped configuration
   (see FIG. 28),
   a rectangular configuration
   (see FIG. 29),
   a square configuration
   (see FIG. 30),
   a three-sided side-door configuration
   (see FIG. 31),
   an asymmetrical L-shaped configuration
   (see FIG. 32),
   a symmetrical L-shaped configuration
   (see FIG. 33),
   an asymmetrical T-shaped configuration
   (see FIG. 34),
   a symmetrical T-shaped configuration
   (see FIG. 35),
   a asymmetric five-sided configuration
   (see FIG. 36), and
   a symmetric seven-sided configuration
   (see FIG. 37).

2) It is another object of the present invention to provide an at-least-twenty-four-different-configuration pet kennel, having
   four second six-function panels 103.
Therefore, the at-least-twenty-four-different-configuration pet kennel:
   a) Can function as an angled-stilt panel,
      to raise the at-least-twenty-four-different-configuration pet kennel above the ground to keep pets above wet ground, puddles, or uncomfortable terrain,
      to create large-footprint stilts to stabilize the at-least-twenty-four-different-configuration pet kennel, and
      to create unique entries, exits, and windows
      (see FIGS. 14, 15, 16, and 17);
   b) Can function as a multi-story floor panel,
      to create multiple stories for multiple pets to rest in comfort, and
      to separate multiple pets from each other
      (see FIGS. 14, 15, 16, and 17);
   c) Can function as a door panel,
      to hinge door
      (see FIGS. 14, 15, 16, and 17);
   d) Can function as a window panel,
      to form a window
      (see FIGS. 14, 15, 16, and 17);
   e) Can function as a roof panel,
      to provide shelter from the rain and other weather element
      (see FIGS. 14, 15, 16, and 17);
   f) Can function as a wall panel,
      to create a temporary enclosement
      (see FIGS. 14, 15, 16, and 17);
   g) Can function as a patio panel,
      to allow pets to rest above the ground outside the at-least-twenty-four-different-configuration pet kennel
      (see FIGS. 18 and 21); and
   h) Functioning in a various configurations with seven first six-function panels 102
      to form at least twentyfour configurations of the at-least-twenty-four-different-configuration pet kennel,
      For example:
      an angled-stilt multi-story-roof-and-floor octagon configuration
      (see FIG. 14),
      an angled-stilt multi-story-floor octagon configuration
      (see FIG. 15),
      a parallel-stilt multi-story-roof-and-floor octagon configuration
      (see FIG. 16),
      a parallel-stilt panel multi-story-floor octagon configuration
      (see FIG. 17),
      a opposite-patio multi-kennel configuration
      (see FIG. 18),
      a joint-patio multi-kennel configuration
      (see FIG. 19),
      a parallel-stilt square configuration
      (see FIG. 20),
      a opposite-patio single-kennel configuration
      (see FIG. 21),
      a symmetric-octagon configuration
      (see FIG. 22), a asymmetric-octagon configuration
(see FIG. 23),
a T-shaped configuration
(see FIG. 24),
a X-shaped configuration
(see FIG. 25),
a L-shaped configuration
(see FIG. 26),
a three-sided corner-configuration
(see FIG. 27),
an I-shaped configuration
(see FIG. 28),
a rectangular configuration
(see FIG. 29),
a square configuration
(see FIG. 30),
a three-sided side-door configuration
(see FIG. 31),
an asymmetrical L-shaped configuration
(see FIG. 32),
a symmetrical L-shaped configuration
(see FIG. 33),
an asymmetrical T-shaped configuration
(see FIG. 34),
a symmetrical T-shaped configuration
(see FIG. 35),
a asymmetric five-sided configuration
(see FIG. 36), and
a symmetric seven-sided configuration
(see FIG. 37).

3) It is a further object of the present invention to provide an at-least-twenty-four-different-configuration pet kennel, having
a first wind-circulating sail 114*a*.

Therefore, the at-least-twenty-four-different-configuration pet kennel:
a) Can function as a wind circulator
(attached to the at-least-twenty-four-different-configuration pet kennel in many different way),
to catch and redirect rain water in the direction of arrows 123*a* and 123*b* (See FIGS. 38A, 38B, 38C, 38D, and 38E)
to flow in many different directions and elevations, and
to circulate wind in the direction of arrows 124*a* and 124*b*, upward, downward, sideway, and in opposite directions through the at-least-twenty-four-different-configuration pet kennel
(See FIGS. 39, 40, 41, 42, 43, 44, 45A, 45B, 45C, 45D, and 45E);
For example:
a wind circulator
for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
(see FIG. 39);
a wind circulator
for redirecting wind flow from flowing horizontally, to flowing upward, into the twenty-four-different-configuration pet kennel, for cooling the twenty-four-different-configuration pet kennel
(see FIG. 41);
a wind circulator
for redirecting wind flow from flowing horizontally to flowing downward, to flowing horizontally, to flowing upward, into the twenty-four-different-configuration pet kennel, for cooling the twenty-four-different-configuration pet kennel
(see FIG. 42);
a wind circulator
for redirecting wind flow from flowing horizontally, to flowing upward, into the patio of the twenty-four-different-configuration pet kennel, for cooling the twenty-four-different-configuration pet kennel
(see FIG. 43);
a wind circulator
for redirecting wind flow from flowing horizontally, to flowing downward, into the twenty-four-different-configuration pet kennel, for cooling the twenty-four-different-configuration pet kennel
(see FIG. 44);
a wind circulator
for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
(see FIG. 45A);
a wind circulator
for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel
(see FIG. 45B);
a wind circulator
for redirecting wind flow from oppositely flowing horizontally, to flowing into the twenty-four-different-configuration pet kennel, for cooling the twenty-four-different-configuration pet kennel
(see FIG. 45C);
a wind circulator
for redirecting wind flow from flowing horizontally, into the first wind-circulating sail 114*a* and the second wind-circulating sail 115*a* being disposed side-by-side atop the twenty-four-different-configuration pet kennel, to flowing downward, into the twenty-four-different-configuration pet kennel, for cooling the inside of the twenty-four-different-configuration pet kennel
(see FIG. 45D); and
a wind circulator
for redirecting wind flow from flowing horizontally, into the first wind-circulating sail 114*a* and the second wind-circulating sail 115*a* being disposed longitudinally atop the twenty-fourdifferent-configuration pet kennel, to flowing downward, into the twenty-four-different-configuration pet kennel, for cooling the twenty-four-different-configuration pet kennel
(see FIG. 45E).

b) Can function as a wind blocker
(attached to the at-least-twenty-four-different-configuration pet kennel in many different way),
to catch and redirect rain water in the direction of arrows 123*a* and 123*b* to flow in many different directions and elevations
(See FIGS. 38A, 38B, 38C, 38D, and 38E), and
to block wind upward, downward, sideway, and in opposite directions through the at-least-twenty-four-different-configuration pet kennel
(See FIGS. 39, 40, 41, 42, 43, 44, 45A, 45B, 45C, 45D, and 45E);
For example:
a wind blocker attached to the twenty-four-different-configuration pet kennel,
for preventing cold wind from blowing into the twenty-four-different-configuration pet kennel, to keep a pet warm;
a wind blocker
for blocking rain from entering into the twenty-four-different-configuration pet kennel, to keep a pet dry;
a wind blocker
for providing privacy to multiple pets inside the twenty-four-different-configuration pet kennel;
a wind blocker
for blocking the sun's heat into the twenty-four-different-configuration pet kennel, to keep a pet cool;
a wind blocker
for isolating the twenty-four-different-configuration pet kennels, to keep pets therein isolated; and
a wind blocker
for providing an acoustic wall between multiple twenty-four-different-configuration pet kennels, to reduce noise;

c) Can function as a roof and gutter
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C);
For example:
a gutter
for collecting rain water
(see FIGS. 38A, 38B, 38C, and 38D);
a gutter
for circulating rain water to prevent the rain water from pooling up
(see FIGS. 38A, 38B, 38C, and 38D); and
a gutter
for redirecting rain water, to flow in many predetermined directions and elevations
(see FIGS. 38A, 38B, 38C, and 38D);

d) Can function as a gutter spout
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C); and
For example:
a gutter spout, configured by rolling a first six-function panel 102 or a second six-function panel 103 into a tube shape, and banding a
for leading rain water in a predetermined direction
(see FIGS. 38B, 38C, and 38D);
a gutter spout
for leading rain water away from the twenty-four-different-configuration kennel, to keep the twenty-four-different-configuration pet kennel dry
(see FIGS. 38A, 38B, 38C, and 38D);
a gutter spout
for leading rain water away from the twenty-four-different-configuration pet kennel, to prevent the rain water from pooling up
(see FIGS. 38B, 38C, and 38D); and
a gutter spout
for leading rain water away from the twenty-four-different-configuration pet kennel, to prevent the twenty-four-different-configuration pet kennel from rusting;

e) Can function as a roof cover, wall cover, floor cover, patio cover, and stilt cover
(attached to the at-least-twenty-four-different-configuration pet kennel in many different way),
to catch and redirect rain water in the direction of arrows 123*a* and 123*b* to flow in many different directions and elevations
(FIGS. 38A, 38B, and 38C);
For example:
a cover
for partially covering seven first six-function panels 102 and the four second six-function panels 103;
a cover
for protecting a pet from rain
(see FIGS. 38E and 46);
a cover
for shielding a pet from the sun, and
(see FIG. 46);
a cover
for providing privacy to a pet from people
(see FIG. 46).

Figure 39:
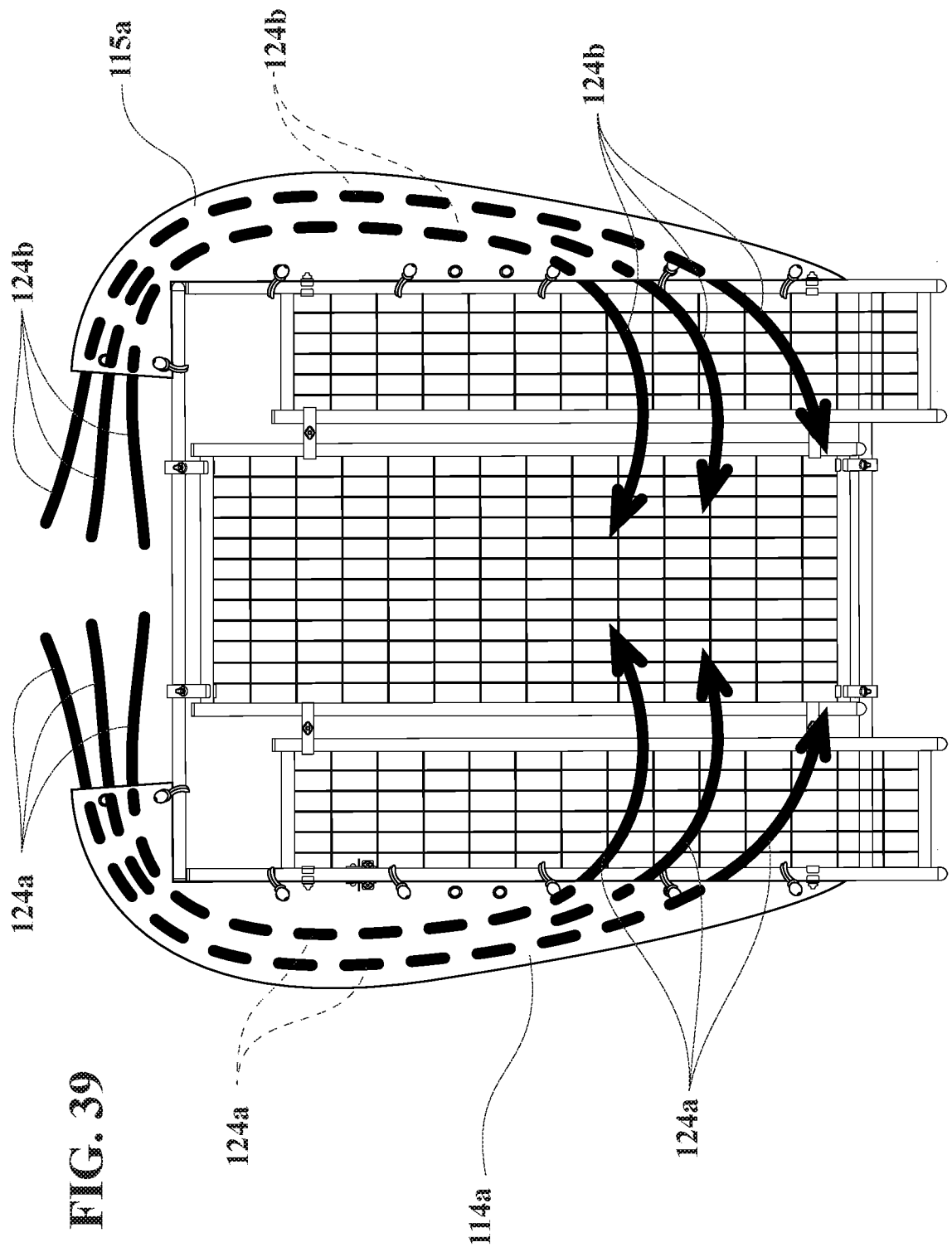
Figure 40:
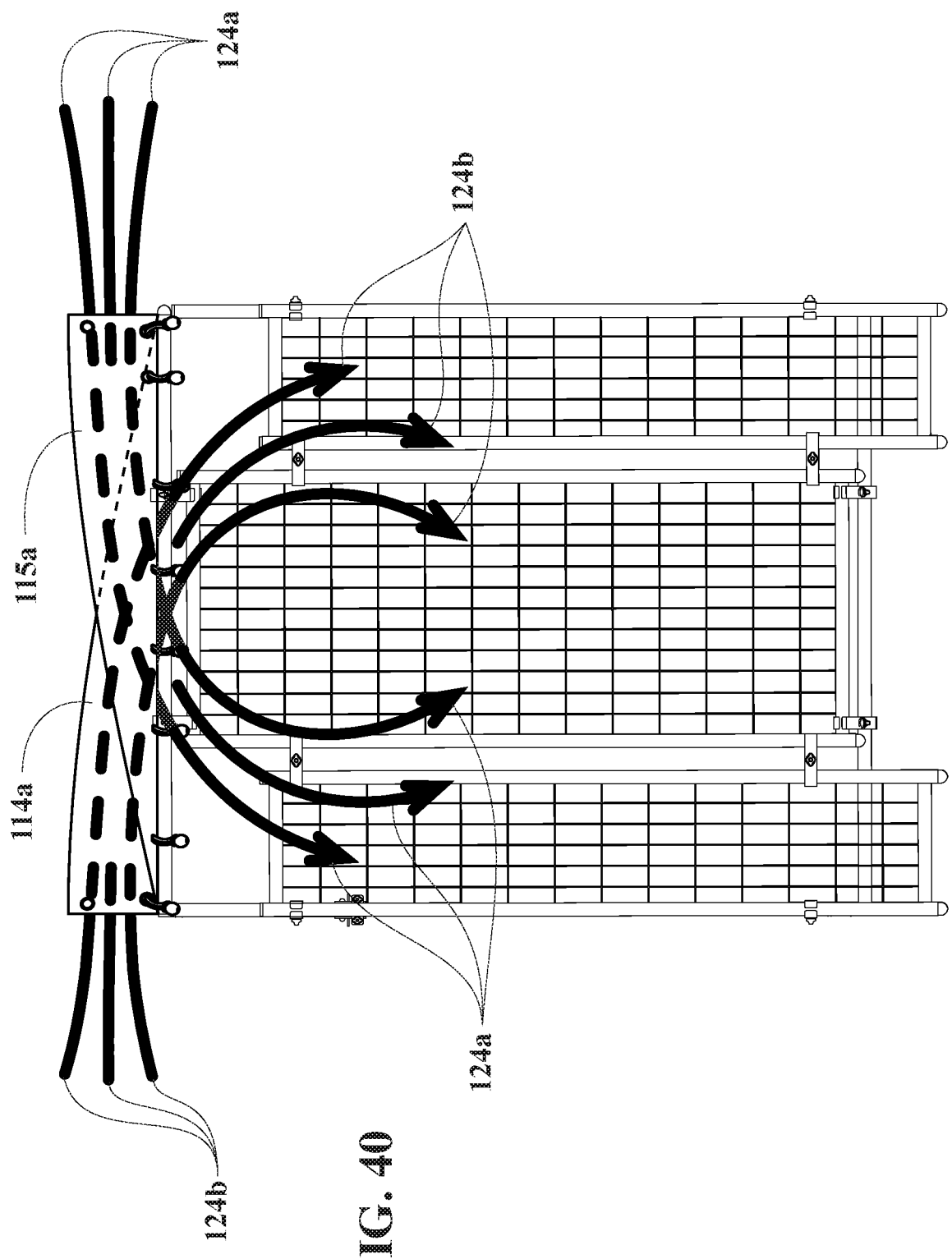
Figure 41:
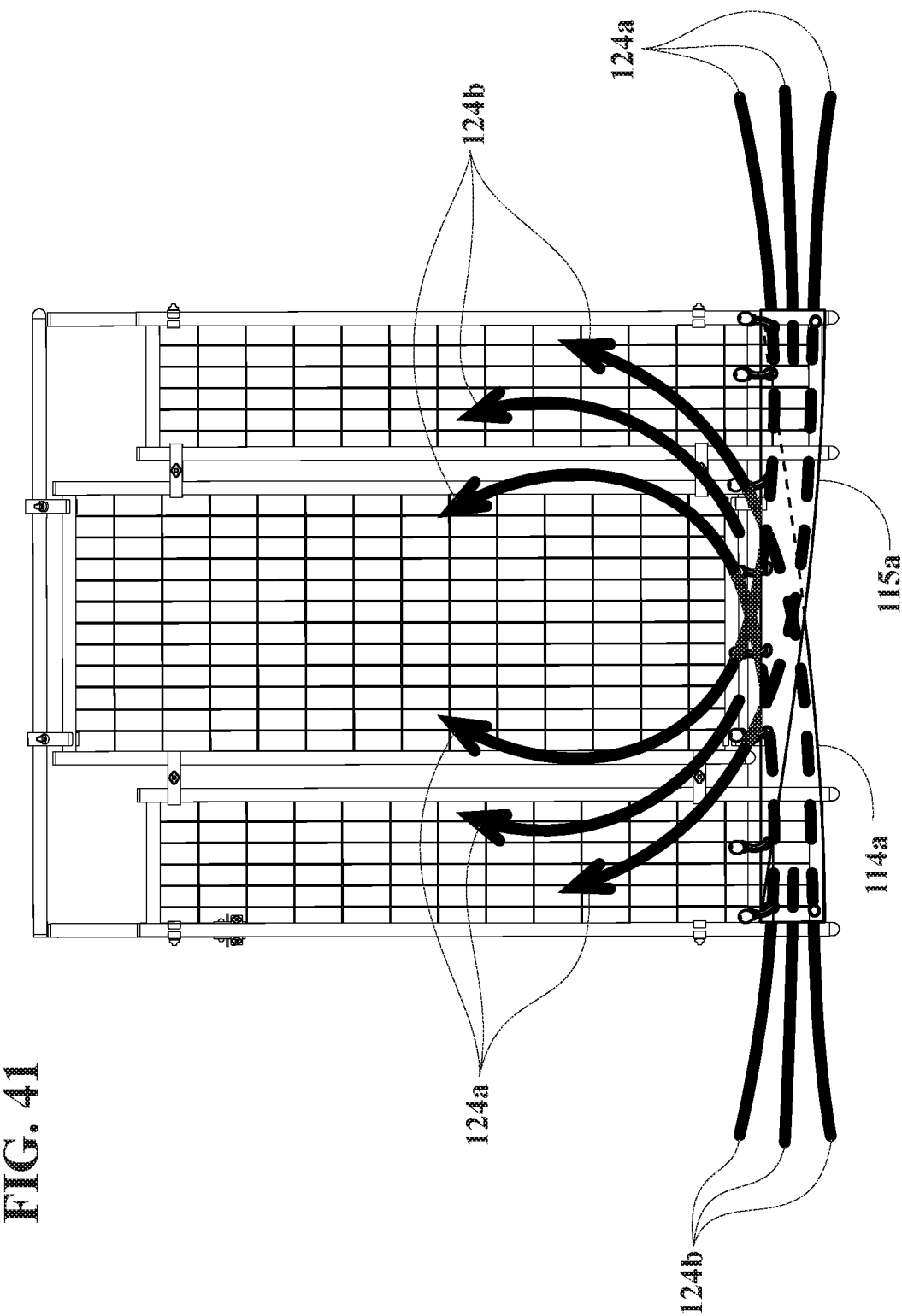
Figure 42:
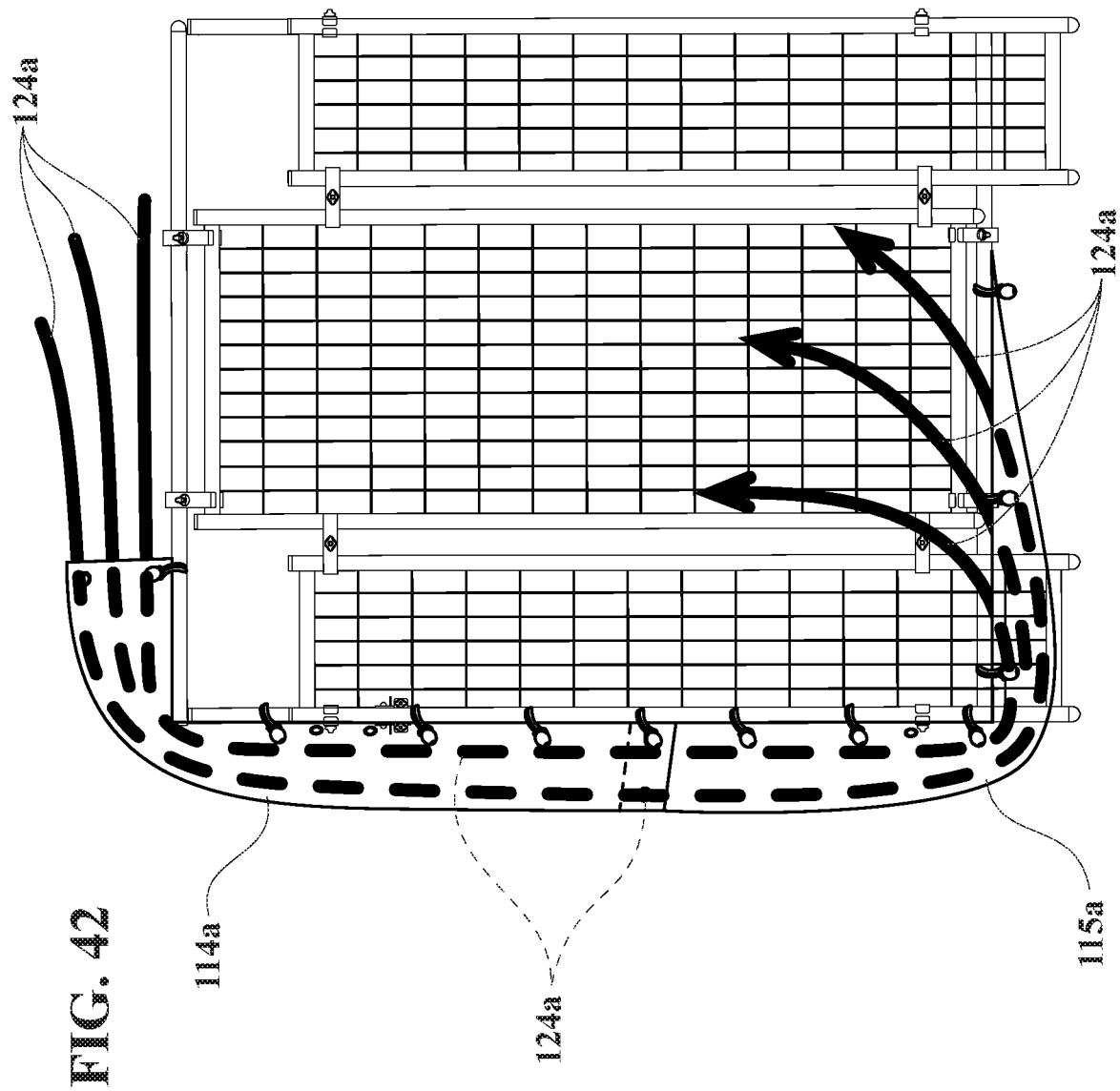
Figure 43:
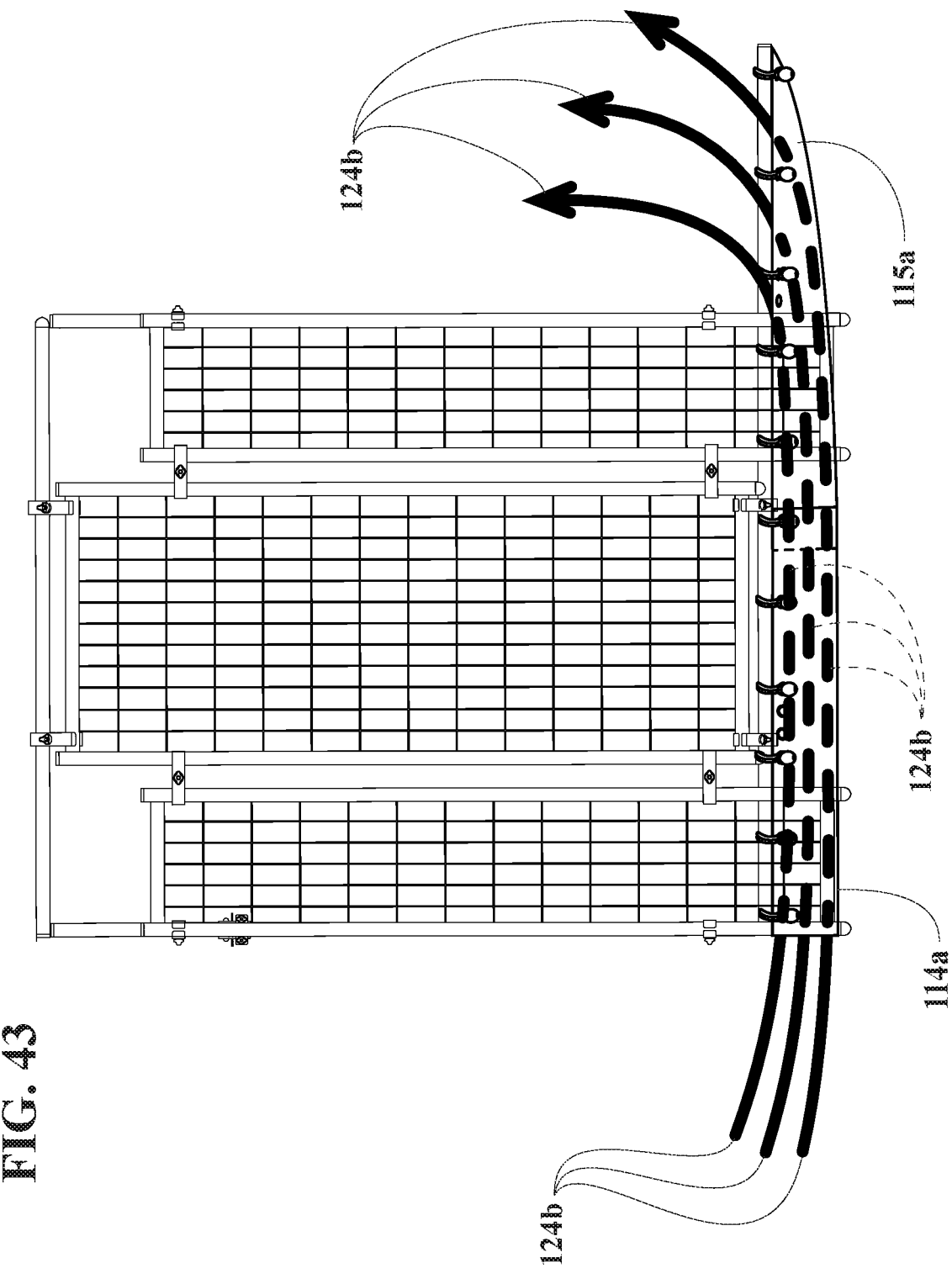
Figure 44:
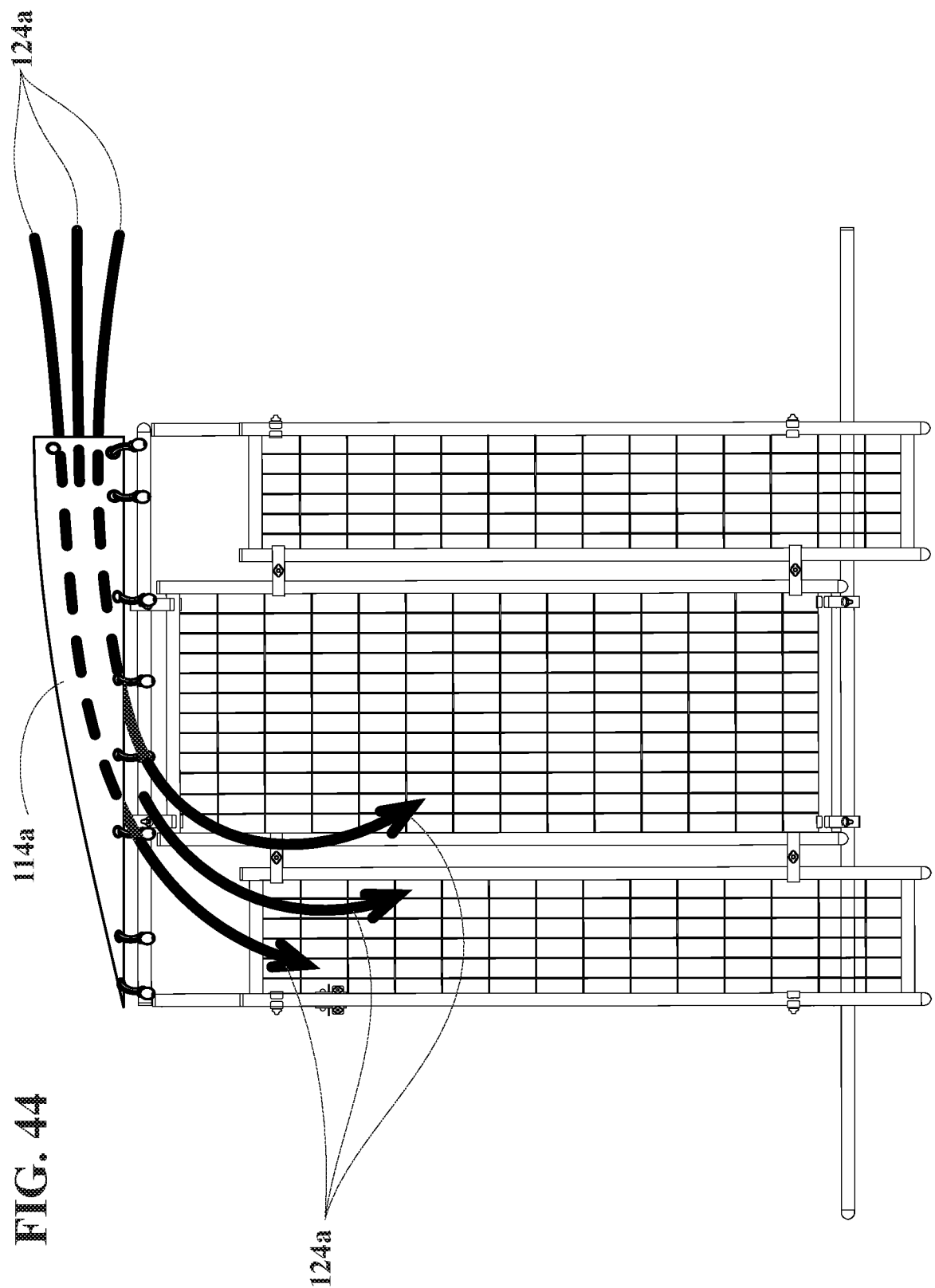
Figure 45E:
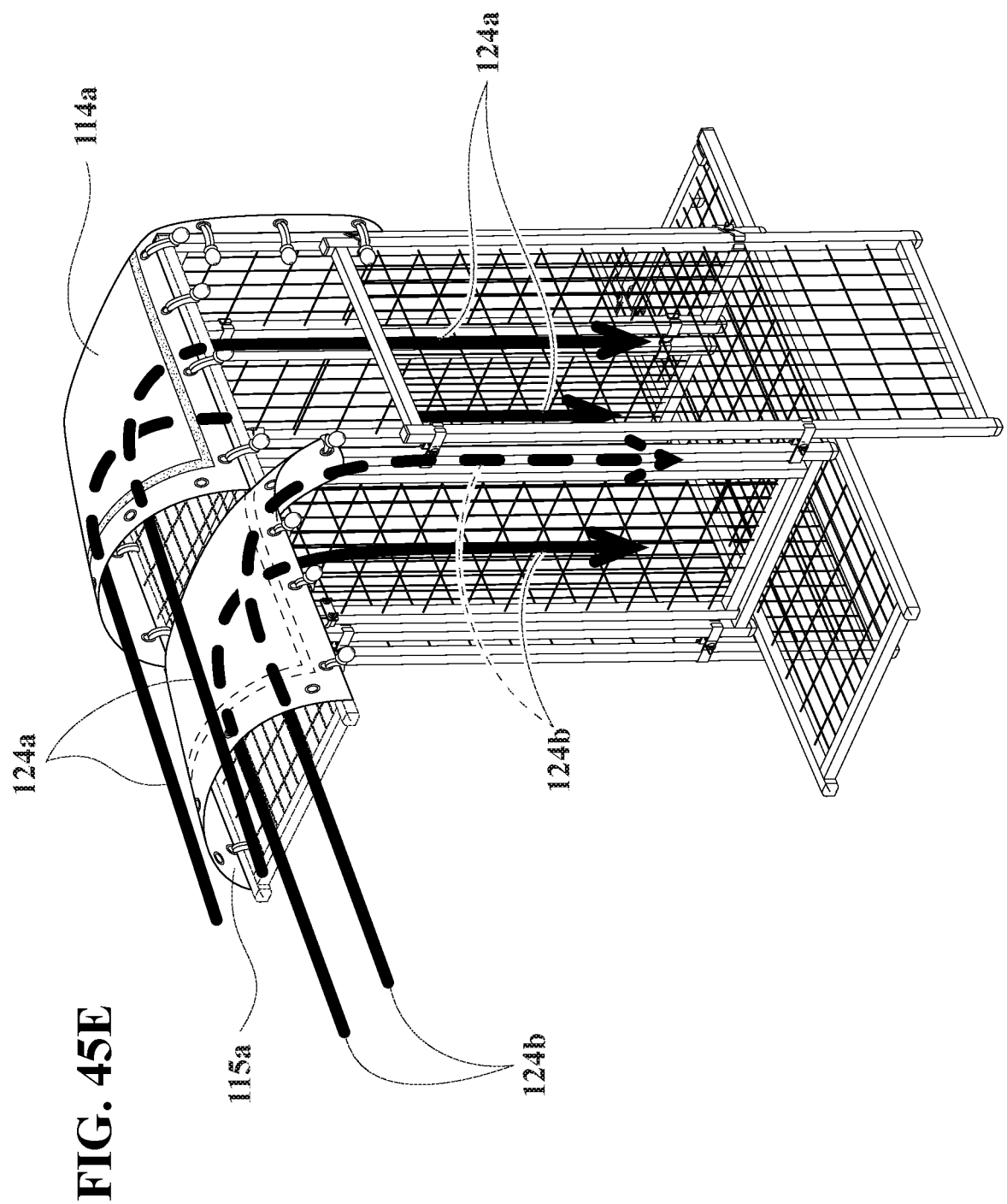

4) It is an even further object of the present invention to provide an at-least-twenty-four-different-configuration pet kennel, having
a second wind-circulating sail 115*a*.
Therefore, the at-least-twenty-four-different-configuration pet kennel:
a) Can function as a wind circulator
(attached to the at-least-twenty-four-different-configuration pet kennel in many different way),
to catch and redirect rain water in the direction of arrows 123*a* and 123*b* (See FIGS. 38A, 38B, 38C, 38D, and 38E),
to flow in many different directions and elevations, and
to circulate wind in the direction of arrows 124*a* and 124*b*, upward, downward, sideway, and in opposite directions through the at-least-twenty-four-different-configuration pet kennel
(See FIGS. 39, 40, 41, 42, 43, 44, 45A, 45B, 45C, 45D, and 45E);

For example:
a wind circulator
- for redirecting wind flow from flowing horizontally above the twenty-four-different-configuration pet kennel, to flowing downward, to flowing horizontally into the twenty-four-different-configuration pet kennel for cooling and keeping the twenty-four-different-configuration pet kennel dry
  (see FIG. 39);

a wind circulator
- for redirecting wind flow from flowing horizontally, to flowing upward, into the twenty-four-different-configuration pet kennel, for cooling the twenty-four-different-configuration pet kennel
  (see FIG. 41);

a wind circulator
- for redirecting wind flow from flowing horizontally to flowing downward, to flowing horizontally, to flowing upward, into the twenty-four-different-configuration pet kennel, for cooling the twenty-four-different-configuration pet kennel
  (see FIG. 42);

a wind circulator
- for redirecting wind flow from flowing horizontally, to flowing upward, into the patio of the twenty-four-different-configuration pet kennel, for cooling the twenty-four-different-configuration pet kennel
  (see FIG. 43);

a wind circulator
- for redirecting wind flow from flowing horizontally, to flowing downward, into the twenty-four-different-configuration pet kennel, for cooling the twenty-four-different-configuration pet kennel
  (see FIG. 44);

a wind circulator
- for redirecting wind flow from flowing horizontally through the twenty-four-different-configuration pet kennel, to flowing out of the twenty-four-different-configuration pet kennel, to flowing downward, to flowing horizontally under the twenty-four-different-configuration pet kennel, to flowing upward, into the twenty-four-different-configuration pet kennel, for cooling the twenty-four-different-configuration pet kennel
  (see FIG. 45A);

a wind circulator
- for being secured to the two second six-function panels 103, above the twenty-four-different-configuration pet kennel, and redirecting wind flow from flowing horizontally, to flowing downward, to flowing horizontally in an opposite direction, into the twenty-four-different-configuration pet kennel for cooling the twenty-four-different-configuration pet kennel
  (see FIG. 45B);

a wind circulator
- for redirecting wind flow from oppositely flowing horizontally, to flowing into the twenty-four-different-configuration pet kennel, for cooling the twenty-four-different-configuration pet kennel
  (see FIG. 45C);

a wind circulator
- for redirecting wind flow from flowing horizontally, into the first wind-circulating sail 114a and the second wind-circulating sail 115a being disposed side-by-side atop the twenty-four-different-configuration pet kennel, to flowing downward, into the twenty-four-different-configuration pet kennel, for cooling the inside of the twenty-four-different-configuration pet kennel
  (see FIG. 45D); and a wind circulator
- for redirecting wind flow from flowing horizontally, into the first wind-circulating sail 114a and the second wind-circulating sail 115a being disposed longitudinally atop the twenty-four-different-configuration pet kennel, to flowing downward, into the twenty-four-different-configuration pet kennel, for cooling the twenty-four-different-configuration pet kennel
  (see FIG. 45E);

b) Can function as a wind blocker
(attached to the at-least-twenty-four-different-configuration pet kennel in many different way),
to catch and redirect rain water in the direction of arrows 123a and 123b to flow in many different directions and elevations
(See FIGS. 38A, 38B, 38C, 38D, and 38E), and
to block wind upward, downward, sideway, and in opposite directions through the at-least-twenty-four-different-configuration pet kennel
(See FIGS. 39, 40, 41, 42, 43, 44, 45A, 45B, 45C, 45D, and 45E);

For example:
a wind blocker attached to the twenty-four-different-configuration pet kennel,
- for preventing cold wind from blowing into the twenty-four-different-configuration pet kennel, to keep a pet warm;

a wind blocker
- for blocking rain from entering into the twenty-four-different-configuration pet kennel, to keep a pet dry;

a wind blocker
- for providing privacy to multiple pets inside the twenty-four-different-configuration pet kennel;

a wind blocker
- for blocking the sun's heat into the twenty-four-different-configuration pet kennel, to keep a pet cool;

a wind blocker
- for isolating the twenty-four-different-configuration pet kennels, to keep pets therein isolated; and a wind blocker
- for providing an acoustic wall between multiple twenty-four-different-configuration pet kennels, to reduce noise;

c) Can function as a roof and gutter
(attached to the at-least-twenty-four-different-configuration pet kennel in many different way),
to catch and redirect rain water in the direction of arrows 123a and 123b to flow in many different directions and elevations
(FIGS. 38A, 38B, and 38C);

For example:
a gutter
for collecting rain water
(see FIGS. 38A, 38B, 38C, and 38D);
a gutter
for circulating rain water to prevent the rain water from pooling up
(see FIGS. 38A, 38B, 38C, and 38D); and
a gutter
for redirecting rain water, to flow in many predetermined directions and elevations
(see FIGS. 38A, 38B, 38C, and 38D);
d) Can function as a gutter spout
(attached to the at-least-twenty-four-different-configuration pet kennel in many different way),
to catch and redirect rain water in the direction of arrows 123a and 123b to flow in many different directions and elevations
(FIGS. 38A, 38B, and 38C); and
For example:
a gutter spout, configured by rolling a first six-function panel 102 or a second six-function panel 103 into a tube shape, and banding a
for leading rain water in a predetermined direction
(see FIGS. 38B, 38C, and 38D);
a gutter spout
for leading rain water away from the twenty-four-different-configuration kennel, to keep the twenty-four-different-configuration pet kennel dry
(see FIGS. 38A, 38B, 38C, and 38D);
a gutter spout
for leading rain water away from the twenty-four-different-configuration pet
kennel, to prevent the rain water from pooling up
(see FIGS. 38B, 38C, and 38D); and
a gutter spout
for leading rain water away from the twenty-four-different-configuration pet kennel, to prevent the twenty-four-different-configuration pet kennel from rusting;
e) Can function as a roof cover, wall cover, floor cover, patio cover, and stilt cover
(attached to the at-least-twenty-four-different-configuration pet kennel in many different way),
to catch and redirect rain water in the direction of arrows 123a and 123b, to flow in many different directions and elevations
(FIGS. 38A, 38B, and 38C);
For example:
a cover
for partially covering seven first six-function panels 102 and the four
second six-function panels 103;
a cover
for protecting a pet from rain
(see FIGS. 38E and 46);
a cover
for shielding a pet from the sun, and
(see FIG. 46);
a cover
for providing privacy to a pet from people
(see FIG. 46).
5) It is another object of the present invention to provide an at-least-twenty-four-different-configuration pet kennel, having
panel-tube legs 110a.

Therefore, the at-least-twenty-four-different-configuration pet kennel:
a) Can lift the at-least-twenty-four-different-configuration pet kennel,
to allow cleaning thereunder;
b) Can protect a floor surface under the at-least-twenty-four-different-configuration pet kennel from being scratched;
c) Can plug the tube bottoms of seven first six-function panels, four second six-function panels, and door panel,
to prevent fleas and ticks from hiding inside the tube bottoms from sprays, and thus from being able to get right back on pets; and
d) Can dampen the bottom contact points of the at-least-twenty-four-different-configuration pet kennel,
to provide shock-absorption and reduced impact upon floors, vehicles, and other surfaces, when placed and/or transported thereupon.
6) It is another object of the present invention to provide an at-least-twenty-four-different-configuration pet kennel, having
tick-blocking teeth 111.
Therefore, the at-least-twenty-four-different-configuration pet kennel:
a) Can prevent ticks from entering through water-draining holes,
to prevent ticks from avoiding tick-killing spray;
b) Can prevent ticks from entering through water-draining holes,
to prevent ticks from hiding therein
(See FIG. 9B); and
c) Can prevent ticks from hiding inside,
to protect pets from tick diseases
(See FIG. 9B).
7) It is yet another object of the present invention to provide an at-least-twenty-four-different-configuration pet kennel, having
water-draining holes 112.
Therefore, the at-least-twenty-four-different-configuration pet kennel:
a) Can allow water and condensation to drip downward,
to prevent rusting
(See FIG. 9A);
b) Can allow condensation and rain water to drain away,
to prevent rusting
(See FIG. 9A); and
c) Can allow condensation to evaporate,
to prevent rusting.
8) It is still yet another object of the present invention to provide an at-least-twenty-four-different-configuration pet kennel, having
J-shaped clamps 119.
Therefore, the at-least-twenty-four-different-configuration pet kennel:
a) Can angledly clamp seven first six-function panels, four second six-function panels, and/or door panel together,
to create at least twenty four different kennel-configurations for at least twenty four different purposes;
b) Can clamp seven first six-function panels, four second six-function panels, and/or door panel together, to create at least twenty four different kennel-configurations for at least twenty four different purposes;
c) Can fasten seven first six-function panels, to four second six-function panels, and/or door panel, to secure panels together without requiring the use of tools; and
d) Can couple seven first six-function panels, to four second six-function panels, and/or door panel, to be disposed independently at any position upon the perimeters thereof, respectively.

9) It is still yet an even further object of the present invention to provide an at-least-twenty-four-different-configuration pet kennel, having
W-shaped clamps 120.
Therefore, the at-least-twenty-four-different-configuration pet kennel:
a) Can clamp seven first six-function panels, four second six-function panels, and/or door panel together,
to create at least twenty four different kennel-configurations for at least twenty four different purposes;
b) Can fasten seven first six-function panels, to four second six-function panels, and/or door panel, to secure panels together without requiring the use of tools; and
c) Can couple seven first six-function panels, to four second six-function panels and/or door panel, to be disposed independently at any position upon the perimeters thereof, respectively.

What is claimed is:
1. An at-least-twenty-four-configuration pet kennel comprising:
seven first panels,
said seven first panels
having a plurality of first-panel top ends and
a plurality of first-panel bottom ends;
four second panels,
said four second panels narrower than said seven first panels,
said four second panels
having a plurality of second-panel top ends and
a plurality of second-panel bottom ends,
said four second panels
respectively clamped to one another and said seven first panels;
a door panel,
said door panel
having a plurality of door-panel top ends and
a plurality of door-panel bottom ends,
said door panel
clamped to two adjacent ones of said seven first panels and
said four second panels;
a door,
said door
swingably hinged to said door panel;
two door hinges,
said two door hinges
respectively welded to said door panel;
a door screw,
said door screw
screwed on one of said two door hinges;
a U-shaped door latch,
said U-shaped door latch
pivotably clamped to said door;
a plurality of panel-tube caps,
said panel-tube caps
respectively snapped into said first-panel top ends, said second-panel top
ends, and said door-panel top ends of said seven first panels, said four second panels, and said door panel;
a plurality of cap rings,
said cap rings
respectively molded to said panel-tube caps;
a plurality of panel-tube legs,
said panel-tube legs
respectively snapped into said first-panel bottom ends, said second-panel bottom ends, and said door-panel bottom ends of said seven first
panels, said four second panels, and said door panel;
a plurality of leg rings,
said leg rings
respectively molded to said panel-tube legs;
a plurality of water-draining holes,
said water-draining holes
having a plurality of water-draining-hole walls,
said water-draining holes
respectively molded inside said panel-tube legs;
a plurality of tick-blocking teeth,
said tick-blocking teeth
respectively molded to said water-draining-hole walls of said water-draining holes;
a first wind-circulating sail,
said first wind-circulating sail
attached to said seven first panels, said four second panels, and said door panel;
a plurality of first wind-circulating grommets,
said first wind-circulating grommets
respectively clamped on said first wind-circulating sail; and
a plurality of first wind-circulating ball ties,
said first wind-circulating ball ties
respectively threaded through said first wind-circulating grommets;
a second wind-circulating sail,
said second wind-circulating sail
attached to said first wind-circulating sail, said seven first panels,
said four second panels, and said door panel;
a plurality of second wind-circulating grommets,
said second wind-circulating grommets
respectively clamped on said second wind-circulating sail;
a plurality of second wind-circulating ball ties,
said second wind-circulating ball ties
respectively threaded through said second wind-circulating grommets;
a plurality of first hook-and-loop straps,
said first straps
respectively sewn to said first wind-circulating sail;
a plurality of second hook-and-loop straps,
said second hook-and-loop straps
respectively sewn to said second wind-circulating sail;
a plurality of J-shaped clamps,
said J-shaped clamps
respectively clamped to said seven first panels, said four second panels, and said door panel;
a plurality of W-shaped clamps,
said W-shaped clamps
respectively clamped to of said seven first panels, said four second panels, and said door panel;

a plurality of square-head screws,
   said square-head screws
     respectively screwed through said J-shaped clamps and said W-shaped clamps; and
a plurality of wing-nuts,
   said wing-nuts
     respectively screwed onto said square-head screws,
wherein
said seven first panels respectively are for:
   functioning as angled stilts
     to raise and stabilize said at-least-twenty-four-configuration pet kennel above the ground,
   functioning as floors
     to create multiple stories inside said at-least-twenty-four-configuration pet kennel,
   functioning as windows,
   functioning as roofs,
   functioning as walls,
   functioning as patios, and
   forming at least twenty four configurations of said at-least-twenty-four-configuration pet kennel,
said four second panels respectively are for:
   functioning as parallel stilts
     to raise and stabilize said at-least-twenty-four-configuration pet kennel above the ground,
   functioning as floors
     to create multiple stories inside said at-least-twenty-four-configuration pet kennel,
   functioning as windows,
   functioning as roofs,
   functioning as walls,
   functioning as patios, and
   forming at least twenty four configurations of said at-least-twenty-four-configuration pet kennel,
said door screw is for:
   locking said door on said two door hinges,
said U-shaped door latch is for:
   releasably latching said door to said door panel,
said panel-tube legs respectively are for:
   lifting said at-least-twenty-four-configuration pet kennel,
   plugging said first-panel bottom ends, said second-panel bottom ends, and said door-panel bottom ends,
   preventing fleas and ticks from hiding inside said first-panel bottom ends, said second-panel bottom ends, and said door-panel bottom ends, and
   providing shock-absorption,
said tick-blocking teeth respectively are for:
   preventing ticks from entering said water-draining holes, and from hiding inside said seven first panels, said four second panels, and said door panel,
   preventing ticks from avoiding tick-killing spray, and
   preventing ticks from hiding inside said seven first panels, said four second panels, and said door panel to protect pets from diseases,
said water-draining holes respectively are for:
   allowing rain water to drain away from said seven first panels, said four second panels, and said door panel,
   preventing said seven first panels, said four second panels, and said door panel from rusting,
   allowing water to drip downward, and
   allowing condensation to evaporate,
said first wind-circulating sail is for:
   circulating and redirecting wind in many directions and elevations through said at-least-twenty-four-configuration pet kennel,
   blocking and catching wind from many directions and elevations from entering said at-least-twenty-four-configuration pet kennel,
   functioning as a roof,
   functioning as a gutter,
   functioning as a gutter spout,
   redirecting rain water in many directions and elevations, away from said at-least-twenty-four-configuration pet kennel,
   blocking and catching rain water from many directions and elevations from entering said at-least-twenty-four-configuration pet kennel,
   functioning as a roof cover,
   functioning as a wall cover,
   functioning as a floor cover,
   functioning as a patio cover, and
   functioning as a stilt cover,
said second wind-circulating sail is for:
   circulating and redirecting wind in many directions and elevations through said at-least-twenty-four-configuration pet kennel,
   blocking and catching wind from many directions and elevations from entering said at-least-twenty-four-configuration pet kennel,
   functioning as a roof,
   functioning as a gutter,
   functioning as a gutter spout,
   redirecting rain water in many directions and elevations, away from said at-least-twenty-four-configuration pet kennel,
   blocking and catching rain water from many directions and elevations from entering said at-least-twenty-four-configuration pet kennel,
   functioning as a roof cover,
   functioning as a wall cover,
   functioning as a floor cover,
   functioning as a patio cover, and
   functioning as a stilt cover,
said J-shaped clamps respectively are for:
   angledly clamping said seven first panels, said four second panels, and said door panel together,
     to create at least twenty four kennel configurations,
   parallelly clamping said seven first panels, said four second panels, and said door panel together
     to create at least twenty four kennel configurations, and
   fastening said seven first panels, said four second panels, and said door panel together without using tools,
said W-shaped clamps respectively are for:
   parallelly clamping said seven first six function panels, said four second panels, and said door panel together
     to create at least twenty four kennel configurations, and
   fastening said seven first panels, said four second panels, and said door panel together without using tools.

2. The at-least-twenty-four-configuration pet kennel of claim 1,
   wherein said J-shaped clamps clamp said seven first panels and said four second panels together such that at least one of said seven first panels and said four second panels is angled at 30 degrees, 45 degrees, or 60 degrees.

3. The at-least-twenty-four-configuration pet kennel of claim 1,
   wherein said at-least-twenty-four-configuration pet kennel has a foot print, wherein at least one of said seven first panels and said four second panels is angled for increasing said foot print.

4. The at-least-twenty-four-configuration pet kennel of claim 1,
wherein said seven first panels and said four second panels are clamped together to form a configuration selected from a group consisting of:
an angled-stilt multi-story-roof-and-floor octagon configuration,
an angled-stilt multi-story-floor octagon configuration,
a parallel-stilt multi-story-roof-and-floor octagon configuration,
a parallel-stilt panel multi-story-floor octagon configuration,
a opposite-patio multi-kennel configuration,
a joint-patio multi-kennel configuration,
a parallel-stilt square configuration,
a opposite-patio single-kennel configuration,
a symmetric-octagon configuration,
a asymmetric-octagon configuration,
a T-shaped configuration,
a X-shaped configuration,
a L-shaped configuration,
a three-sided corner-configuration,
an I-shaped configuration,
a rectangular configuration,
a square configuration,
a three-sided side-door configuration,
an asymmetrical L-shaped configuration,
a symmetrical L-shaped configuration,
an asymmetrical T-shaped configuration,
a symmetrical T-shaped configuration,
a asymmetric five-sided configuration, and
a symmetric seven-sided configuration.

5. The at-least-twenty-four-configuration pet kennel of claim 1,
wherein one of said first wind-circulating sail and said second wind-circulating sail functions as an element selected from a group consisting of:
a cover
for partially covering said seven first panels and said four second panels,
a cover
for protecting a pet from rain,
a cover
for shielding a pet from said sun,
a cover
for providing privacy to a pet,
a gutter
for collecting rain water,
a gutter
for circulating rain water to prevent said rain water from pooling up,
a gutter
for redirecting rain water, to flow in many predetermined directions and elevations,
a gutter spout configured by rolling said first panel or said second panel into a tubular shape
for redirecting rain water in a predetermined direction,
a gutter spout
for leading rain water away from said at-least-twenty-four-configuration pet kennel, to keep said at-least-twenty-four-configuration pet kennel dry,
a gutter spout
for leading rain water away from said at-least-twenty-four-configuration pet kennel, to prevent said rain water from pooling up, and a gutter spout
for leading rain water away from said at-least-twenty-four-configuration pet kennel, to prevent said at-least-twenty-four-configuration pet kennel from rusting.

6. The at-least-twenty-four-configuration pet kennel of claim 1,
wherein one of said first wind-circulating sail and said second wind-circulating sail functions as an element selected from a group consisting of:
a wind circulator
for redirecting wind flow from flowing horizontally above said at-least-twenty-four-configuration pet kennel, to flowing downward, to flowing oppositely horizontally into said at-least-twenty-four-configuration pet kennel for cooling and keeping said at-least-twenty-four-configuration pet kennel dry;
a wind circulator
for redirecting wind flow from flowing horizontally, to flowing upward, into said at-least-twenty-four-configuration pet kennel, for cooling said at-least-twenty-four-configuration pet kennel;
a wind circulator
for redirecting wind flow from flowing horizontally to flowing downward, to flowing oppositely horizontally, to flowing upward, into said at-least-twenty-four-configuration pet kennel, for cooling said at-least-twenty-four-configuration pet kennel;
a wind circulator
for redirecting wind flow from flowing horizontally, to flowing upward, into said patio of said at-least-twenty-four-configuration pet kennel, for cooling said at-least-twenty-four-configuration pet kennel;
a wind circulator
for redirecting wind flow from flowing horizontally, to flowing downward, into said at-least-twenty-four-configuration pet kennel, for cooling said at-least-twenty-four-configuration pet kennel;
a wind circulator
for redirecting wind flow from flowing horizontally through said at-least-twenty-four-configuration pet kennel, to flowing out of said at-least-twenty-four-configuration pet kennel, to flowing downward, to flowing oppositely horizontally under said at-least-twenty-four-configuration pet kennel, to flowing upward, into said at-least-twenty-four-configuration pet kennel, to cool said at-least-twenty-four-configuration pet kennel;
a wind circulator
for being secured to two of said four second panels, above said at-least-twenty-four-configuration pet kennel, and redirecting wind flow from flowing horizontally, to flowing downward, to flowing oppositely horizontally, into said at-least-twenty-four-configuration pet kennel for cooling said at-least-twenty-four-configuration pet kennel;
a wind circulator
for redirecting wind flow from flowing horizontally in opposite directions, to flowing into said at-least-twenty-four-configuration pet kennel, for cooling said at-least-twenty-four-configuration pet kennel;
a wind circulator
for redirecting wind flow from flowing horizontally into said first wind-circulating sail and said second wind-circulating sail which are being disposed side-by-side atop said twenty-four-configuration pet kennel, to flowing downward, into said at-least-twenty-four-configuration pet kennel, to cool said inside of said at-least-twenty-four-configuration pet kennel; and
a wind circulator
for redirecting wind flow from flowing horizontally, into said first wind-circulating sail and said second wind-circulating sail which are being disposed longitudinally atop said at-least-twenty-four-configuration pet kennel, to flowing downward, into said at-least-twenty-four-configuration pet kennel, to cool said at-least-twenty-four-configuration pet kennel.

7. The at-least-twenty-four-configuration pet kennel of claim 1,
wherein one of said first wind-circulating sail and said second wind-circulating sail functions as an element selected from a group consisting of:
a wind blocker
for blocking rain from entering into said at-least-twenty-four-configuration pet kennel, to keep said at-least-twenty-four-configuration pet kennel dry,
a wind blocker attached to said twenty-four-configuration pet kennel,
for preventing wind from blowing into said at-least-twenty-four-configuration pet kennel, to keep said at-least-twenty-four-configuration pet kennel warm,
a wind blocker
for providing privacy inside said at-least-twenty-four-configuration pet kennel,
a wind blocker
for blocking said sun beams into said at-least-twenty-four-configuration pet kennel to keep said at-least-twenty-four-configuration pet kennel cool,
a wind blocker
for isolating said at-least-twenty-four-configuration pet kennels, and
a wind blocker
for providing an acoustic wall on said at-least-twenty-four-configuration pet kennels, to reduce noise.

8. A multi-configuration pet kennel comprising:
seven first panels,
said seven first panels
having a plurality of first-panel top ends and
a plurality of first-panel bottom ends;
four second panels,
said four second panels narrower than said seven first panels,
said four second panels
having a plurality of second-panel top ends and
a plurality of second-panel bottom ends,
said four second panels
respectively clamped to one another and said seven first panels;
a door panel,
said door panel
having a plurality of door-panel top ends and
a plurality of door-panel bottom ends,
said door panel
clamped to two adjacent ones of said seven first panels and
said four second panels;
a door,
said door
swingably hinged to said door panel;
two door hinges,
said two door hinges
respectively welded to said door panel;
a door screw,
said door screw
screwed on one of said two door hinges;
a U-shaped door latch,
said U-shaped door latch
pivotably clamped to said door;
a plurality of panel-tube legs,
said panel-tube legs
respectively snapped into said first-panel bottom ends, said second-panel bottom ends, and said door-panel bottom ends of said seven first panels, said four second panels, and said door panel;
a plurality of leg rings,
said leg rings
respectively molded to said panel-tube legs;
a plurality of water-draining holes,
said water-draining holes
having a plurality of water-draining-hole walls,
said water-draining holes
respectively molded inside said panel-tube legs;
a plurality of tick-blocking teeth,
said tick-blocking teeth
respectively molded to said water-draining-hole walls of said water-draining holes;
a first wind-circulating sail,
said first wind-circulating sail
attached to said seven first panels, said four second panels, and said door panel;
a plurality of first wind-circulating grommets,
said first wind-circulating grommets
respectively clamped on said first wind-circulating sail; and
a plurality of first wind-circulating ball ties,
said first wind-circulating ball ties
respectively threaded through said first wind-circulating grommets;
a second wind-circulating sail,
said second wind-circulating sail
attached to said first wind-circulating sail, said seven first panels, said four second panels, and said door panel;
a plurality of second wind-circulating grommets,
said second wind-circulating grommets
respectively clamped on said second wind-circulating sail;
a plurality of second wind-circulating ball ties,
said second wind-circulating ball ties
respectively threaded through said second wind-circulating grommets;
a plurality of first hook-and-loop straps,
said first hook-and-loop straps
respectively sewn to said first wind-circulating sail;
a plurality of second hook-and-loop straps,
said second hook-and-loop straps
respectively sewn to said second wind-circulating sail;
a plurality of J-shaped clamps,
said J-shaped clamps
respectively clamped to said seven first panels, said four panels, and said door panel;
a plurality of W-shaped clamps,
said W-shaped clamps
respectively clamped to of said seven first panels, said four second panels, and said door panel;

a plurality of square-head screws,
  said square-head screws
    respectively screwed through said J-shaped clamps and said W-shaped clamps; and
a plurality of wing-nuts,
  said wing-nuts
    respectively screwed onto said square-head screws,
wherein
said seven first panels respectively are for:
  functioning as angled stilts
    to raise and stabilize said multi-configuration pet kennel above the ground,
  functioning as floors
    to create multiple stories inside said multi-configuration pet kennel,
  functioning as windows,
  functioning as roofs,
  functioning as walls,
  functioning as patios, and
  forming at least twenty four configurations of said multi-configuration pet kennel,
said four second panels respectively are for:
  functioning as parallel stilts
    to raise and stabilize said multi-configuration pet kennel above the ground,
  functioning as floors
    to create multiple stories inside said multi-configuration pet kennel,
  functioning as windows,
  functioning as roofs,
  functioning as walls,
  functioning as patios, and
  forming at least twenty four configurations of said multi-configuration pet kennel,
said door screw is for:
  locking said door on said two door hinges,
said U-shaped door latch is for:
  releasably latching said door to said door panel,
said panel-tube legs respectively are for:
  lifting said multi-configuration pet kennel,
  plugging said first-panel bottom ends, said second-panel bottom ends, and said door-panel bottom ends,
  preventing fleas and ticks from hiding inside said first-panel bottom ends, said second-panel bottom ends, and said door-panel bottom ends, and
  providing shock-absorption,
said tick-blocking teeth respectively are for:
  preventing ticks from entering said water-draining holes, and
    from hiding inside said seven first panels, said four second panels, and said door panel,
  preventing ticks from avoiding tick-killing spray, and
  preventing ticks from hiding inside said seven first panels, said four second panels, and said door panel to protect pets from diseases,
said water-draining holes respectively are for:
  allowing rain water to drain away from said seven first panels, said four second panels, and said door panel,
  preventing said seven first panels, said four second panels, and said door panel from rusting,
  allowing water to drip downward, and
  allowing condensation to evaporate,
said first wind-circulating sail is for:
  circulating and redirecting wind in many directions and elevations through said multi-configuration pet kennel,
  blocking and catching wind from many directions and elevations from entering said multi-configuration pet kennel,
  functioning as a roof,
  functioning as a gutter,
  functioning as a gutter spout,
  redirecting rain water in many directions and elevations, away from said multi-configuration pet kennel,
  blocking and catching rain water from many directions and elevations from entering said multi-configuration pet kennel,
  functioning as a roof cover,
  functioning as a wall cover,
  functioning as a floor cover,
  functioning as a patio cover, and
  functioning as a stilt cover,
said second wind-circulating sail is for:
  circulating and redirecting wind in many directions and elevations through said multi-configuration pet kennel,
  blocking and catching wind from many directions and elevations from entering said multi-configuration pet kennel,
  functioning as a roof,
  functioning as a gutter,
  functioning as a gutter spout,
  redirecting rain water in many directions and elevations, away from said multi-configuration pet kennel,
  blocking and catching rain water from many directions and elevations from entering said multi-configuration pet kennel,
  functioning as a roof cover,
  functioning as a wall cover,
  functioning as a floor cover,
  functioning as a patio cover, and
  functioning as a stilt cover,
said J-shaped clamps respectively are for:
  angledly clamping said seven first panels, said four second panels, and said door panel together,
    to create at least twenty four kennel configurations,
  parallel clamping said seven first panels, said four second panels, and said door panel together
    to create at least twenty four kennel configurations, and
  fastening said seven first panels, said four second panels, and said door panel together without using tools,
said W-shaped clamps respectively are for:
  parallel clamping said seven first panels, said four second panels, and said door panel together
    to create at least twenty four kennel configurations, and
  fastening said seven first panels, said four second panels, and said door panel together without using tools.

9. The multi-configuration pet kennel of claim 8,
wherein said J-shaped clamps clamp said seven first panels and said four second panels together such that at least one of said seven first panels and said four second panels is angled at 30 degrees, 45 degrees, or 60 degrees.

10. The multi-configuration pet kennel of claim 8,
wherein said multi-configuration pet kennel has a foot print, wherein at least one of said seven first panels and said four second panels is
angled for increasing said foot print.

11. The multi-configuration pet kennel of claim 8,
wherein said seven first panels and said four second panels are clamped together to form a configuration selected from a group consisting of:
an angled-stilt multi-story-roof-and-floor octagon configuration,
an angled-stilt multi-story-floor octagon configuration,
a parallel-stilt multi-story-roof-and-floor octagon configuration,
a parallel-stilt panel multi-story-floor octagon configuration,
a opposite-patio multi-kennel configuration,
a joint-patio multi-kennel configuration,
a parallel-stilt square configuration,
a opposite-patio single-kennel configuration,
a symmetric-octagon configuration,
a asymmetric-octagon configuration,
a T-shaped configuration,
a X-shaped configuration,
a L-shaped configuration,
a three-sided corner-configuration,
an I-shaped configuration,
a rectangular configuration,
a square configuration,
a three-sided side-door configuration,
an asymmetrical L-shaped configuration,
a symmetrical L-shaped configuration,
an asymmetrical T-shaped configuration,
a symmetrical T-shaped configuration,
a asymmetric five-sided configuration, and
a symmetric seven-sided configuration.

12. The multi-configuration pet kennel of claim 8,
wherein one of said first wind-circulating sail and said second wind-circulating
sail functions as an element selected from a group consisting of:
a cover
for partially covering said seven first panels and said four
second panels,
a cover
for protecting a pet from rain,
a cover
for shielding a pet from said sun,
a cover
for providing privacy to a pet,
a gutter
for collecting rain water,
a gutter
for circulating rain water to prevent said rain water from pooling up,
a gutter
for redirecting rain water, to flow in many predetermined directions and elevations,
a gutter spout configured by rolling said first panel or said second panel into a tubular shape
for redirecting rain water in a predetermined direction,
a gutter spout
for leading rain water away from said multi-configuration pet
kennel, to keep said multi-configuration pet kennel dry,
a gutter spout
for leading rain water away from said multi-configuration pet
kennel, to prevent said rain water from pooling up, and
a gutter spout
for leading rain water away from said multi-configuration pet
kennel, to prevent said multi-configuration pet kennel from rusting.

13. The multi-configuration pet kennel of claim 8,
wherein one of said first wind-circulating sail and said second wind-circulating
sail functions as an element selected from a group consisting of:
a wind circulator
for redirecting wind flow from flowing horizontally above said multi-configuration pet kennel, to flowing downward, to flowing oppositely horizontally into said multi-configuration pet kennel for cooling and keeping said multi-configuration pet kennel dry;
a wind circulator
for redirecting wind flow from flowing horizontally, to flowing upward, into said multi-configuration pet kennel, for cooling said multi-configuration pet kennel;
a wind circulator
for redirecting wind flow from flowing horizontally to flowing downward, to flowing oppositely horizontally, to flowing upward, into said multi-configuration pet kennel, for cooling said multi-configuration pet kennel;
a wind circulator
for redirecting wind flow from flowing horizontally, to flowing upward, into said patio of said multi-configuration pet kennel, for cooling said multi-configuration pet kennel;
a wind circulator
for redirecting wind flow from flowing horizontally, to flowing downward, into said multi-configuration pet kennel, for cooling said multi-configuration pet kennel;
a wind circulator
for redirecting wind flow from flowing horizontally through said multi-configuration pet kennel, to flowing out of said multi-configuration pet kennel, to flowing downward, to flowing oppositely horizontally under said multi-configuration pet kennel, to flowing upward, into said multi-configuration pet kennel, to cool said multi-configuration pet kennel;
a wind circulator
for being secured to two of said four second panels, above said multi-configuration pet kennel, and redirecting wind flow from flowing horizontally, to flowing downward, to flowing oppositely horizontally, into said multi-configuration pet kennel for cooling said multi-configuration pet kennel;
a wind circulator
for redirecting wind flow from flowing horizontally in opposite directions, to flowing into said multi-configuration pet kennel, for cooling said multi-configuration pet kennel;
a wind circulator
for redirecting wind flow from flowing horizontally into said first wind-circulating sail and said second wind-circulating sail which are being disposed side-by-side atop said multi-configuration pet kennel, to flowing downward, into said multi-configuration pet kennel, to cool said inside of said multi-configuration pet kennel; and a wind circulator
for redirecting wind flow from flowing horizontally, into said first wind-circulating sail and said second wind-circulating sail which are being disposed longitudinally atop said multi-configuration pet kennel, to flowing downward, into said multi-configuration pet kennel, to cool said multi-configuration pet kennel.

14. The multi-configuration pet kennel of claim 8,
wherein one of said first wind-circulating sail and said second wind-circulating
sail functions as an element selected from a group consisting of:
a wind blocker
for blocking rain from entering into said multi-configuration pet kennel, to keep said multi-configuration pet kennel dry,
a wind blocker attached to said multi-configuration pet kennel,
for preventing wind from blowing into said multi-configuration pet kennel, to keep said multi-configuration pet kennel warm,
a wind blocker
for providing privacy inside said multi-configuration pet kennel,
a wind blocker
for blocking said sun beams into said multi-configuration pet kennel
to keep said multi-configuration pet kennel cool,
a wind blocker
for isolating said multi-configuration pet kennels, and
a wind blocker
for providing an acoustic wall on said multi-configuration pet kennels, to reduce noise.

15. A multi-configuration kennel comprising:
seven first panels,
said seven first panels
having a plurality of first-panel top ends and
a plurality of first-panel bottom ends;
four second panels,
said four second panels narrower than said seven first panels,
said four second panels
having a plurality of second-panel top ends and
a plurality of second-panel bottom ends,
said four second panels;
a door panel,
said door panel
having a plurality of door-panel top ends and
a plurality of door-panel bottom ends,
said door panel
clamped to two adjacent ones of said seven first panels and
said four second panels;
a door,
said door
swingably hinged to said door panel;
two door hinges,
said two door hinges
respectively welded to said door panel;
a door screw,
said door screw
screwed on one of said two door hinges;

a U-shaped door latch,
said U-shaped door latch
pivotably clamped to said door;
a plurality of panel-tube legs,
said panel-tube legs
respectively snapped into said first-panel bottom ends, said second-panel bottom ends, and said door-panel bottom ends of said seven first panels, said four second panels, and said door panel;
a plurality of leg rings,
said leg rings
respectively molded to said panel-tube legs;
a plurality of water-draining holes,
said water-draining holes
having a plurality of water-draining-hole walls,
said water-draining holes
respectively molded inside said panel-tube legs;
a plurality of tick-blocking teeth,
said tick-blocking teeth
respectively molded to said water-draining-hole walls of said water-draining holes;
a first wind-circulating sail,
said first wind-circulating sail
attached to said seven first panels, said four second panels, and said door panel;
a plurality of first wind-circulating grommets,
said first wind-circulating grommets
respectively clamped on said first wind-circulating sail; and
a plurality of first wind-circulating ball ties,
said first wind-circulating ball ties
respectively threaded through said first wind-circulating grommets;
a second wind-circulating sail,
said second wind-circulating sail
attached to said first wind-circulating sail, said seven first panels, said four second panels, and said door panel;
a plurality of second wind-circulating grommets,
said second wind-circulating grommets
respectively clamped on said second wind-circulating sail;
a plurality of second wind-circulating ball ties,
said second wind-circulating ball ties
respectively threaded through said second wind-circulating grommets;
a plurality of first hook-and-loop Velcro straps,
said first hook-and-loop Velcro straps
respectively sewn to said first wind-circulating sail;
a plurality of second hook-and-loop Velcro straps,
said second hook-and-loop Velcro straps
respectively sewn to said second wind-circulating sail;
a plurality of J-shaped clamps,
said J-shaped clamps
respectively clamped to said seven first panels, said four panels, and said door panel;
a plurality of W-shaped clamps,
said W-shaped clamps
respectively clamped to of said seven first panels, said four second panels, and said door panel;
a plurality of square-head screws,
said square-head screws
respectively screwed through said J-shaped clamps and said W-shaped clamps; and
a plurality of wing-nuts,
said wing-nuts
respectively screwed onto said square-head screws, wherein
said seven first panels respectively are for:
  functioning as angled stilts
    to raise and stabilize said multi-configuration kennel above the ground,
  functioning as floors
    to create multiple stories inside said multi-configuration kennel,
  functioning as windows,
  functioning as roofs,
  functioning as walls,
  functioning as patios, and
  forming at least twenty four configurations of said multi-configuration kennel,
said four second panels respectively are for:
  functioning as parallel stilts
    to raise and stabilize said multi-configuration kennel above the ground,
  functioning as floors
    to create multiple stories inside said multi-configuration kennel,
  functioning as windows,
  functioning as roofs,
  functioning as walls,
  functioning as patios, and
  forming at least twenty four configurations of said multi-configuration kennel,
said door screw is for:
  locking said door on said two door hinges,
said U-shaped door latch is for:
  releasably latching said door to said door panel,
said panel-tube legs respectively are for:
  lifting said multi-configuration kennel,
  plugging said first-panel bottom ends, said second-panel bottom ends, and said door-panel bottom ends,
  preventing fleas and ticks from hiding inside said first-panel bottom ends, said second-panel bottom ends, and said door-panel bottom ends, and
  providing shock-absorption,
said tick-blocking teeth respectively are for:
  preventing ticks from entering said water-draining holes, and
    from hiding inside said seven first panels, said four second panels, and said door panel,
  preventing ticks from avoiding tick-killing spray, and
  preventing ticks from hiding inside said seven first panels, said four second panels, and said door panel to protect pets from diseases,
said water-draining holes respectively are for:
  allowing rain water to drain away from said seven first panels, said four second panels, and said door panel,
  preventing said seven first panels, said four second panels, and said door panel from rusting,
  allowing water to drip downward, and
  allowing condensation to evaporate,
said first wind-circulating sail is for:
  circulating and redirecting wind in many directions and elevations through said multi-configuration kennel,
  blocking and catching wind from many directions and elevations from entering said multi-configuration kennel,
  functioning as a roof,
  functioning as a gutter,
  functioning as a gutter spout,
  redirecting rain water in many directions and elevations, away from said multi-configuration kennel,
  blocking and catching rain water from many directions and elevations from entering said multi-configuration kennel,
  functioning as a roof cover,
  functioning as a wall cover,
  functioning as a floor cover,
  functioning as a patio cover, and
  functioning as a stilt cover,
said second wind-circulating sail is for:
  circulating and redirecting wind in many directions and elevations through said multi-configuration kennel,
  blocking and catching wind from many directions and elevations from entering said multi-configuration kennel,
  functioning as a roof,
  functioning as a gutter,
  functioning as a gutter spout,
  redirecting rain water in many directions and elevations, away from said multi-configuration kennel,
  blocking and catching rain water from many directions and elevations from entering said multi-configuration kennel,
  functioning as a roof cover,
  functioning as a wall cover,
  functioning as a floor cover,
  functioning as a patio cover, and
  functioning as a stilt cover,
said J-shaped clamps respectively are for:
  angledly clamping said seven first panels, said four second panels, and said door panel together,
    to create at least twenty four kennel configurations,
  parallel clamping said seven first panels, said four second
    panels, and said door panel together
    to create at least twenty four kennel configurations, and
  fastening said seven first panels, said four second panels, and said door panel together without using tools,
said W-shaped clamps respectively are for:
  parallel clamping said seven first panels, said four second
    panels, and said door panel together
    to create at least twenty four kennel configurations, and
  fastening said seven first panels, said four second panels, and said door panel together without using tools.

16. The multi-configuration kennel of claim 15,
wherein said J-shaped clamps clamp said seven first panels and said four second panels together such that at least one of said seven first panels and said four second panels is angled at 30 degrees, 45 degrees, or 60 degrees.

17. The multi-configuration kennel of claim 15,
wherein said multi-configuration kennel has a foot print,
wherein at least one of said seven first panels and said four second panels is
angled for increasing said foot print.

18. The multi-configuration kennel of claim 15,
wherein said seven first panels and said four second panels are clamped together to form a configuration selected from a group consisting of:
  an angled-stilt multi-story-roof-and-floor octagon configuration, an angled-stilt multi-story-floor octagon configuration,
a parallel-stilt multi-story-roof-and-floor octagon configuration,
a parallel-stilt panel multi-story-floor octagon configuration,
a opposite-patio multi-kennel configuration,
a joint-patio multi-kennel configuration,
a parallel-stilt square configuration,
a opposite-patio single-kennel configuration,
a symmetric-octagon configuration,
a asymmetric-octagon configuration,
a T-shaped configuration,
a X-shaped configuration,
a L-shaped configuration,
a three-sided corner-configuration,
an I-shaped configuration,
a rectangular configuration,
a square configuration,
a three-sided side-door configuration,
an asymmetrical L-shaped configuration,
a symmetrical L-shaped configuration,
an asymmetrical T-shaped configuration,
a symmetrical T-shaped configuration,
a asymmetric five-sided configuration, and
a symmetric seven-sided configuration.

19. The multi-configuration kennel of claim 15,
wherein one of said first wind-circulating sail and said second wind-circulating sail functions as an element selected from a group consisting of:
a cover
   for partially covering said seven first panels and said four
   second panels,
a cover
   for protecting a pet from rain,
a cover
   for shielding a pet from the sun,
a cover
   for providing privacy to a pet,
a gutter
   for collecting rain water,
a gutter
   for circulating rain water to prevent the rain water from pooling up,
a gutter
   for redirecting rain water, to flow in many predetermined directions and elevations,
a gutter spout configured by rolling said first panel or said second panel into a tubular shape
   for redirecting rain water in a predetermined direction,
a gutter spout
   for leading rain water away from said multi-configuration kennel,
      to keep said multi-configuration kennel dry,
a gutter spout
   for leading rain water away from said multi-configuration kennel,
      to prevent said rain water from pooling up, and
a gutter spout
   for leading rain water away from said multi-configuration kennel,
      to prevent said multi-configuration kennel from rusting.

20. The multi-configuration kennel of claim 15,
wherein one of said first wind-circulating sail and said second wind-circulating sail functions as an element selected from a group consisting of:
a wind circulator
   for redirecting wind flow from flowing horizontally above said multi-configuration kennel, to flowing downward, to flowing oppositely horizontally into said multi-configuration kennel for cooling and keeping said multi-configuration kennel dry;
a wind circulator
   for redirecting wind flow from flowing horizontally, to flowing upward, into said multi-configuration kennel, for cooling said multi-configuration kennel;
a wind circulator
   for redirecting wind flow from flowing horizontally to flowing downward, to flowing oppositely horizontally, to flowing upward, into said multi-configuration kennel, for cooling said multi-configuration kennel;
a wind circulator
   for redirecting wind flow from flowing horizontally, to flowing upward, into said patio of said multi-configuration kennel, for cooling said multi-configuration kennel;
a wind circulator
   for redirecting wind flow from flowing horizontally, to flowing downward, into said multi-configuration kennel, for cooling said multi-configuration kennel;
a wind circulator
   for redirecting wind flow from flowing horizontally through said multi-configuration kennel, to flowing out of said multi-configuration kennel, to flowing downward, to flowing oppositely horizontally under said multi-configuration kennel, to flowing upward, into said multi-configuration kennel, to cool said multi-configuration kennel;
a wind circulator
   for being secured to two of said four second panels, above said multi-configuration kennel, and redirecting wind flow from flowing horizontally, to flowing downward, to flowing oppositely horizontally, into said multi-configuration kennel for cooling said multi-configuration kennel;
a wind circulator
   for redirecting wind flow from flowing horizontally in opposite directions, to flowing into said multi-configuration kennel, for cooling said multi-configuration kennel;
a wind circulator
   for redirecting wind flow from flowing horizontally into said first wind-circulating sail and said second wind-circulating sail which are being disposed side-by-side atop said multi-configuration
      kennel, to flowing downward, into said multi-configuration kennel, to cool said inside of said multi-configuration kennel; and
a wind circulator
   for redirecting wind flow from flowing horizontally, into said first wind-circulating sail and said second wind-circulating sail which are being disposed longitudinally atop said multi-configuration kennel, to flowing downward, into said multi-configuration kennel, to cool said multi-configuration kennel.

* * * * *